US011049391B2

(12) United States Patent
Mintz

(10) Patent No.: US 11,049,391 B2
(45) Date of Patent: Jun. 29, 2021

(54) SYSTEM AND METHODS TO APPLY ROBUST PREDICTIVE TRAFFIC LOAD BALANCING CONTROL AND ROBUST COOPERATIVE SAFE DRIVING FOR SMART CITIES

(71) Applicant: Yosef Mintz, Jerusalem (IL)

(72) Inventor: Yosef Mintz, Jerusalem (IL)

(73) Assignee: Yosef Mintz, Jerusalem (IL)

( * ) Notice: Subject to any disclaimer, the term of this patent is extended or adjusted under 35 U.S.C. 154(b) by 139 days.

(21) Appl. No.: 16/067,684

(22) PCT Filed: Jan. 3, 2017

(86) PCT No.: PCT/IB2017/050007
§ 371 (c)(1),
(2) Date: Jul. 2, 2018

(87) PCT Pub. No.: WO2017/115342
PCT Pub. Date: Jul. 6, 2017

(65) Prior Publication Data
US 2019/0012909 A1    Jan. 10, 2019

Related U.S. Application Data

(60) Provisional application No. 62/274,322, filed on Jan. 3, 2016, provisional application No. 62/280,220, filed
(Continued)

(51) Int. Cl.
| | | |
|---|---|---|
| G08G 1/01 | (2006.01) | |
| H04W 4/024 | (2018.01) | |
| G08G 1/017 | (2006.01) | |
| G06Q 30/02 | (2012.01) | |
| G07C 5/00 | (2006.01) | |

(52) U.S. Cl.
CPC ....... *G08G 1/0145* (2013.01); *G06Q 30/0206* (2013.01); *G07C 5/008* (2013.01);
(Continued)

(58) Field of Classification Search
CPC .... G08G 1/0145; G08G 1/017; G08G 1/0129; G08G 1/0112; H04W 4/024; G07C 5/008; G06Q 30/0206
(Continued)

(56) References Cited

U.S. PATENT DOCUMENTS

| | | | |
|---|---|---|---|
| 2009/0259528 A1* | 10/2009 | Ebersberger | ......... G07B 15/063 |
| | | | 705/13 |
| 2009/0319163 A1 | 12/2009 | Sutter et al. | |
| 2012/0226434 A1* | 9/2012 | Chiu | ................ G08G 1/096811 |
| | | | 701/117 |
| 2014/0095272 A1 | 4/2014 | Zafiroglu et al. | |
| 2014/0229255 A1* | 8/2014 | Scofield | ............ G06Q 30/0207 |
| | | | 705/14.21 |
| 2014/0278029 A1 | 9/2014 | Tonguz et al. | |

FOREIGN PATENT DOCUMENTS

| | | |
|---|---|---|
| EP | 2515284 | 10/2012 |
| WO | 03042950 | 5/2003 |

OTHER PUBLICATIONS

International Search Report and the Written Opinion for International Application No. PCT/IB2017/050007, dated May 7, 2017, 12 pages.
(Continued)

*Primary Examiner* — Maceeh Anwari
(74) *Attorney, Agent, or Firm* — Shichrur & Co.

(57) ABSTRACT

Apparatuses, systems and methods applying an innovative non-discriminating and anonymous car related navigation driven traffic model predictive control, producing predictive load-balancing on road networks which dynamically assigns efficient sets of routes to car related navigation aids and which navigation aids may refer to in dash navigation or to smart phone navigation application. The system and methods are may enable, for example, to improve or to substitute commercial navigation service solutions, applying under such upgrade or substitution a new highly efficient proactive traffic control for city size or metropolitan size traffic.

20 Claims, 18 Drawing Sheets

Related U.S. Application Data on Jan. 19, 2016, provisional application No. 62/296,748, filed on Feb. 18, 2016, provisional application No. 62/315,207, filed on Mar. 30, 2016, provisional application No. 62/361,094, filed on Jul. 12, 2016, provisional application No. 62/407,739, filed on Oct. 13, 2016.

(52) U.S. Cl.
CPC ........... *G08G 1/017* (2013.01); *G08G 1/0112* (2013.01); *G08G 1/0129* (2013.01); *H04W 4/024* (2018.02)

(58) Field of Classification Search
USPC ........................................................ 701/117
See application file for complete search history.

(56) References Cited

OTHER PUBLICATIONS

International Preliminary Report on Patentability for International Application No. PCT/IB2017/050007, dated Jul. 12, 2018, 8 pages.
International Search Report and the Written Opinion for International Application No. PCT/IB2017/053995, dated Nov. 6, 2017, 14 pages.
International Preliminary Report on Patentability for International Application No. PCT/IB2017/053995, dated Aug. 15, 2019, 9 pages.
European Search Report for European Patent Application No. 17733935.5, dated Aug. 16, 2019, 11 pages.
Office Action for Israeli Patent Application No. 260358, dated Feb. 19, 2020, 3 pages.

* cited by examiner

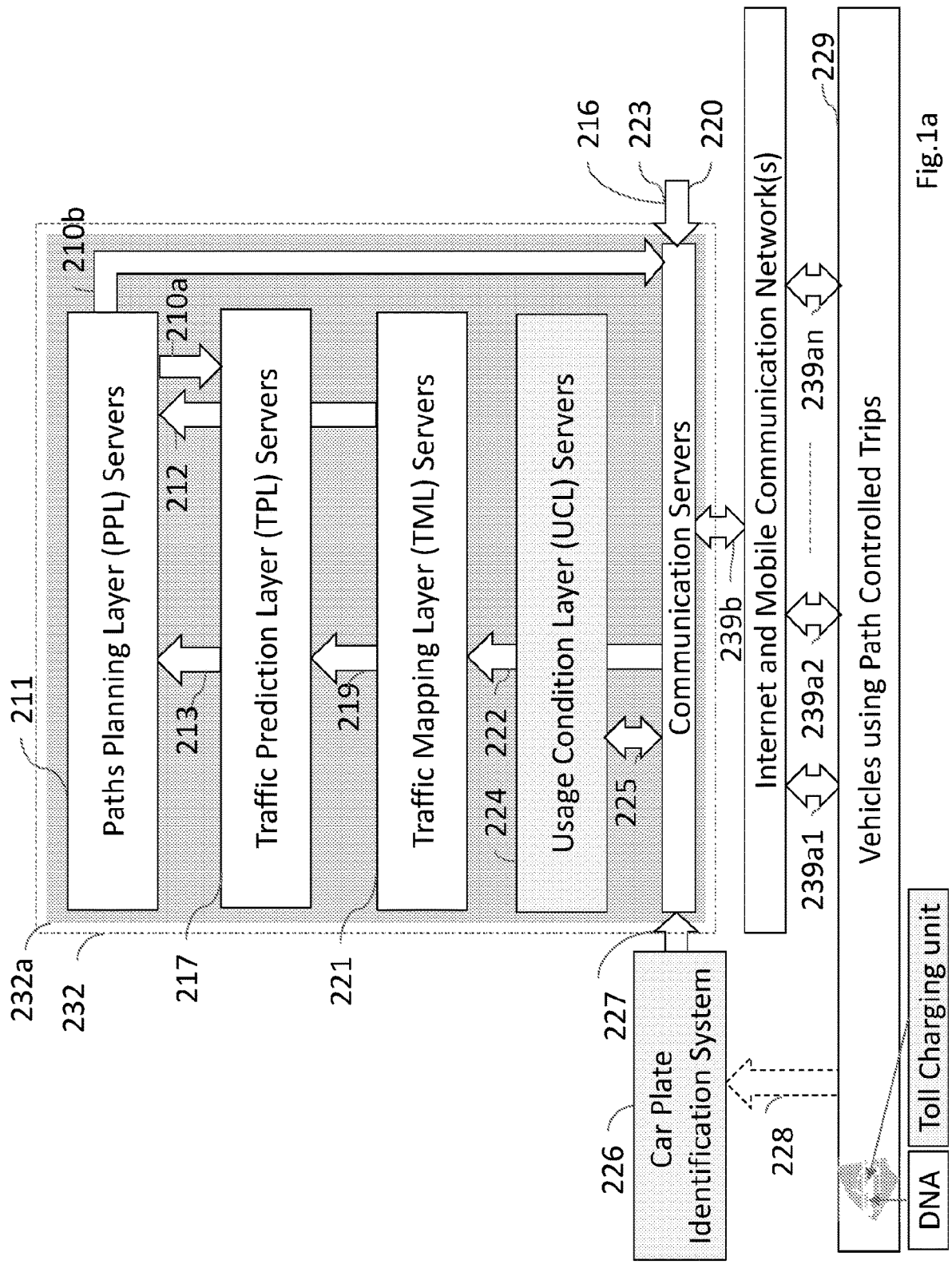

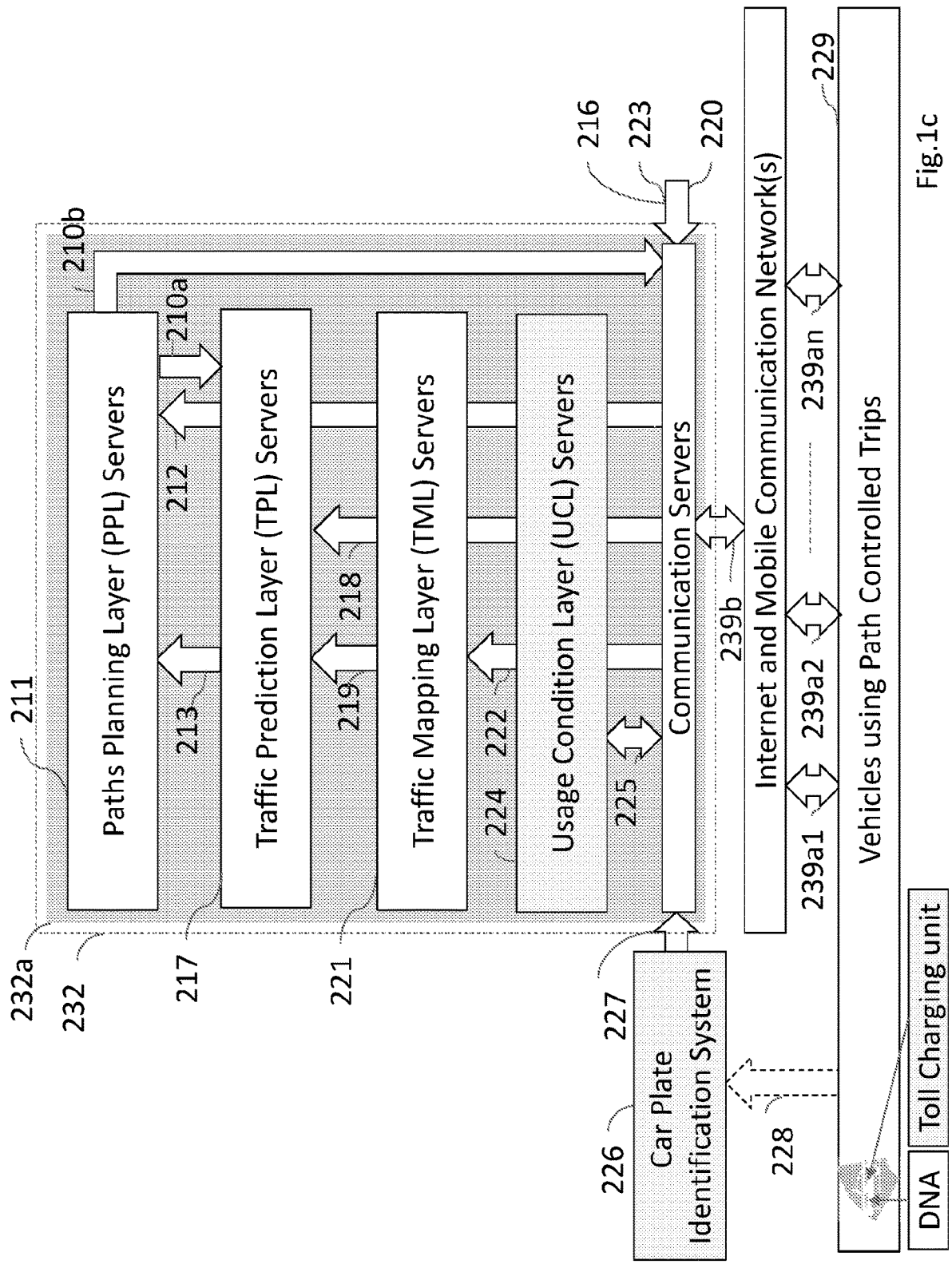

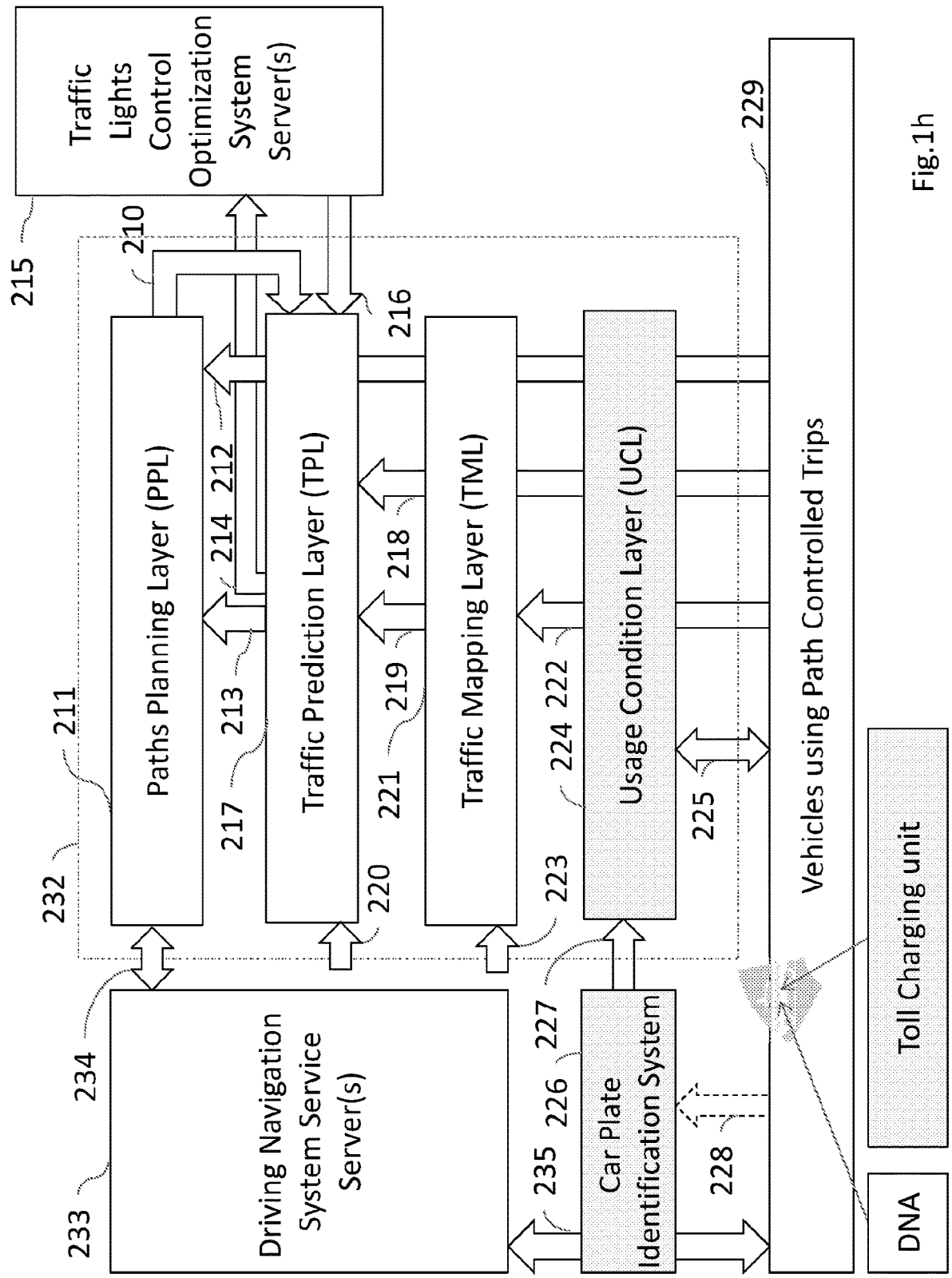

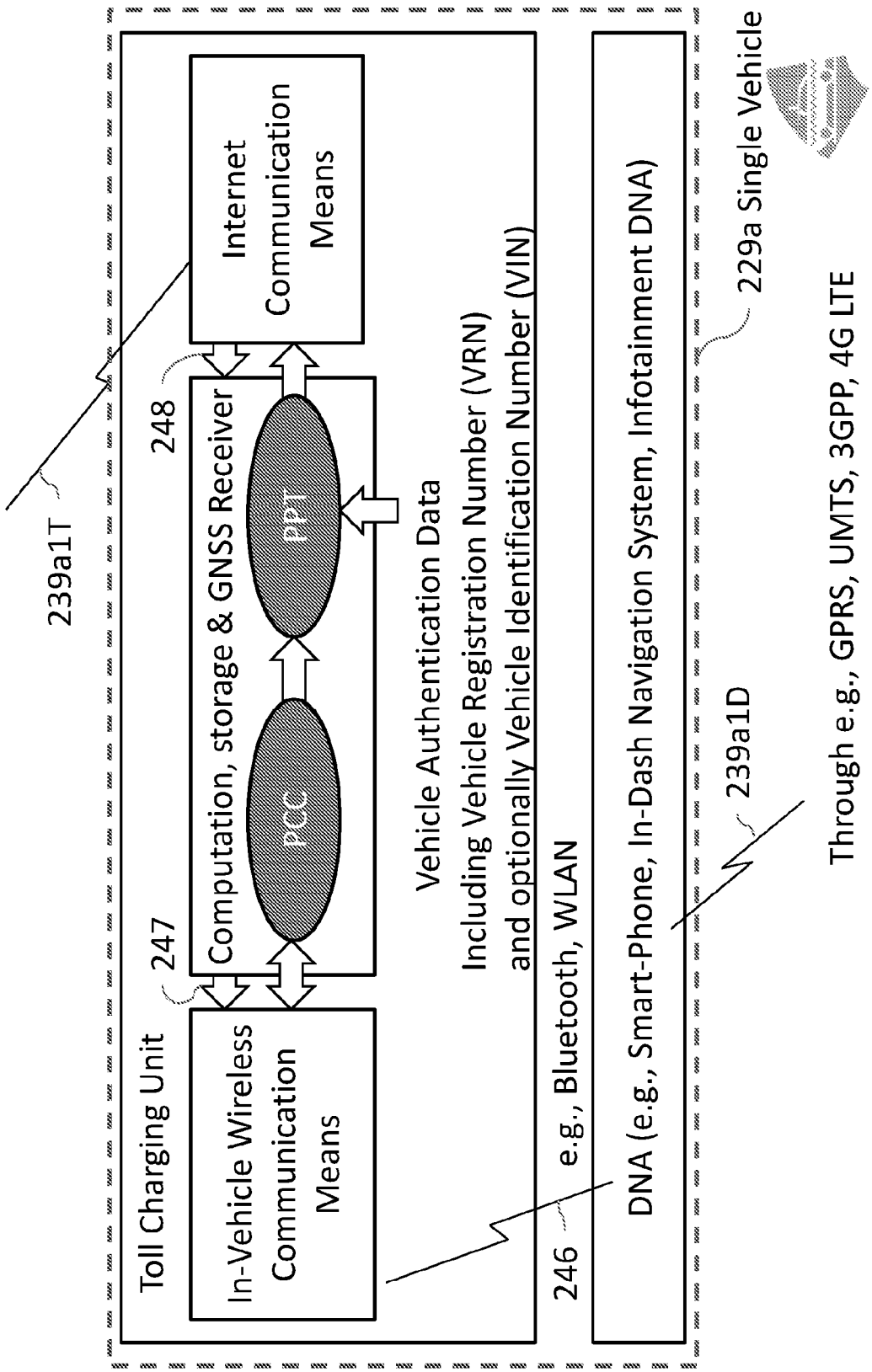
Fig.1i1

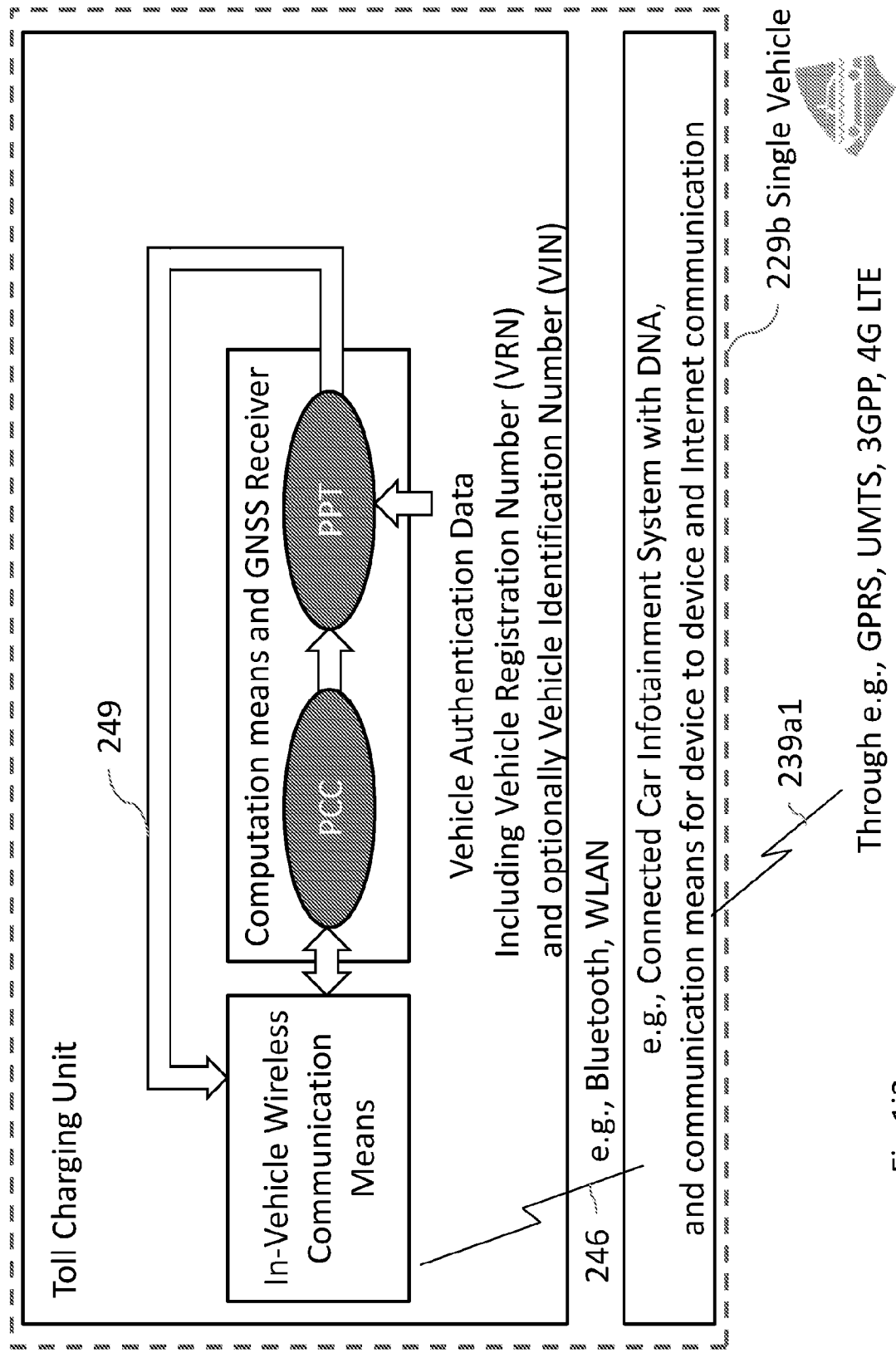
Fig.1i2

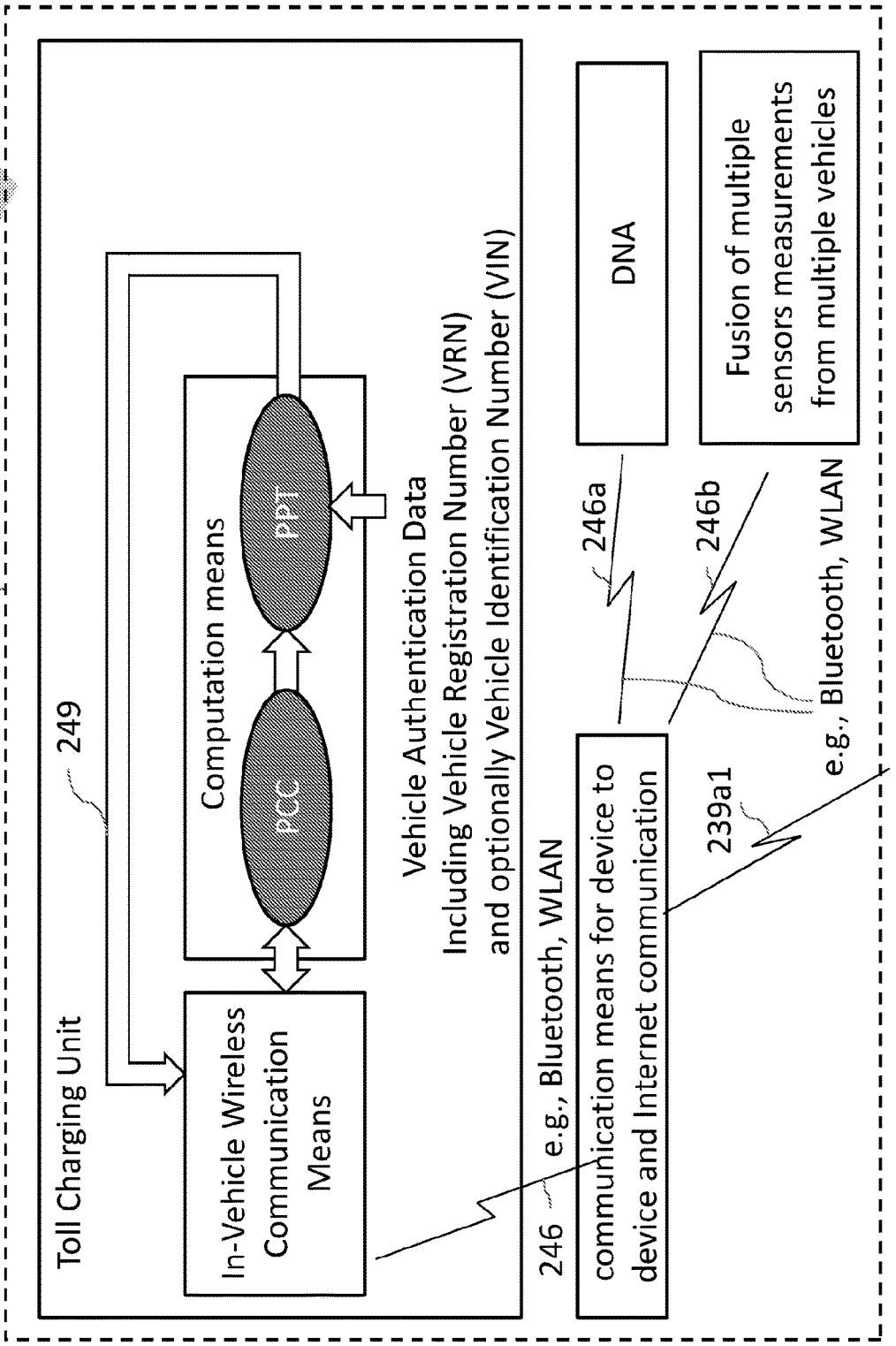
Fig.1i3

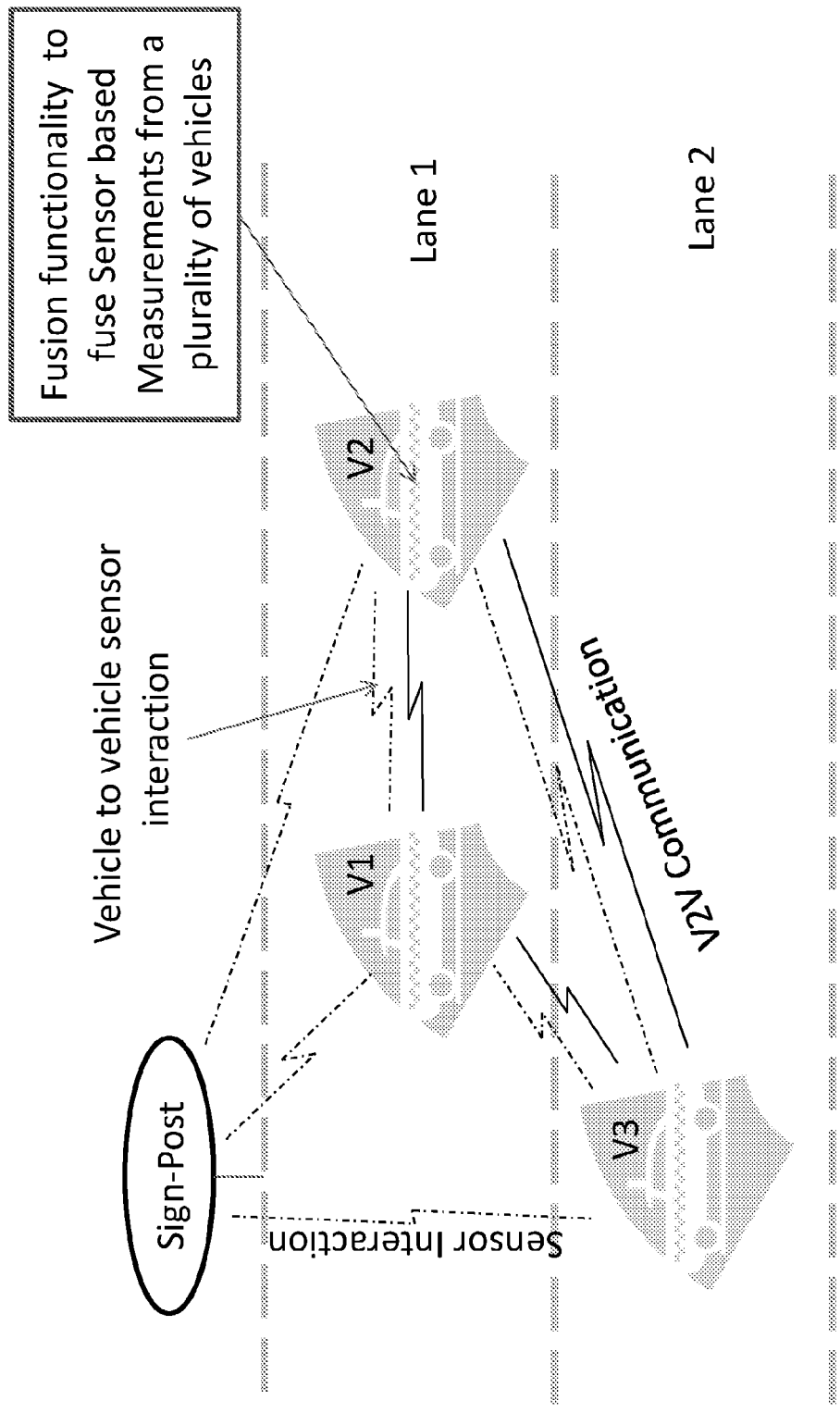
Fig.1i3a

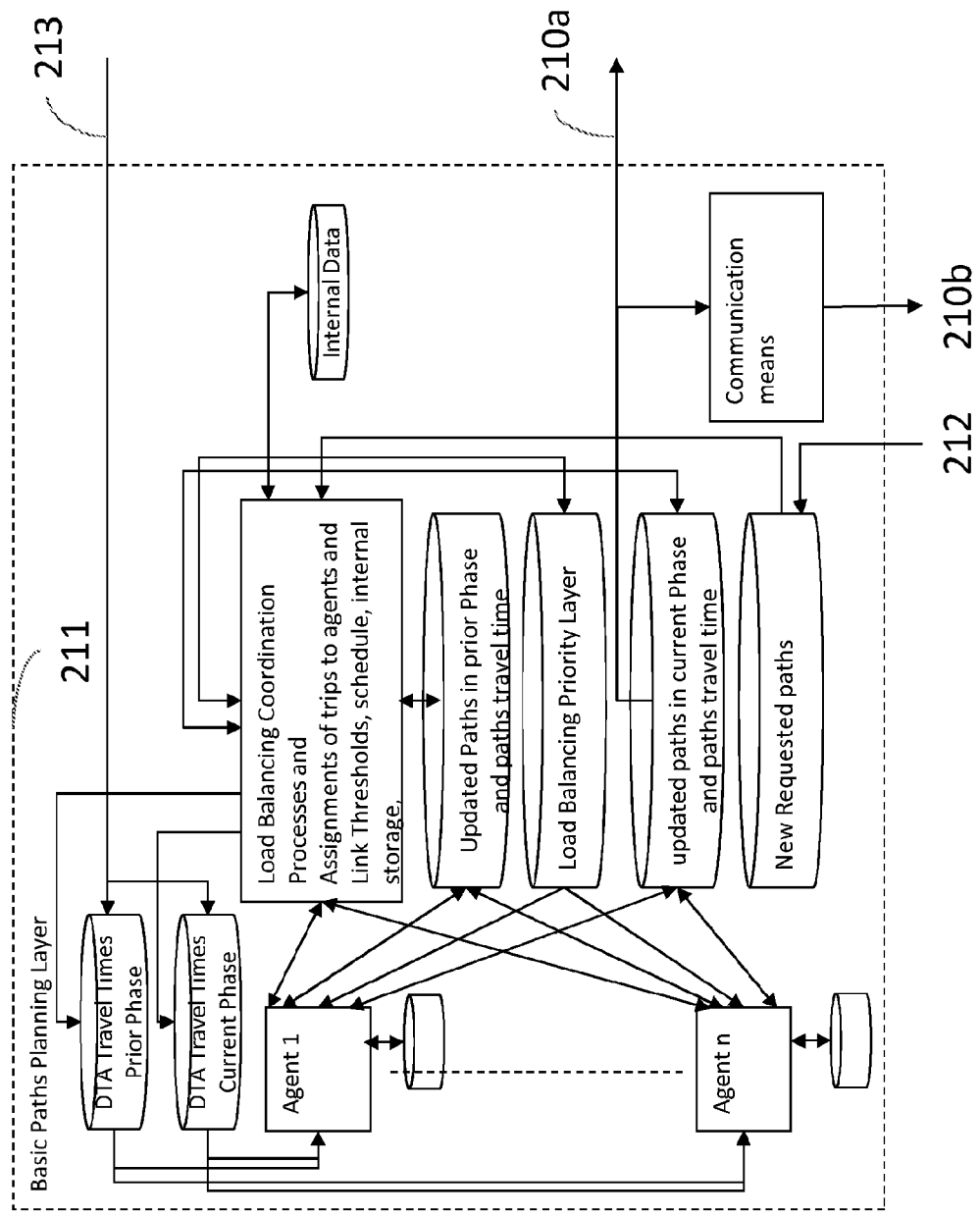
Fig.1j1

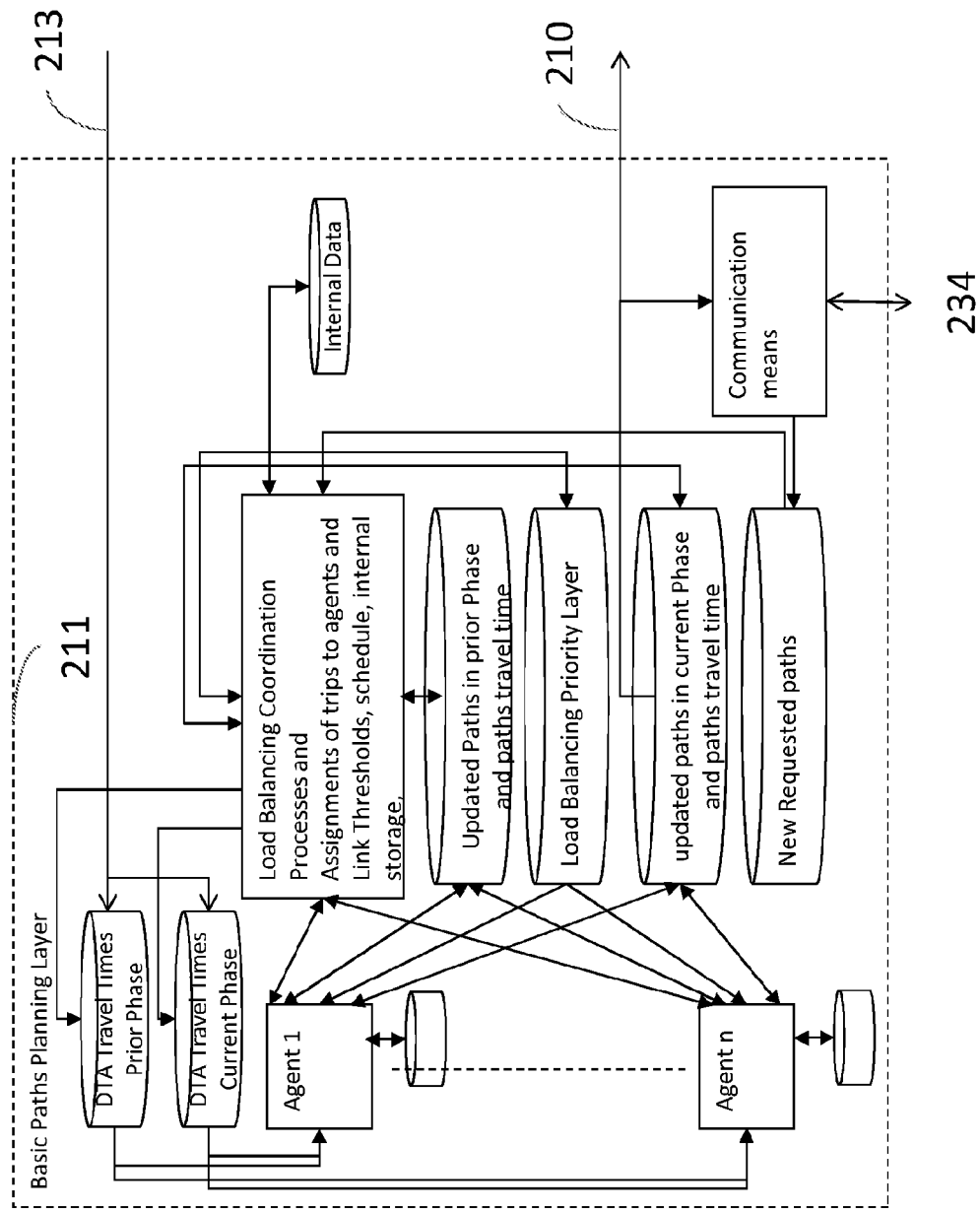
Fig.1j2

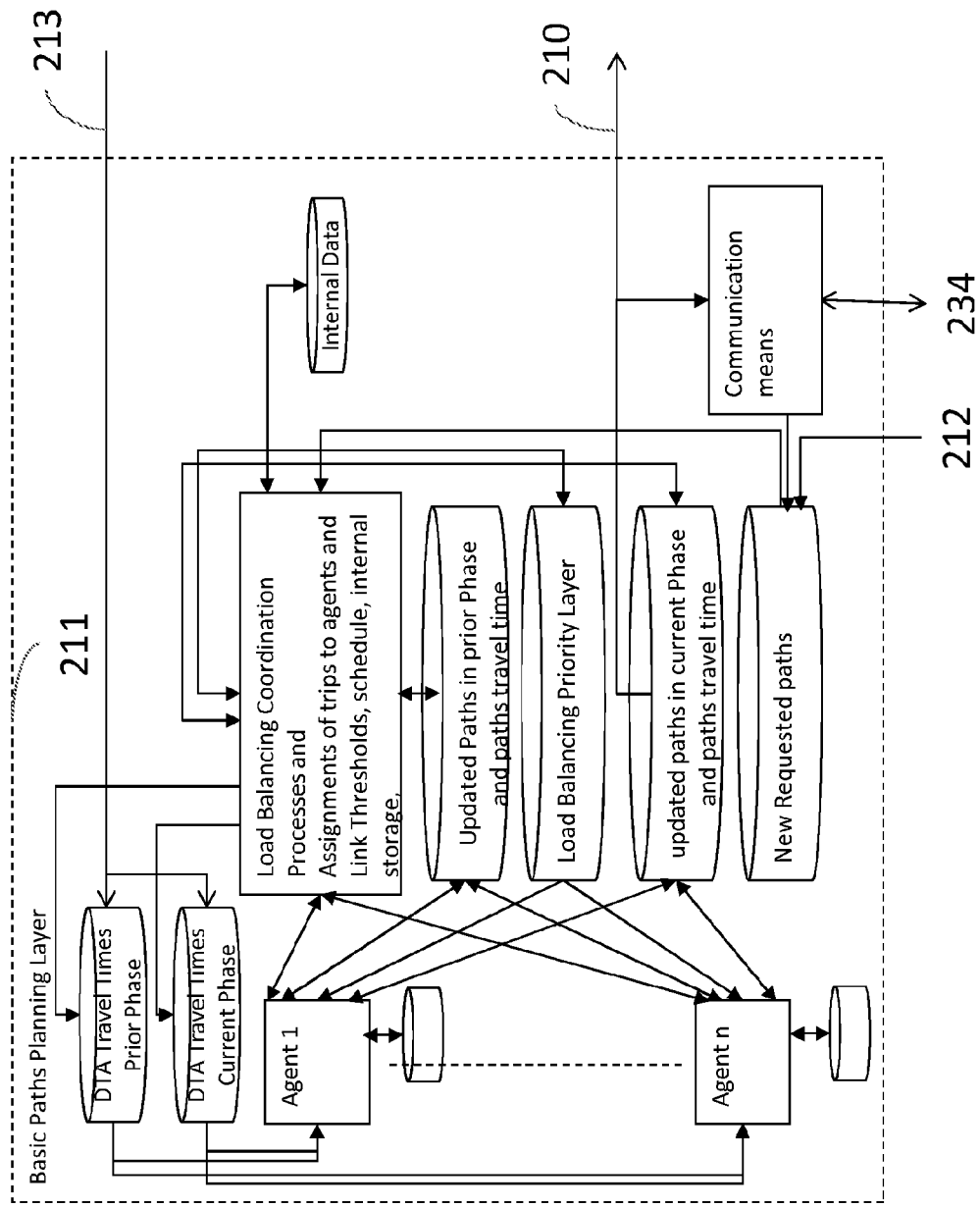
Fig.1j3

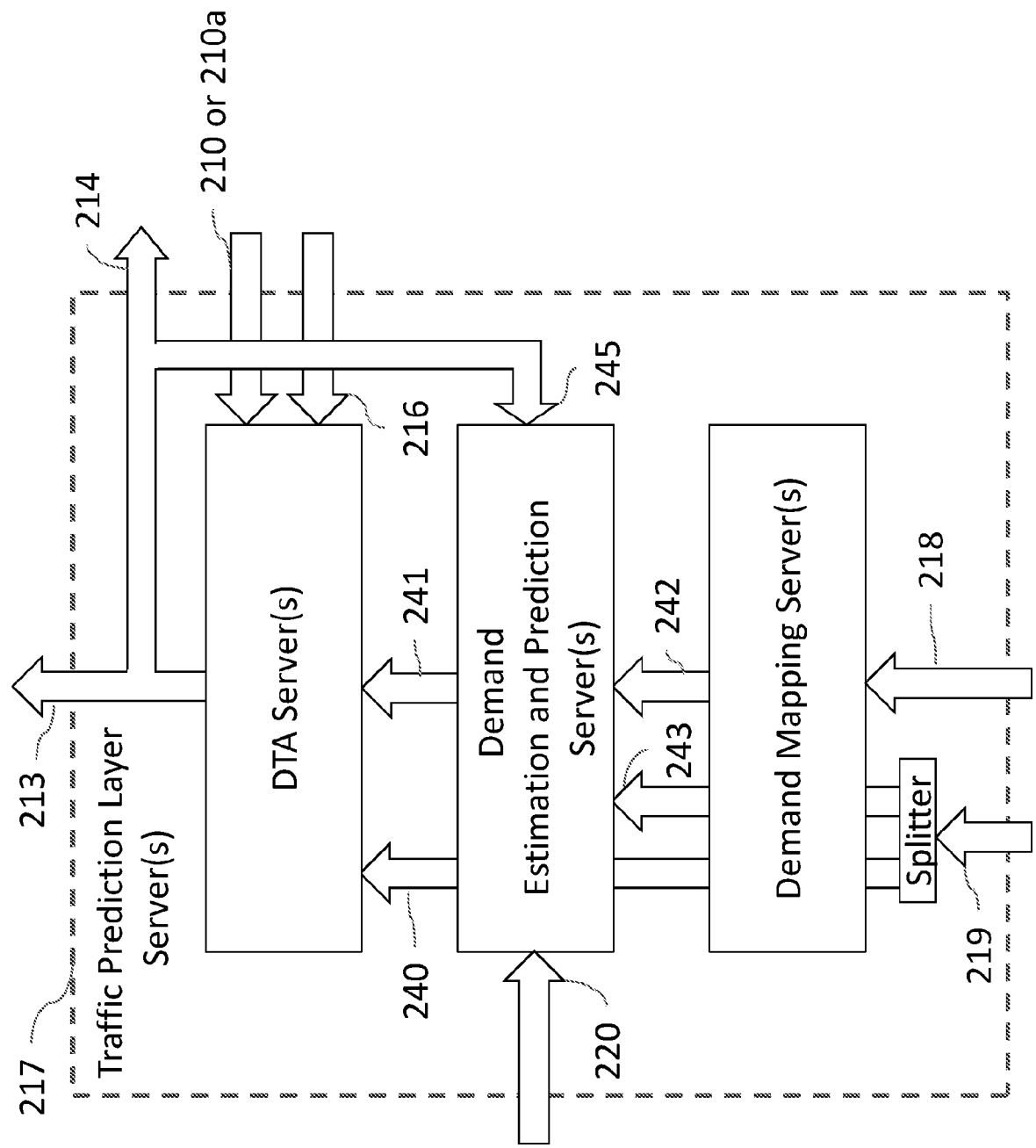
Fig. 1j4

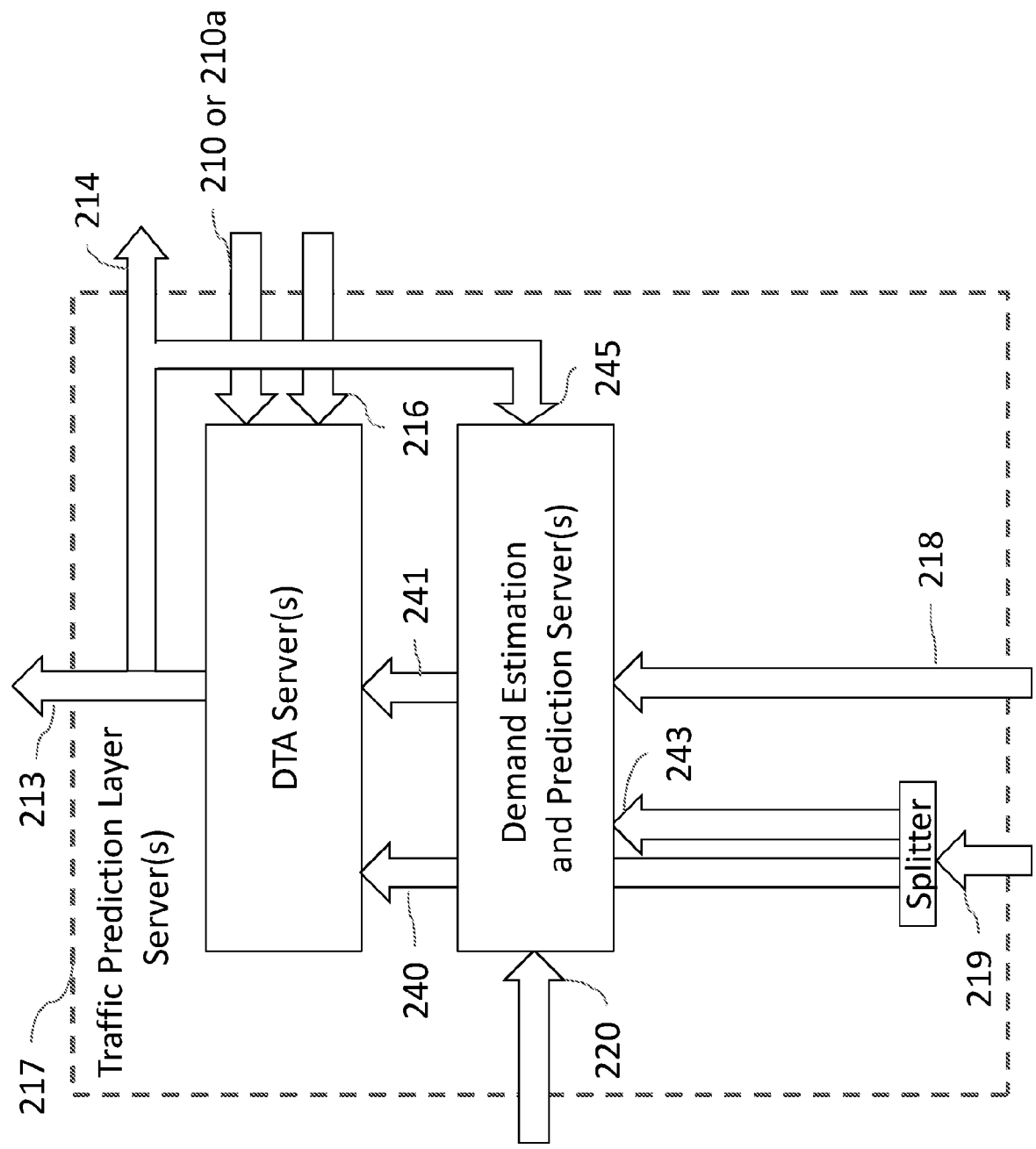
Fig. 1j5

SYSTEM AND METHODS TO APPLY ROBUST PREDICTIVE TRAFFIC LOAD BALANCING CONTROL AND ROBUST COOPERATIVE SAFE DRIVING FOR SMART CITIES

CROSS REFERENCE

This application claims the benefit of and priority from U.S. Provisional Patent Application Ser. No. 62/274,322, filed Jan. 3, 2016, U.S. Provisional Patent Application Ser. No. 62/280,220, filed Jan. 19, 2016, U.S. Provisional Patent Application Ser. No. 62/296,748, filed Feb. 18, 2016, U.S. Provisional Patent Application Ser. No. 62/315,207, filed Mar. 30, 2016, U.S. Provisional Patent Application Ser. No. 62/361,094, filed Jul. 12, 2016 and U.S. Provisional Patent Application Ser. No. 62/407,739, filed Oct. 13, 2016, the entire disclosures of all of which are incorporated herein by reference.

TECHNICAL FIELD

Car navigation driven predictive traffic load balancing control on urban road networks applying cooperative distributed model predictive control and robust cooperative safe driving supported by robust privacy preserving privileged GNNS tolling concept.

BACKGROUND

Current trend towards smart traffic for smart cities considers solutions mainly based on very slow evolving Intelligent Transportations Systems (ITS) which has roots in the early nineties, and which proposes costly solutions for city wide coverage while lacking the most critical part which is an ability to apply efficient distribution of the traffic on complex urban networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIGS. 1a up to 1e schematically illustrate examples of possible implementation alternatives for system configurations and functionalities according to some demonstrative embodiments.

FIG. 1a schematically illustrates top level system data flow to apply predictive traffic load balancing control according to some embodiments.

FIG. 1c schematically illustrates top level system data flow to apply predictive traffic load balancing control according to some embodiments.

FIG. 1h schematically illustrates top level system data flow to apply predictive traffic load balancing control according to some embodiments, wherein FIG. 1h differs from FIG. 1g, for example, at least by enabling to feed traffic predictions from a path control system to a traffic light control optimization system enabling to improve according to some embodiments traffic lights control in forward time intervals covered by the predicted flows.

FIG. 1i1 schematically illustrates vehicular apparatus and methods to apply according to some embodiments interaction of a vehicle with a predictive traffic load balancing control system.

FIG. 1i2 illustrates schematically a toll charging unit and its interaction with in-vehicle Driving Navigation Aids (DNA) and a predictive traffic load balancing control system.

FIG. 1i3, illustrates schematically expanded configuration of vehicular apparatus described with FIG. 1i2, enabling to support privileges to cooperative safe driving.

FIG. 1i3a illustrates schematically the sensing, communication and fusion functionalities involved with cooperative mapping of relative distances between a vehicle and other vehicles.

FIG. 1j1 up to FIG. 1j3 illustrate schematically embodiments for the coordination of path controlled trips preferably applied with a basic paths planning layer.

FIG. 1j4 and FIG. 1j5 illustrate schematically basic traffic prediction layer with respect to different embodiments in which some of them apply mapping of demand of trips as described in FIG. 1j4.

FIG. 2 is a schematic illustration of a product of manufacture, in accordance with some demonstrative embodiments.

DETAILED DESCRIPTION

Figure 1B:
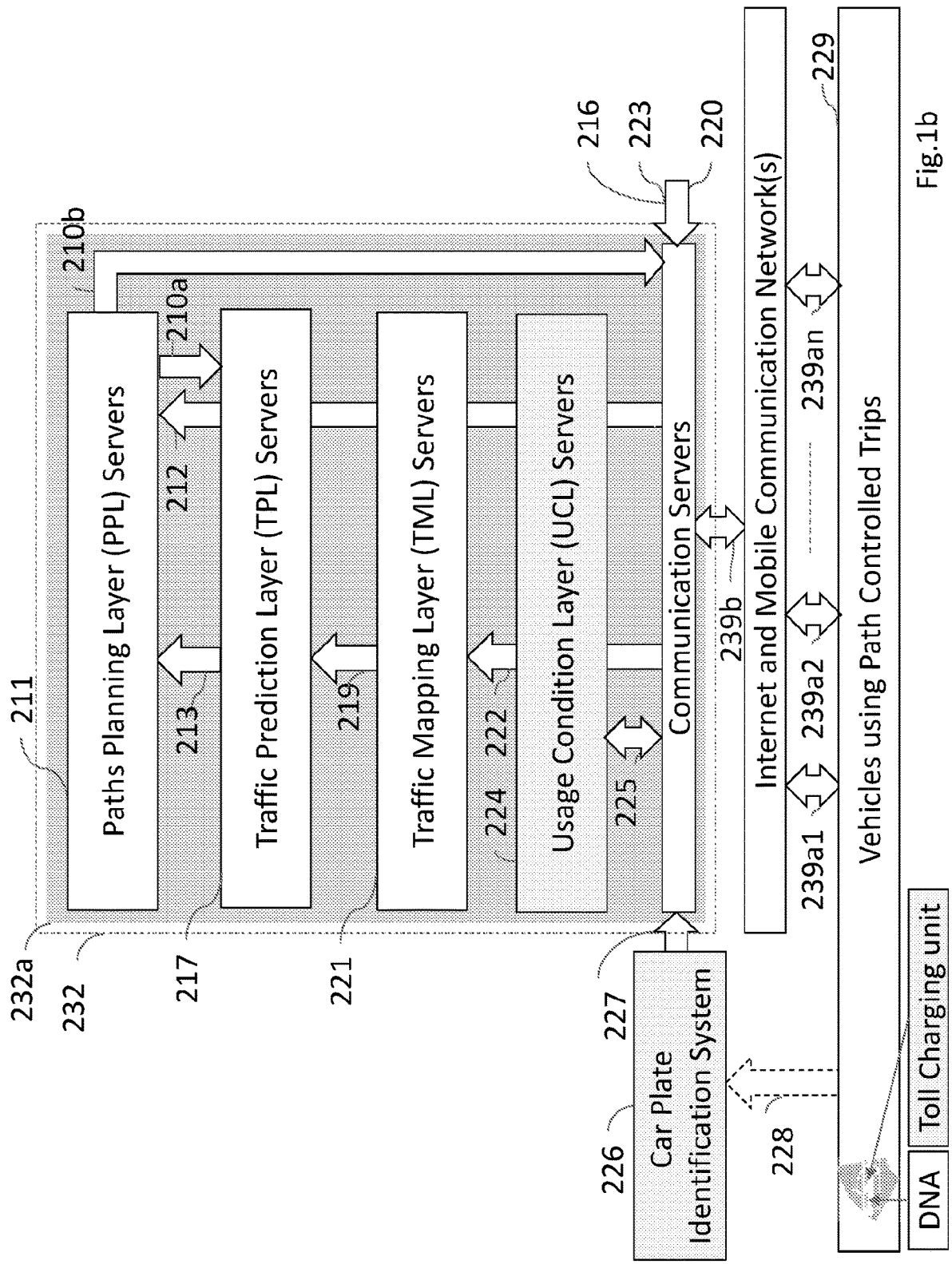
FIG. 1b schematically illustrates top level system data flow to apply predictive traffic load balancing control according to some embodiments, wherein FIG. 1b differs from FIG. 1a, for example, at least by enabling vehicles to communicate directly with the path planning layer.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments are described herein with respect to a method. However, some embodiments may be implemented for example, by an apparatus, a device and/or a system including means for triggering, causing, controlling, and/or performing one or more, e.g., some or all, of the operations of the method. In one example, an apparatus, a device and/or a system may include one or more components, modules and/or units, for example, including circuitry and/or logic, configured to trigger, cause, control, and/or perform one or more, e.g., some or all, of the operations of the method.

Some demonstrative embodiments described herein may be implemented by apparatuses, systems and/or methods applying an innovative non-discriminating and anonymous car related navigation driven traffic model predictive control, producing predictive load-balancing on road networks which dynamically assigns efficient sets of routes to car related navigation aids and/or which navigation aids may refer to in dash navigation or to smart phone navigation application.

Some demonstrative embodiments described herein may be implemented to enable, for example, to improve or to substitute commercial navigation service solutions, applying under such upgrade or substitution a new highly efficient proactive traffic control for city size or metropolitan size traffic.

Some demonstrative embodiments described herein may refers to innovative solutions provided to issues such as, for example, but not limited to, encouragement of usage of controlled trips on road networks by robust privacy preserving free of charge or privileged GNNS tolling which hides trip details from a toll charging center (privacy preservation at a level which disables any potential big brother syndrome) and which further enables to optimize network load balancing by demand control, robust real time calibration of DTA for city wide controllable traffic-predictions associated with predictive load balancing control, regional evacuation/dilution of traffic under emergency situations, support to cooperative multi-destination trips, static and dynamic differentiation between part of networks which may and which may not be used to balance city wide traffic.

Some demonstrative embodiments described herein may be implemented, for example, to contribute to robust and less costly cooperative safe driving on road networks, which are expected to be a major issue with autonomous vehicles, as well as contributing to preparation of conditions to prevent, in due course, from non-coordinated mass usage of navigation dependent autonomous vehicles to become counterproductive to both the overall traffic and the users of autonomous vehicles.

Traffic in cities and in metropolitan areas became a major increasing issue worldwide wherein flexibility to improve road networks was converted from a cost issue to a progressively infeasible option in dense regions.

Common alternatives consider public transportation improvement with expectation that some part of the public will give-up on highly available private transportation which provides the most convenient point to point trips, as a reaction to high traffic loads on road networks. A less common alternative is to apply non popular demand dilution by road tolling.

Relatively newer and yet not accepted alternatives consider more advanced control solutions for higher utilization and generation of freedom degrees on networks. Such alternatives are considered to be applied by Intelligent Transportation Systems (ITS) concepts which recently focus on Cooperative ITS (C-ITS). Such related concepts enter into the new category of smart traffic for smart cities.

Traditionally ITS solutions are promoted by the public sector which promotes standardization for DSRC based ITS. Such approach has its roots in the early nineties, and since has shown very poor results and in general ITS became a quite disappointing costly option to improve traffic under a concept which its main focus was to resolve communication issues by DSRC and which the first and the second generation of cellular networks were not expected to cope with. In the mid of the first decade of the current millennium the technology of cellular networks became advanced enough and later on cheap enough for making DSRC based solution redundant. As a result, commercial personal navigation solutions have managed to achieve the basic objective which was expected from early ITS solutions without a need to spend expensive public resources.

The major leap towards the ability to materialize widely accepted commercial solutions was a result of the relatively new availability of low cost mobile internet through cellular networks and smart-phones, less than a decade ago, and recent ability to provide free of charge navigation to the public based on incomes from advertisement.

However such commercial solutions are not expected to provide an answer to the main goal which is high utilization of available road networks for which efficient and robust predictive control on the distribution of vehicles on city wide networks is required. In this respect the issue is a predictive control issue which raises further technological and operation issues which inter-alia refer to: a) lack of a concept to motivate high committed usage of controlled car navigation in the traffic to generate prime conditions for effective control, which current commercial solutions can't justify economically and which the private sector has no further real reason to materialize without committed participation of the public sector, and b) lack of a concept and methods to apply robust dynamic coordination of trips which enable fair and predictive assignment of sets of routes, and which issue is relevant in case that a solution would be found to "a)".

Lack to cope with the above mentioned issues, whether it is a private or public oriented solution, makes real progress towards materialization of smart traffic for smart cities to be non realistic, In this respect it should be clarified that no real intermediate option exists to apply reliably efficient solution while a major part of the traffic is modeled by stochastic and relatively simplified sub-models, and which issue is not a matter of further research as it is elaborated with some embodiments.

Potential benefits from a system that may cope with the above mentioned issues although expected to be high, are not unambiguous and depend on concrete interrelation between time and zones dependent demand of trips and the network supply potential, wherein the way to determine potential benefits is by computer simulation for a concrete city.

Under predictive coordination of trips on a city wide network, it may be expected that the potential to obtain very high benefits is clear even for highly congested networks in which at least between the morning and the evening rush hours there are high freedom degrees on the network that coordination of trips may highly utilize and produce in this respect high benefits. Such benefits may include but not be limited to a) value of travel time savings determined according to transportation economics criteria for investments of the public sector in transportation related projects, b) reduction in polluting emissions and c) reduction in risk associated with exposure to potential incidents.

Indication about the potential benefits may be obtained by computer simulations applying a simple control model which includes traffic predictions by Dynamic Traffic Assignment (DTA) according to current and predicted non-coordinated controlled routes, and non-controlled model based routes, wherein non-coordinated controlled routes are limited to few up to ten percent in order not to make interrelated interference of non-coordinated trips to be dominant, and wherein independent simultaneous planning of routes are applied frequently according to feedback from the DTA simulator which is fed by prior planned controlled routes and non controlled model based routes. Although this is not an applicable solution as further elaborated, it may provide preliminary indication about concrete potential benefits. An example of non generically acceptable simulation result, performed by said simple control model for western Tokyo traffic in the nineties, has shown a potential improved benefit over a model using current traffic for planning of routes which with respect to time saving is equivalent to removal of more than one trip from the network, in average, by each controlled trip at ten percent of controlled trips. This may be equivalent to dilution of the traffic by more than ten percent.

Some idea about the reason for the non-applicability of said simple control model may be provided by mentioning two feasibility issues: a) lack of an ability to apply robust traffic predictions by a stochastic and simplified route-choice model associated with a DTA, and b) lack of ability to apply acceptable calibration of a stochastic, non-linear and time varying DTA for a city wide network—by joint/dual estimation of high dimension demand and parameters of DTA models—while most or even major part of the traffic is modeled.

The implementation related issues mentioned above and the expected high potential benefits from an implementation, raise an issue of a need for a new concept enabling preferably either to improve or to substitute commercial navigation solutions to apply a new highly efficient predictive (proactive) traffic control for city size or metropolitan size traffic which may include aspects that are considered by C-ITS.

In this respect, some major issues should be resolved first in order to enable applying efficient and acceptable solution which should overcome inter-alia: lack of efficient non-discriminating concept and technology to coordinate mass usage of controlled trips on a city wide network, lack of a low cost and efficient concept to encourage mass usage of controlled trips on networks, lack of robust real time calibration of DTA to support city wide controlled traffic predictions including adaptation to traffic irregularities, lack of robust control and regional evacuation of traffic under emergency situations, lack of complementary solution to multi-destination cooperative trips, lack of complementary solution enabling static and dynamic differentiation between part of networks which may and which may not be used to balance city wide traffic, lack of robust and efficient incident control, lack of robust privacy preservation disabling even a potential big brother syndrome to be considered as an option, lack of complementary optimal dynamic control on demand, lack of means to prepare conditions, in due course, to prevent from non-coordinated mass usage of navigation dependent autonomous vehicles to become counterproductive to both the overall traffic and the users of autonomous vehicles, lack of a concept to shorten the time towards robust and relatively low cost implementation of cooperative safe driving.

Some embodiments, e.g., as described below, may be configured to provide feasible solution to one or more or to all elements of above mentioned issues and/or to provide additional features and/or benefits and//or alternatives and/or improvements to respective systems and methods which exist or will be existing in the future.

The embodiments describe methods, apparatus and/or systems that may enable high utilization of road networks (hereinafter the term network refers to a road network if not mentioned otherwise), using control on paths of trips with the aim to resolve above mentioned issues and some other issues mentioned further along with the described embodiments. Hereinafter, and above, the term path refers to a route on a road network and both terms, path and route, may be used interchangeably and may include lanes on roads as well.

According to some embodiments of the invention, control on paths may be applied as an independent service or as an upgrade to available centralized navigation system service that calculates routes for driving navigation aids according to requests fed to driving navigation aids and transmits routes assigned to driving navigation aids. Hereinafter, and above, a driving navigation aid may refer to a means of navigation for driving, enabling to guide either a driver or a means of navigation for driving enabling to guide an autonomous vehicle, according to a route on a road network, wherein, a driving navigation aid may refer to the term DNA as an abbreviation. A DNA may be a satellite based driving navigation aid used to guide drivers, in which the position of the vehicle along a trip is determined indirectly for, or directly by, received signals from a GNNS, and/or according to sensor(s) associated with an autonomous vehicle enabling vehicle localization on a high resolution map.

In case of driving navigation aids which are not supported by centralized route calculation, there would be preferably a need to upgrade such driving navigation aids to transmit guidance request to a centralized system and to receive guiding routes in order to apply said control on paths of trips. A centralized approach may be needed in order to enable a highly demanding control to coordinate substantially paths on the network by a plurality of refining phases (which may refer to control cycles), whereas remote calculation of paths by driving navigation aids (non centralized calculations), may limit the control refining phases. With such approach a long time phase may reduce the efficiency of the control on trip paths and may even make the control non efficient.

The methods, apparatus and/or systems that enable to apply said control approach on paths for trips should preferably use model predictive control targeting mainly urban areas in which there are multiple alternatives to distribute flows on a road network according to traffic demand. The potential improvement in flow that can be achieved from such an approach depends not just on the efficiency of the method applying the control on trip paths but also depends on the size and the topology of the networks in relation with zone to zone trip demand, which determine the degrees of freedom on the network.

Apparatus and method to apply control, which efficiently may coordinate paths on the network, should preferably use predictive control requiring simulation runs applying traffic models in order to enable controllable traffic predictions. In this respect, a prediction based on traffic simulation include in addition to traffic models related effects also effects of controlled set of planned paths, performed in a prior control cycle (which may refer hereinafter also to a control phase) or a sub-cycle (which may refer hereinafter also to a sub-phase), provides feedback to refine a set of planned paths by a subsequent control cycle or a sub-cycle.

Refinements might be crucial with non-linear system in which planning of paths by a control cycle or sub-cycle can't fully anticipate the real time traffic development by synthesized traffic for a network even though a controlled prediction is used. Although this is a simplified description to explain the need for model predictive control for controlling trip paths, it yet highlights the issue.

With such approach, simulated traffic flow predictions based on realistic models, including but not limited to statistical, physical, behavioral models, as well as traditional control such as traffic lights control plans, are used as a platform for controllable traffic predictions to support a predictive control which should dynamically coordinates routes associated with trips. The result of the coordination tends to balance the traffic load on the network, and which coordination is preferably applied through DNAs used either by drivers or by autonomous vehicles.

In this respect, the method, the functionality of apparatus and/or system that apply predictive control on paths of controlled trips according to traffic model based simulated predictions in a finite time horizon, preferably the control applies coordinate paths to path-controlled trips, may be divided into system layers which are elaborated with further description of embodiments of the present invention. A system that applies such control may refer hereinafter to a path control system applying predictive path control to controlled trips.

The term path control refers to predictive path control in terms of model predictive control which is applied by a path control system, and which system is preferably aimed at coordinating path controlled trips on the network in order to generate and maintain traffic load balancing on a network under objective constraints (e.g., road network, traffic conditions, behavior of drivers and traffic lights/signals) and subjective constraints (e.g., fairness in assignment of routes to trips). The term preferably was used with respect to coordination of path controlled trips, by path control, due to a need to distinguish between conditions on the network which require special coordination processes, in addition to feedback about anticipated effects of paths on the network, and conditions for which special coordination might be redundant.

Conditions that need coordination may be characterized by a possibility that non-coordinated paths of trips may cause, at an extreme case, local traffic congestion and, at a non-extreme case, interferences which slowdown traffic flows.

Under such conditions the need for coordination should be considered on the scale between must to have, in order to prevent traffic congestions at extreme conditions, and nice to have in order to improve traffic flow on the network at non extreme conditions. Example for an extreme case is high percentage of path controlled trips usage on the network. An example for a non-extreme case is low percentage of path controlled trips usage on the network wherein such percentage may still be a cause for local slowdowns in the traffic flow, if coordination is not applied with path controlled trips.

However, there are conditions in which coordination might be redundant while significant traffic exists on the road, for example, when the percentage of path controlled trips is so small, and sparsely distributed on the network, that lack of coordination is not expected to be a substantial cause for reduction in the level of the traffic flow on the network. In such conditions, path control may also refer to non coordinated planning of paths for path controlled trips, while still using controlled predictions as feedback for further non coordinated planning of path controlled trips. In this respect, the path control enables to correct paths of path-controlled trips according to feedback from a controlled prediction that includes the effect of non coordinated planned paths performed with a prior path control cycle.

Therefore, the term path control may refer to coordinating or to non-coordinating path control while, by default, coordinating path control should preferably be applied to produce path controlled trips that tend to be converged to coordinated paths by coordinating path control, wherein under non-feasible full control it may at best produce substantially coordinated trips.

Dynamic assignment of paths for a path-controlled trip, under coordinating path control, reflect from a point of view of a vehicle the effect of ongoing control which tends to coordinate controlled trips on the network according to current traffic and controlled traffic predictions.

As further described with methods used to apply path control, robustness of feedback from controlled prediction performed by traffic models—which increases with the increase of the percentage of path controlled trips usage in the traffic—leads to preferably apply coordinating path control under incentives provided for usage of path-controlled trips by drivers and/or autonomously driven vehicles. As a result, higher benefit from improved traffic, due to a more controllable and more robust control, is obtained.

Coordination of path controlled trips may be considered to some extent as cooperative coordination and further in this respect coordination of path controlled trips may refer also to cooperative path control or to coordinating path control. The term—cooperative—may refer in this respect to participation of vehicles in an operation applying path control and which cooperation means obedience of drivers or autonomous vehicles to path controlled trips applied through driving navigation aids. In case of autonomous vehicles—cooperative path control—may apply more robust cooperative path controlled trips as further described.

In this respect, the term robust cooperative path controlled trips may be expanded to include inter-alia activation of cooperative safe driving by, for example, acceptably safe autonomous vehicles.

According to some embodiments, a cooperative operation may in general refer to an operation enabling high utilization of the network capacity and/or safe driving on a network, and which cooperative operation is preferably supported by providing incentives to encourage participation in the cooperative operation. Incentives may preferably be applied at the lowest expense under regulation in order to encourage efficient and safe driving while preserving the possibility of non-cooperative driving to still be allowable. With such approach, the efficiency level and the safety level may be achieved by a potential implementation which is open to market competition. For example, this may be enabled under regulation of regional road tolling, applying free of charge toll or toll discount as a privilege by authorities to encourage a cooperative operation such as coordinating path control service, while the open market competition can be applied through a non government operator as a coordinating path control service on behalf of an authority.

The operator can be a commercial entity, which is expected to provide the most effective solution, applying an operation based, for example, on economically justified benefits from a path control system that can be recognized by authorities. For example, a recognized and measurable benefit is "value of travel time" which can be proved by computer simulation to be saved on the network by the service, and which can be evaluated for example according to the difference between simulation of aggregated trip times on the network before and after activation of path control.

A service provided by a commercial entity may be obtained with time limited exclusive rights in order to leave further competition open to new technological developments.

According to some embodiments, a path control system may be applied for example by the following described breakdown of a path control system into system layers.

A system layer which may generate conditions to apply highly efficient path control is the usage condition layer, which prepares conditions for high usage of driving navigation aids (means) on a network, and which may enable high utilization of freedom degrees on the network by applying predictive control for coordination of paths associated with trips.

Such usage condition layer, according to some embodiments, applies incentives to usage of coordinating navigation aids providing path controlled trips, under coordinating path control, to drivers and/or to navigation dependent autonomously driven vehicles.

With such a layer, conditions are prepared for robust traffic model based predictions, and further for highly efficient coordinating path control, applying model predictive control that uses traffic model based controllable predictions. In this respect, high usage of navigation aids (means) on the network, supported by path control applying predictive coordination of path controlled trips, may enable substantially full control or at least control on a major part of trips on a network. Predictive coordination in this respect may refer to coordinating path control based on model predictive control.

The effect of high usage conditions, generated by the usage condition layer, has a major positive effect on all layers that may preferably support highly efficient and robust path controlled trips as highlighted hereinafter.

Another system layer, which is the traffic mapping layer, is the first layer which utilizes the benefit of high usage of path controlled trips generated by the usage condition layer, enabling the traffic mapping layer to receive position related data generated, preferably anonymously, by high usage of navigation aids.

With such data, high quality traffic information (e.g., flow related) at high coverage can be constructed by the traffic mapping layer according to dynamic positions of vehicles.

Further utilization ability may refer to construction of highly accurate information about demand of trips according to destinations that are originally fed to driving navigation aids in order to get route (path) for guidance along a trip.

With such information, constructed by the traffic mapping layer, a traffic prediction layer may according to some embodiments calibrate at a robust level models used by a dynamic-traffic simulation platform to apply further high quality controllable traffic predictions by the traffic prediction system layer supporting a paths planning system layer which produces by default sets of paths that tend to be converged to coordinated paths under coordinating path control supported by high usage of path controlled trips generated for example by the usage condition layer.

Introductory description of functionality of proposed layers, which may construct a path control system, without elaborating at this preliminary description methods, system, apparatus and detailed aspects associated with each of the layers, is provided with the following sections.

Clarification: Elaboration of processes, which may serve each of the proposed layers, are described further with embodiments of the present invention and are left free to be considered for association with such layers or be in interaction with such layers according to concrete design of a system.

Usage condition layer may refer to a system, methods and apparatus which enable to encourage usage of path controlled trips, and possibly usage of vehicle related functionalities which enable safe driving, or increase the level of safe driving, as well as the use of autonomous vehicles using path controlled trips at a stage in which preferably classification level 4 or possibly level 5, determined by the Society of Automotive Engineers, is acceptably safe. Encouraging usage of safe autonomous vehicles which are using path-controlled trips may have a benefit that is beyond encouraging safe driving by safe autonomous vehicles that use driving navigation aids which can be supported by path control trips.

In this respect, encouraging usage of such autonomous vehicles may have the benefit of reducing the level of non predictive (stochastic) behavior of the traffic on the network and to reduce further the stochastic level of traffic predictions, according to some embodiments, by using traffic predictions based on a traffic simulation in which not just the route choice model of drivers is substituted by path controlled trips, but also driving behavior model(s) of drivers are substituted by predictive driving behavior models of autonomous vehicles including predictive driving interaction models of autonomous vehicles with static and dynamic objects. Further benefits to encourage usage of acceptably safe autonomous vehicles are described with further description of the invention in different places.

According to some embodiments, the usage condition layer applies said encouragement by providing incentives with a road toll charging approach, enabling to provide either free of charge toll or toll discount to vehicles to encourage efficient use of a road network and/or more safe driving. With such approach a toll charging center applying tolling and privileged tolling) interacts with:

a) in-vehicles toll charging units (a unit associated with a vehicle) to handle transactions related to privileges provided as incentives, and b) a car plate identification system for inspection, using for example Automatic Number Plate Recognition (ANRP), while enabling discrimination between vehicles which are entitled and vehicles which are not entitled to privileges.

According to some embodiments, encouraging usage of path controlled trips and/or safe driving by in-vehicle functionalities and/or acceptably safe autonomous vehicles is preferably applied by robust privacy preservation of trip details while providing free of charge road toll or toll discount using apparatus and methods described further in more details with described embodiment of the invention.

Privacy preserving toll, under provision of privileges, may reduce in general a major obstacle which may be involved with applying road toll, especially with implementation of GNNS based road tolling concept which tracks positions of vehicles in order to manage entitlement for privileges.

In this respect, applying robust privacy preservation may facilitate acceptance of a concept applying free of charge road toll, and in more advanced stages possibly toll discount, as privilege to encourage usage of path-controlled trips.

According to some demonstrative embodiments, robust privacy preservation refers to in-vehicle apparatus and processes to calculate the amount of toll to be charged according to in-vehicle tracked trip, and according to in-vehicle privileges management to certify entitlement for privilege by communicating with a toll charging center, which communication enables to hide details of tracked trips from a toll charging center.

Toll charging center may refer to usage condition layer and both terms, toll charging center and usage condition layer, may be used hereinafter and above interchangeably According to such embodiments, a certified vehicular toll charging apparatus and processes hide trip details from a toll charging center by sending to a toll charging center data of calculated toll charge amounts with respect to in-vehicle set privilege criteria (free of charge toll or toll discount) without exposing trip details.

Hiding trip details from a toll charging center, rather than applying secured transmission of trip details to a toll charging center, and further investing in prevention of access to such centralized stored data (which is susceptible to suspicious by those who are charged), may reduce negativism to apply tolling which is based on in-vehicle tracking. This is especially valuable when tolling is applied with the aim to encourage efficient usage of the network and possibly safe driving.

In this respect robust privacy preservation eliminates, or at least minimizes, possible negativism to said conditional tolling, since with robust privacy preservation the non-exposure of trip details can be guaranteed or at least an exposure can be under control of the owner of the vehicle.

Conditional tolling under said privilege criteria and hidden trip details from a toll charging center, although may resolve or at least reduce toll issues, it may in case of provision of privileges to usage of path controlled trips raise an issue of a need to obey by a driver to path controlled trips. Such an issue may be reduced to a minor level if the public will be aware of the compensation provided by path controlled trips to drivers and of alternatives.

The compensation for using path controlled trips may include high travel time savings, gained by the contribution of path controlled trips to traffic dilution, as well as contribution to an ability to avoid, or at least to postpone the need for applying traffic dilution by dilution of demand for trips using road tolling.

In a postponed case, that is, when applying toll in conditions where path controlled trips are already applied and there is a need for further traffic dilution, then lower toll prices should be expected to gain the same traffic flow improvement on the network in comparison to a case where the toll is mainly responsible for the traffic dilution. This potential benefit is an additional result from high usage of path controlled trips.

As mentioned before, said tolling privileges, enabled by the usage condition layer, may include privileges provided to usage of elements which contribute to safe driving. In this respect, the objective to apply high usage of autonomous vehicles in order to improve safe driving within cities, may need inter-alia to reduce reaction of autonomous vehicles to human driving behaviors and in the future to eliminate such a need. Reduction or elimination of a need to react to different human behaviors by autonomous vehicles may enable more anticipated and therefore more controllable interaction among vehicles. By encouraging usage of automated driving, enabled by autonomous vehicles, while using said privileges to encourage automated driving, may contribute to more effective cooperative and as a result more safe driving on road networks. In this respect, encouraging automated vehicle driving may facilitate the development of high usage of autonomous vehicles with respect to classification levels 4 and 5, determined by the Society of Automotive Engineers, to which usage condition layer may highly contribute by non full compulsory approach.

Further to the above mentioned contribution of an active usage condition layer, crowd sourcing may be generated by such an approach, enabling to contribute to additional safe driving aspects which may refer to robustness of real time mapping of dynamic environment surrounding vehicles. In this respect crowd sourcing may enable autonomous vehicles to contribute to rapid mapping of changes in deployment of fixed object, such as a signpost and parking vehicles, as well as to rapid mapping of dynamic object such as vehicles and passengers.

In this respect, mapping of a signpost, for example by the support of a central mapping system, may take benefit of crowd sourcing due to an ability to use multiple measurements, generated by multiple vehicles, and to fuse such measurements preferably according to relative weights corresponding to ambiguities in the measurements performed by different sensors of different vehicles using for example weighted least squares.

Crowd sourcing may also be used by encouraging usage of autonomous vehicles for more robust mapping of relative locations of vehicles surrounding the location of an autonomous vehicle, which mapping might be most valuable with autonomous driving of vehicles with respect to dynamic changes in the vicinity of a vehicle. In this respect, under conditions in which vehicle to vehicle data communication is applied, each vehicle may use its sensor related measurements to estimate relative distance of surrounding vehicles in addition to complementary measurements generated by neighbor vehicles, and accordingly to improve its measurements. The approach to improve accuracy may use fusion of multiple source measurements by a single vehicle to determine dynamically relative distance and locations according to relative weights corresponding to ambiguities in the measurements performed by different sources using for example weighted least squares.

Furthermore, a usage condition layer applied with tolling privilege criteria to encourage cooperative safe driving as described above, may also enable to contribute to lower classification levels than said level 4 or 5, by providing privileges to usage of Advanced Driver Assistance Systems (ADAS). Under usage of path-controlled trips expanded with usage of ADAS, efficient and more safe driving may be generated at the same time on the network.

According to some embodiments, conditional tolling functionalities may be applied by a dedicated vehicular toll charging unit, a toll charging center and respective fixed car plate identification infrastructure using Automatic Number Plate Recognition (ANRP), or alternatively for example, by upgrading apparatus and respective processes of an on-board unit of a GNSS tolling system (known also as GNSS toll pricing), as well as respective processes of a GNSS tolling center to apply said robust privacy preservation communication between the vehicular device and the tolling center.

With respect to robustness, the upgrade may enable to manage road toll privileges that hide trip details from a toll-charging center.

GNSS tolling which may refer in general to in-vehicle tracking for road tolling is not conceptually limited to vehicle positioning by GNSS. in case of autonomous vehicles, positioning may possibly use in-vehicle sensor(s) based localization on maps, or use vehicle positioning by in-vehicle GNSS receiver which may be used to complement localization by initial coarse GNSS positioning of an autonomous vehicle.

Traffic mapping layer, may refer to a system, apparatus and methods which map dynamic traffic information, generated by remote data sources in order to support higher level layers of a path control system. The higher level layers of the path control system, which are supported by said dynamic information, are the traffic prediction layer applying traffic predictions and the paths planning layer applying calculation and assignment of path controlled trips.

According to different embodiments the reception of data and the mapping of said dynamic information on a stored road map may fully be applied by a traffic mapping center, or be shared by the traffic mapping layer with relevant supported system layers and/or a system which is an external system to the path control system.

Under active usage condition layer, a major part of the dynamic information mapping needs relatively marginal effort to be constructed in order to serve said high level layers, which may reduce the functionality of the traffic mapping layer to a basic level.

The dynamic information to be received and mapped in this respect may include under active usage condition layer:

1. Dynamic positions transmitted by vehicles using path controlled trips, which under high usage of path controlled trips positions associated with path controlled trips construct the most complete traffic information, enabling to apply further robust traffic predictions by the traffic prediction layer and to calculate accordingly paths for path controlled trips by the paths planning layer. The higher the share of known positions of vehicles on the network, the lower is the processing effort required to estimate unknown positions and the higher is the ability to guarantee more robust path planning according to more robust traffic mapping and traffic predictions. Dynamic traffic information related data, received by tracking positions of vehicles using path controlled trips and mapping such data by repositioning such vehicles on a road network map (to be used by a traffic simulator for traffic predictions), may serve both traffic prediction and paths planning layers. In case that the traffic information is constructed by the absolute majority of the vehicles in the traffic or even by most of the vehicles in the traffic on a mapped road network, under an active path usage layer, then a complex non sufficiently reliable construction of positioning of vehicles on a road network map, which is required in order to adjust a traffic simulation platform according to current traffic when there is lack of positioning related data, may be saved. Receiving position related data from vehicles should preferably be performed anonymously, wherein the term anonymously may refer to an ability to receive messages from vehicles using path controlled trips which avoid their identification, while enabling each of such vehicles to use a unique non identifying characteristic during a trip in order to further enable control on trips according to such non identifying characteristic.

2. Dynamic positions of vehicles using known non-flexible routes, transmitted by in-vehicle apparatus or from a center which tracks such vehicles (e.g., bus having predetermined route usually with a plurality of bus stops). Such positions which are associated with a predetermined path on a road network (with bus stops if vehicles are busses), may preferably be received and mapped for redistributing their positions on a road network map to be used to simulate traffic predictions by the traffic prediction layer. Under high usage of path controlled trips, preferably generated by active usage layer, such non flexible route related positions may enable to complement flexible route related positions to adjust the conditions of a traffic simulation platform to apply further robust traffic predictions. Receiving data related to vehicles using non flexible routes may be performed anonymously, preferably within the communication apparatus between a path control system and vehicles and/or between path control system and said centers tracking such vehicles. With respect to vehicles having non-flexible routes, distinguishable scheduled activation of a trip may be used for example as a non identifying characteristic.
3. Dynamic destination related to position pairs, transmitted by vehicles at first with requests for guidance (route) according to path controlled trips and further with updates of their positions with respect to destinations, to be used with the paths planning layer in order to apply calculation of paths that produce accordingly and according to controllable traffic predictions preferably coordinated sets of paths for vehicles using path controlled trips. Origin to destination pairs of path controlled trips may be stored and used in conjunction with historical position to destination pairs to map and predict zone to zone trip demands in order to apply traffic predictions by a traffic simulation platform used by the traffic prediction layer. Dynamic zone-to-zone demand prediction is preferably performed in conjunction with historical position to destination pairs of requests for trip, preferably path controlled trips, to apply accordingly more accurate traffic predictions according to, for example, classes of vehicles (e.g., passenger cars, trucks, etc.). Demand, which refers to position to destination pairs, is initiated typically by feeding through a driving navigation aid a destination while the respective position is generated by an in-vehicle positioning aid such as a GPS receiver which might be part of the driving navigation aid. In case that prescheduled trips are also applied with a path control system, then prescheduled position to destination pairs of a trip may be associated with prediction of zone-to-zone demand. According to some embodiments, demand related mapping may be applied by the traffic prediction layer.
4. Dynamic events which may affect the development of demand of trips, which should preferably be used to improve a zone to zone demand prediction model for further traffic predictions performed by traffic simulation used with the traffic prediction layer. Such events (e.g., destination time and place of a football game) may be transmitted to a path control system, for example by a server of an entity or an authority that are handling updates of such events, using server-to-server communication.
5. Dynamic structure changes in a road network, transmitted for example using server to server communication in which the server which transmits updates is a server of an entity or an authority handling dynamic mapping of road networks. Such updates should preferably update changes including capacities of links on the road network used by the traffic prediction layer and by the paths planning layer.
6. Dynamic changes in capacities on network roads, for example, road maintenance, obstacles such as interfering parking, etc., transmitted for example using server to server communication in which the server which transmits updates is a server of an entity or an authority handling such dynamic data. Such updates should update the capacities of links on the road network map used by the traffic prediction layer and by the paths planning layer. Changes in capacities may further or alternatively be discovered by mapping dynamic positions of tracked vehicles, using for example dynamic positions to the path control system, as mentioned in 1 and 2, discovering irregularities in traffic flows by mapping accordingly bottlenecks/obstacles on links of a road network. If there are not sufficient vehicles to discover directly the irregularities, then state estimation methods can be used, subject to sufficient knowledge about the input flow to a link, while capacity related corrections are made in which case to sections of lanes on links from which a link should preferably be constructed if applying such approach.
7. Dynamic changes in traffic control, for example, traffic light plans, sign posts, and variable signals. Such updates are transmitted to a path control system for example by a server of an entity or an authority handling such dynamic information and should preferably be used with the traffic prediction simulation platform associated with the traffic prediction layer.

Dynamic current traffic flows and queues might be valuable to be mapped, for example according to tracked positions mentioned in 1 and 2 above, in case there would be a need to complement missing data to adjust initial conditions for simulated traffic predictions, for example missing data of demand of trips which can be discovered by a state estimation method using traffic flows and queues. Discovering demand data through traffic related data is a an approach which may preferably be considered under low usage of driving navigation aids by drivers, and which is expected under such conditions to be supported by external sensor infrastructure to map traffic flows in order to apply a state estimation process.

In general the problem may relate to a high dimension joint or dual state and parameters estimation by and for non linear time varying and stochastic traffic models. However, under non perfect but sufficiently effective usage condition layer, in which there is rich but not complete information about trips on the network, there is a possibility to estimate missing data with lower complexity. This may be effected by the sufficiently known data, which known data may relate to demand of trips and to model parameters of a traffic simulation platform, as well as to traffic data constructed according to current traffic flows mapped by tracked positions mentioned in 1 and 2 above, in order to adjust (calibrate) the traffic simulator for traffic predictions.

In this respect, the traffic mapping layer may apply the traffic flow mapping while the state and parameters estimation which uses and prepares traffic simulation for traffic prediction is suggested to be performed by the traffic prediction layer.

Under such estimation, constraints of known mapped demand, mentioned in 3 above, and traffic flow mapped according to 1 and 2 above, as well as according to known/planned paths of trips on the network and other mapped/known data mentioned up to 7 above, may be used to enable to discover more robustly missing demand data and parameters of traffic models used with traffic simulation.

With respect to traffic mapping layer, data from fixed deployed sensors or any other external system can also be received from external system servers. Such data may refer but not limited to traffic flow related data generated by road or roadside sensors and/or position related data and/or demand related data, and/or velocities related data, and/or queues related data, and/or traffic related events.

According to some embodiments, updates about road maps and/or signposts and/or positions of vehicles and/or traffic related information, may be received from an external system such as a system which generates high resolution road maps for, and possibly by, autonomous vehicles and/or a system which tracks position of vehicles and/or a driving navigation system service (for example a commercial navigation service such as provided by a company such as Waze), and which driving navigation system and autonomous vehicles are preferably served directly or indirectly by a path control system.

Communication of path control system layers in general, and the traffic mapping layer specifically, with vehicles and external servers may use according to some embodiments Internet apparatus and with respect to vehicles Internet supported by mobile communication.

Tracked positions associated with path controlled trips may either be received by a path control system with respect to the traffic mapping layer through a push process activated by vehicles, or if there is expectations for data communication overloads then a pull process can be activated, for example, by the path control system according to IP addresses which were activated by vehicles and identified by the relevant process in the path control system.

Initial position to destination pairs associated with request for a path controlled trips, as well as tracked positions during a trip, may be transmitted by vehicles or by a navigation service system using a push process to a path control system.

Information received from an external system should preferably use server to server communication and may preferably use a push process.

Traffic prediction layer may refer to a system, apparatus and methods which include two stages, a prime stage aimed at preparing (calibrating) a traffic simulation platform for prediction according to current traffic and preferably demand of trips related data, and a subsequent traffic prediction stage, based on the prime stage, in which prediction of demand of trips (usually statistical prediction) provides the predicted entry events into the network according to which the simulated traffic models of the simulation platform predicts traffic development on the network. In this respect past trip related demand is used to predict zone-to-zone demand of trips by, for example, time series analysis related methods and more advanced methods such as further described.

Beside the theoretical potential of traffic simulation platform which uses traffic models to enable higher quality of traffic prediction in comparison to statistical based methods, there is a further need to which traffic simulation may contribute which refers to a need for controllable predictions enabling to apply model predictive control with path controlled trips. In this respect, model predictive control enables to apply a control process which evaluates according to simulation of traffic prediction the effect of planned paths on a road network along a finite time horizon, in a rolling time horizon, and accordingly (according to feedback) make corrections to the planned paths preferably before applying assignment of paths to vehicles.

Controllable predictions in this respect synthesize traffic development according to control inputs which in this respect are planned (calculated) paths to be evaluated for path controlled trips performed according to some embodiments by a paths planning layer as further described.

A simulation platform may preferably use Dynamic Traffic Assignment (DTA) simulation platform, which models traffic by synthesizing acceptable real behavior of the traffic. Typical DTA simulators are used in the field of transportation mainly for transportation planning, and are the closest means to enable to apply predictive control for path-controlled trips. However, current DTA simulators are yet limited to cope primarily with typical traffic simulation and not with concrete real time traffic, despite of using on-line calibration to adjust the simulator to simulate the closest traffic to real time traffic according to real time traffic data. This limitation is a result of simplified models used with such simulators, satisfying to cope with typical stochastic behaviors of traffic for transportation planning, and therefore limits the ability to calibrate at low time resolution the traffic models for real time according to traffic information (which limited quality of traffic information makes the issue worse). In this respect, the issue increases with the increase in the size of the road network and with the increase in the dynamics of traffic on the network.

In order to overcome such real time related deficiencies there would be a need to encourage usage of path-controlled trips, for example, by the usage condition layer, which enables to reduce or even to eliminate the high dependency on stochastic behavior models associated with a DTA simulator. A further need in this respect would be to upgrade DTA simulators to be applied with predictive control to include, for example, cooperative safety behavior of autonomous vehicles, reaction to variable traffic signals, Intelligent Transportation Systems (ITS) infrastructure, Cooperative ITS (C-ITS) infrastructure, etc.

Typical DTA simulators are comprised of several models, which are grouped into two categories, namely a Demand Model and a Supply Model, wherein different DTA simulators have different accuracy levels, and which said models may include but not limited to functionalities with respect to:

A Demand Model which divides the network into zones among which trip pairs are assigned, expanded by a prediction model for zone to zone demand of trip pairs, and which Demand Model is applied with respect to non controlled trips on the network, for which there is no direct way to know their positions and destinations, and is applied for different classes of vehicles. A demand prediction model, which expands a basic Demand Model enables in real time to predict the demand according to past demand data and possibly also according to historical data, may apply statistical prediction models and possibly pattern recognition methods. A more advanced Demand Model may include demand control models such as can be applied by road toll and early/late trip departure recommendations for trips and which such models may be associated with a demand prediction model.

A Supply Model which models network traffic flow development and which may include sub-models for, but not limited to, road network characteristics at a level of link lanes, intersections, etc., predetermined routes (e.g., buses) and route choice model for the non controlled paths (non path controlled vehicles possibly according to classes of vehicles), traffic control means and their plans (such as traffic lights and variable signals), and, with high resolution DTA also intra link related traffic model (e.g., lane change behavior, car following behavior) A more advanced DTA Supply Model, which may expand a typical Supply Model used with road and transportation planning to support real time traffic predictions, should preferably include, according to available infrastructure, vehicle to vehicle communication effects considered to be applied with autonomous vehicles and/or with Cooperative Intelligent Transportation Systems effects on current and developing traffic. Despite of the potential benefits from a high resolution DTA, such DTA advanced simulators might not be sufficiently exploited at real time if massive positioning of vehicles at high resolution may not be applied (may not enable to simulate traffic at high resolution based on on-line calibration of a traffic simulation platform according to traffic data). In this respect, high usage of path controlled trips, which can feasibly be applied under active usage condition layer, applied for example with autonomous vehicles using sensor based high resolution localization on road maps and preferably path controlled trips, preferably applying predictive driving behavior model(s) with a DTA simulator such as driving behavior model(s) of autonomous vehicles, may enable to utilize at the highest level high resolution Supply Models at substantially real time—producing more accurate traffic simulation of current traffic at substantially real time and more accurate traffic predictions.

The most robust DTA based traffic predictions may be applied under conditions in which most of the traffic is generated by autonomous vehicles using with the Supply Model of a DTA predictive behavior driving model(s) of autonomous vehicles including vehicle to vehicle communication effects if applied, that is, to simulate predictive motion of vehicles and predictive interactions among/between vehicles by the DTA Supply Model according to driving behavior model(s) applied by autonomous vehicles.

Under active usage condition layer, which encourages usage of autonomous vehicles, applying such approach may accelerate the ability to apply further robust DTA based traffic perdition by a model predictive control approach enabling to produce robust path controlled trips. Robust path controlled trips preferably refer to path controlled trips under a control of a path control system which apply predictive path control to coordinate path controlled trips. The introduced term predictive path control is actually coordinating path control (mentioned above and hereinafter), and both terms, predictive path control and coordinating path control, may be used interchangeably whether autonomous vehicles or other vehicles are referred to these terms.

Since a traffic prediction requires simulation at a rate which is higher than real time, there is a benefit to use parallel computation with a DTA Supply Model to simulate motion of autonomous vehicles on a road network by, for example, by network decomposition as well as applying parallel computation by agents to simulate motion and interaction of autonomous vehicles with static and dynamic objects according to models, wherein each agent may simulate one or more vehicles according to available computation power for acceptable traffic prediction performance.

Adjusting a DTA simulation platform according to real time traffic data by said prime stage (on-line DTA calibration stage), without tracking positions of the vast majority or even most of the vehicles, is a complicated task for a city size road network. The issue becomes worse under conditions in which very limited data about traffic and demand is available and which issue further increases with the increase in the size of the city. Such conditions are expected to be typical, while usage condition layer is not applied, without an ability to map traffic at high resolution by relatively low cost floating car data.

In this respect, as further elaborated, the issue of joint/dual estimation of demand and model parameters by the prime stage (on line DTA calibration at substantially real time) is difficult. This is due to a high dimension problem which non linear stochastic and time varying DTA Supply Model makes a robust prime stage solution, or even close to robust solution, infeasible for city size road networks even though very high performance computing (super computer) considered with current technologies is used.

However, under applied usage condition layer while path control is applied, high usage of path controlled trips is expected to be generated on a road network enabling to provide high quality traffic related data source from vehicles for dynamic mapping of traffic flow and trip demand (tracked positions with respect to their destinations) as well as making the stochastic route choice a negligible issue. Under such conditions, adjusting the traffic simulation platform by a said prime stage to simulate substantial real time traffic according to substantial real time demand is an issue that can be resolved by sufficient available communication and acceptable computation resources.

According to some embodiments, traffic and demand related data are mapped by the traffic mapping layer, as described above, and traffic prediction layer servers receive such data from the traffic mapping layer servers, either by server to server communication or through a common storage handled possibly by a common database server.

According to some other embodiments, the traffic prediction layer applies the demand related data mapping (position to destination pairs and respective zone to zone demand assignment) which may include receiving demand related data, originated by vehicles using path controlled trips, directly through communication means or indirectly through the traffic mapping layer which interacts with the vehicles.

In case of high usage of path controlled trips, generated for example by the usage condition layer, conditions to generate authentic (rather than estimated) current demand is enabled, using in vehicle data related to path controlled trips. Demand along a past period of time, enabling to predict zone to zone demand, may be mapped according to positions and destination pairs originated with requests for path controlled trips and complemented by estimation of non controlled trips demand, while estimation of non controlled trips demand by the prime stage, under active usage condition layer and path control, becomes at worst case marginal and at the best case redundant and, in any case, robustness of the demand can be achieved at a level which is incomparably higher than the estimation level which might be achieved under non encouraged usage of path control trips generated for example by a usage condition layer.

Under encouraged path control trips usage, positions of vehicles using path controlled trips on the network may also be gathered and the rich gathered data drastically simplify the prime stage (on-line calibration of the simulation platform by said calibration and estimation stage). This is a result of an ability to substantially map dynamic distribution of real time positions associated with known planned paths of the vehicles on a DTA simulator network. As mentioned with the traffic mapping layer, with such approach there would still be a need either to calibrate or to update the flow conditions on the network for obstacles with which there is no communication (interfering parking of non connected cars or other obstacles on roads) which may discovered indirectly by state estimation methods, or to directly detect reaction of vehicles to obstacles on roads (bypassing obstacles) preferably according to consistent reaction (e.g., non usage of a lane at a certain part of a link by a plurality of vehicles).

Preferably the position as well as respective destination related data are gathered by method(s) enabling anonymous transmission of data from vehicles to a path control system in order to maintain privacy of the source of data in conjunction with anonymous assignment of path controlled trips to vehicles.

Another advantage of high usage of path controlled trips, with respect to DTA based traffic predictions, is the ability to use high quality DTAs which under joint/dual demand and parameters estimation might not be feasible to be used in substantially real time. In this respect, low usage of path controlled trips compels a need to apply calibration and estimation by the prime stage using dual or joint state estimation which is a highly consuming task with respect to computation power for high dimension demand and non linear supply model even for a case of a non high resolution DTA and which issue increases with the stochastic route choice model of a DTA and size of the road network.

Based on adjusted traffic and demand models, effected at the prime stage, traffic prediction is performed by the DTA demand and supply models according to predictions made first to the demand model. Prediction to the demand can use for example time series analysis. To overcome non linear effects in the demand, for example, entries to a network effected by varying traffic conditions, the time series analysis may be supported, for example, by historical patterns to substantially linearize time series processed data and performing time series analysis on the differences between similar historical and current patterns.

Interaction of the traffic prediction layer server(s) with the traffic mapping layer server(s) and with the paths planning layer servers may be applied by server to server communication or through a common storage (database server(s) of for example client/server N-tier architecture).

According to some embodiments, such approach may enable the traffic layer, to interact with external server(s) in substantially real time in order to receive traffic control related updates to be applied with a DTA supply model, for example, traffic lights control plan and changes in the deployment of traffic lights, signposts, and variable signals/signposts, and which such server may, for example, be updated by, or on behalf of, authorities.

According to some embodiments, an update about exceptional event (e.g., a football game), which may be added to traffic control related updates, may enable further to improve demand predictions, for example with the support of similar event related historical flow pattern(s), and be handled through a server through which the traffic prediction layer may receive such data.

Paths planning layer may refer to a system, apparatus and methods which apply planning of paths to produce path controlled trips.

As mentioned above, path control may refer to coordinating and non coordinating path control, wherein the coordination approach is a-priori the preferred approach to be applied if it may contribute to non negligible improvement in the traffic on a road network.

Predictive path control which applies non coordinating path control is mainly applicable to very small percentage of non coordinating path controlled trips that may have acceptably small enough mutual potential interference. The planning of paths for non coordinating path control trips is performed according feedbacks from controlled traffic predictions which indicate on the potential effects of planned paths and accordingly planned paths may be corrected with the aim to improve travel times. In this respect a controlled traffic prediction, according to a simplified description, applies for a time horizon in a rolling horizon by dynamic traffic simulator that is fed by planned paths for current and predicted path controlled trips and by current and predicted paths associated with route choice model for non controlled traffic. The planning of paths is a simple reaction to time dependent travel time costs according to simulated feedback, performing shortest path calculations according to the travel time costs.

As said before, implementation of non coordinating path controlled trips may mainly be considered as a theoretical solution for small percentage on the network, while in reality a further major difficulty to implement robust on line calibration and traffic predictions, for a large networks, disables such approach to provide robust solution even for small percentage of path controlled trips.

Predictive path control which applies coordinating path control is aimed at putting no limit on the percentage of usage of path controlled trips on the network while enabling to implement a robust solution for very high percentage of path controlled trips on the network. With such approach additional aspect of planning coordinating paths for path controlled trips is applied. In this respect, the paths planning layer interacts with the traffic prediction layer, constructing coordinating control cycles (phases) and possibly sub-phases (iterations) as further described in more detail with some embodiments. Each cycle (phase) or sub-phase includes traffic prediction, performed by the traffic prediction layer, and calculation of a set of paths by the paths planning layer, wherein traffic prediction performed by the traffic prediction layer uses a prior set of paths calculated by a prior control cycle, or sub-phase (iteration), as an input to the supply model of a DTA simulation platform which performs the current traffic prediction.

According to some embodiments, predictions in this respect enable to evaluate the effect of the recently calculated set of current and predicted paths for path controlled trips on the network and which such effect provides feedback to a subsequent cycle or a sub-phase (iterations) of a cycle enabling a further cycle or a further sub-phase (iteration) of a cycle to further improve the traffic flow.

According to some embodiments, sub-phases (iterations) of control cycles may be distinguished from control cycles by being less sensitive to re-calibration of a DTA and demand estimation stage in the traffic prediction layer in order to perform a new set of paths, and therefore re-calibration might not necessarily be a need with each sub-phase or even with all sub-phases within a cycle (phase). The objective of a control cycle or sub-phase is to refine prior set of calculated paths under the assumption that recalibration during a control cycle may have lower benefit in comparison to the benefit to perform higher number of refinements to the set of paths.

Refinements are expected to be required with a non linear system in which the effect of calculation of a set of paths by a control cycle can't fully be anticipated due to path calculations which will be effected by a non linear system prediction. Therefore, according to some embodiments there would be a need to evaluate calculated effect according to a controlled prediction and accordingly consider using further an iterative process to refine the set of the paths, by control sub-phases, which may enable to improve volume to capacity ratios for traffic load balancing on the network.

Coordinating paths associated with trips on the network may enable to exploit the potential of freedom degrees on the network to improve traffic flow through path-controlled trips provided to driving navigation aids (associated with guidance means) to guide drivers or autonomous vehicles during trips towards their destinations. Such a path planning layer may prevent or at least reduce potential interferences in the traffic which may be a result of uncontrolled or poorly controlled attempts of guidance of vehicles to take benefit of traffic predictions without coordination among trips, and which such functionality is mandatory with an implementation of a high usage of navigation aids generated for example by a usage condition layer. In this respect, high usage of path controlled trips under coordinating path control may not just be able to prevent loss of control on the traffic but also be able to exploit the capacity of a network to best serve given demand for the highest traffic flow enabled on the network. Nevertheless, even with low non-marginal usage of path control trips the contribution of coordination is not negligible, and should be considered as well with such a case under the limit of an ability to take benefit from control under stochastic and non sufficiently robust predictions due to limited usage of path controlled trips.

The benefit from high usage of path controlled trips under coordinating path control is expected to be high, since the traffic becomes highly controllable and the simulated predictions can potentially be robust due to high potential knowledge about the initial conditions to run traffic predictions by a DTA simulation platform and high potential knowledge about the route choice on the network performed by path controlled trips and about positions of tracked vehicles using path controlled trips.

With such traffic coordination approach, there is a need to consider beyond a need to apply anonymously path controlled trips, the need that a set of controlled paths will be calculated on a fair basis, that is, to take into consideration that paths which may sacrifice time of a trip or part of a trip, for the benefit of improving average trip times on the network, otherwise potential usage of path controlled trips may be discouraged. Therefore, convergence towards coordination of paths should be sensitive to fairness constraint and be handled anonymously in order to be widely acceptable. That is, coordination of paths should preferably consider that from a point of view of drivers (and/or passengers) the interest should be a-priori not sacrificing their own interest for the interest of others in order to improve the performance of path control on the network.

To summarize the above, the paths planning layer is the top layer of a path control system which preferably calculates coordinated sets of paths aimed at progressively being adapted dynamically to maintain substantial fair coordination of paths under non linear time varying conditions, with the objective to maximize traffic flow by assigning preferably coordinated sets of paths to path controlled trips.

According to some embodiments, the layers of a path control system are applied as applications on application servers of for example a modified client/server N-tier architecture to support real time related requirements associated with traffic control or another architecture according to convenience.

Common communication apparatus and methods may serve direct interaction of layers with external servers and/or vehicles. For example, the usage condition layer may interact with vehicles and with car identification system (using for example Automatic Number Plate Recognition—ANRP) through web servers.

According to some embodiments, under real time constraints, layers of a path control system which may be applied, for example, as applications in a model such as an improved client/server N-tier architecture to support real time requirements or another architecture, are not restricted to use traditional protocols of such architecture. In this respect, an improved client/server N-tier architecture should preferably be improved by efficient methods to handle under real time communication constraints, more efficient protocols such as, for example, WebSocket or http/2 supported by WebSocket or at least by SSE, or UDP preferably supported by WebSocket or at least by SSE, or according to tight real time constraints using other methods enabling to make real time constrained communication efficient. Security aspects may further include known methods which for example upgrade of http/2 by TLS.

Communication mediums between vehicles and the traffic mapping layer may include but not be limited to, for example, cellular mobile communication networks and/or Dedicated Short Range Communication (known as DSRC in the field of Intelligent Transportation Systems—ITS), and Internet related infrastructure.

According to some embodiments, the communication apparatus could serve any single layer of a path control system separately, that is, supporting either all the layers used by a path control system or part of them which are served by such apparatus.

In this respect a paths planning layer for example may receive position to destination pairs, originated by drivers through a driving navigation aid, enabling accordingly planning paths for path controlled trips and further transmit such paths to respective vehicles which are using path controlled trips. Similarly, the usage condition layer may interact with vehicles enabling to handle toll charging and toll privileges.

With such or with another possible architecture, there is also a flexibility to expand the interaction of path control system layers with external systems and servers which may provide supporting data to the path control system.

According to some embodiments, an example that may present the described approach, whether by applying the above-described layers or just by applying said functionalities associated with such layers and/or with further described embodiments of the present invention, may comprise:

1. A method and a system according to which conditions to improve traffic flow on a road network are encouraged by encouraging directly or indirectly usage of vehicles having in-vehicle driving navigation aids which interact with drivers, or with driving control means of autonomous-vehicles, to guide trips of vehicles according to path controlled trips. Such method and system comprise:
   a) receiving by an in-vehicle driving navigation aid data for dynamic path assignments,
      wherein a said vehicle may include possibly an autonomous vehicle classified as level 4 according to the Society of Automotive Engineers and/or,
      wherein a said vehicle may include possibly an autonomous vehicle classified as level 5 according to the Society of Automotive Engineers and/or,
      wherein path controlled trips are possibly tending to be coordinated by dynamic assignment of paths performed by coordinating path control and/or,
      wherein traffic on the network possibly tends to converge to traffic load balance and/or,
      wherein a DTA simulator is possibly used with traffic predictions preferably for coordinating path control and/or, wherein the DTA simulator includes models of motion of autonomous vehicles on roads and interactions of autonomous vehicles with other vehicles on roads and/or, wherein gradual coordination is possibly applied by determining current highest priority links, which negatively contribute to traffic load balance, subject to a given computation power applying gradual coordination and/or, wherein dynamic assignments of paths are possibly used with processes of coordination control iterations and/or, wherein coordination control phases possibly apply fairness related processes applying non travel time related discrimination among assigned path controlled trips and/or, wherein processes of coordination control iterations are possibly used in addition to coordination control cycles, b) tracking by in-vehicle apparatus the actual path of the trip, c) comparing by in-vehicle apparatus the tracked path with the path complying with the dynamic path assignments along a trip, d) determining by in-vehicle apparatus the privilege, entitling usage of the assigned path, according to predetermined criteria for the level of the match determined by the comparison, e) transmitting by in-vehicle apparatus privilege related transaction data which do not expose trip details, f) handling by a toll charging center privilege related transaction according to predetermined procedure
wherein said privilege is possibly free of charge road toll and/or,
wherein said privilege includes possibly discount in charged road toll.
wherein an entitlement for privilege include a criterion according to which travel on certain predetermined links requires that a trip will be stopped for a minimum predetermined time.

2. A method and system according to which improved safe driving on a road network is encouraged by encouraging usage of in-vehicle safety aids Such method and system comprise:

a) tracking by in-vehicle apparatus the actual use of a said safety aid along the trip,
wherein safety aids are possibly cooperative safe driving aids enabling to improve a single in-vehicle measurement of a safety driving aid by in-vehicle fusion of the in-vehicle measurement with one or more respective external measurements performed by other one or more other vehicles and received by a vehicle fusion apparatus through vehicle to vehicle communication d) determining by in-vehicle apparatus privilege related data for usage of said safety aid according to predetermined criteria entitling privilege for the level usage,
wherein said privilege possibly applies free of charge road toll and/or
wherein said privilege possibly include discount in charged road toll and/or
wherein privilege provision refers to usage of both safety driving aids and path controlled trips c) transmitting by in-vehicle apparatus privilege related transaction data which do not expose trip details.

At this point, before further description provides more details about embodiments of the present invention, it would be recommended to review by the reader the described drawings of the present invention.

The figures, described hereinafter, refer to apparatus methods and functionalities which cover some aspects of described embodiments and which intend to provide a skeleton which puts in context functionalities and interrelation among functionalities at a level which facilitates the understanding of textual description. Textual description may cover more functionalities and more aspects of the invention than the figures describe. In this respect the figures may not limit textual described functionalities.

In order to provide a consistent skeleton which simplifies interrelated connection among functionalities described in different figures, same numbers were used for the same items.

FIGS. 1a up to 1e schematically illustrate examples of possible implementation alternatives for system configurations and functionalities according to alternative embodiments. The figures provide a simplified description, in comparison to textual description of embodiments, with an objective that the textual description of the figures may be complemented by respective embodiments described in more details in the present invention.

Path control system related figures are illustrated at a level that leaves implementation-flexibility to combine the functionalities comprising the system according to implementation constraints. For example, coordination control processes which may coordinate tasks of a path control system are not part of the illustrated figures. In this respect, path control processes may coordinate tasks performed by different system layers and within system layers. This may for example include but not be limited to synchronization processes which inter-alia: a) coordinate distributed computation performed by path controlled trips associated agents, b) coordinate paths for path controlled trips according to traffic predictions with path planning performed by agents, c) coordinate traffic mapping with on-line calibration of a traffic simulation platform, d) coordinate input and output processes required with a need to enable control on path-controlled trips.

FIG. 1a schematically illustrates according to some embodiments a system and apparatus to apply path control system 232 which describes top level data flow among described functionalities such as path control layers and vehicular controlled platform 229. Rectangle 232a may refer to for example centralized implementation of path control system layers 211, 217, 221 and 224 using common communication servers.

The usage condition layer 224 communicates with toll charging units of vehicles comprising the vehicular controlled platform 229 through 225 and 239b, and with car plate identification system 226 (using Automatic Number Plate Recognition—ANRP) through 225.

According to the described embodiment each vehicle has a common transmitter for its DNA and toll charging unit. For example vehicle 1 transmits accordingly data to the path control system layers through 230a1.

The traffic mapping layer 221 according to the described embodiments receives and maps all the dynamic data transmitted from driving navigation aids, and transmits the mapped data to the traffic prediction layer 217 and to the path planning layer 211.

The traffic prediction layer 217 feeds through 213 traffic prediction travel time costs on the road network links to the paths planning layer 211.

The paths planning layer calculates accordingly sets of coordinated paths which are fed back to the traffic prediction layer through 210*a* to apply further controlled traffic predictions, and which set of coordinated paths are transmitted as well to vehicles through 210*b* to update path controlled trips in driving navigation aids.

Inputs of dynamic information related data from external systems may be fed to the path control system through logical links 216, 220 and 223, and which data may refer to data from external systems and servers described above, including but not limited to, for example; a) road network map updates through 223, b) exceptional demand related events updates and traffic flow related updates through 220, and c) traffic control related updates through 216.

FIG. 1*b* schematically illustrates according to some embodiments a system and apparatus to apply path control system 232 which describes top level data flow among described functionalities such as path control layers and vehicular controlled platform 229, wherein FIG. 1*b* differs from FIG. 1*a* by enabling vehicles to communicate directly with the path planning layer, for example, for requesting path controlled trips, and updating time related positions of path controlled trips.

FIG. 1*c* schematically illustrates according to some embodiments a system and apparatus to apply path control system 232 which describes top level data flow among described functionalities such as path control layers and vehicular controlled platform 229, wherein FIG. 1*c* differs from FIG. 1*b* by enabling vehicles to communicate directly with the traffic prediction layer, for example, in order to inform about time related positions of path controlled trips by a respective update.

Figure 1D:
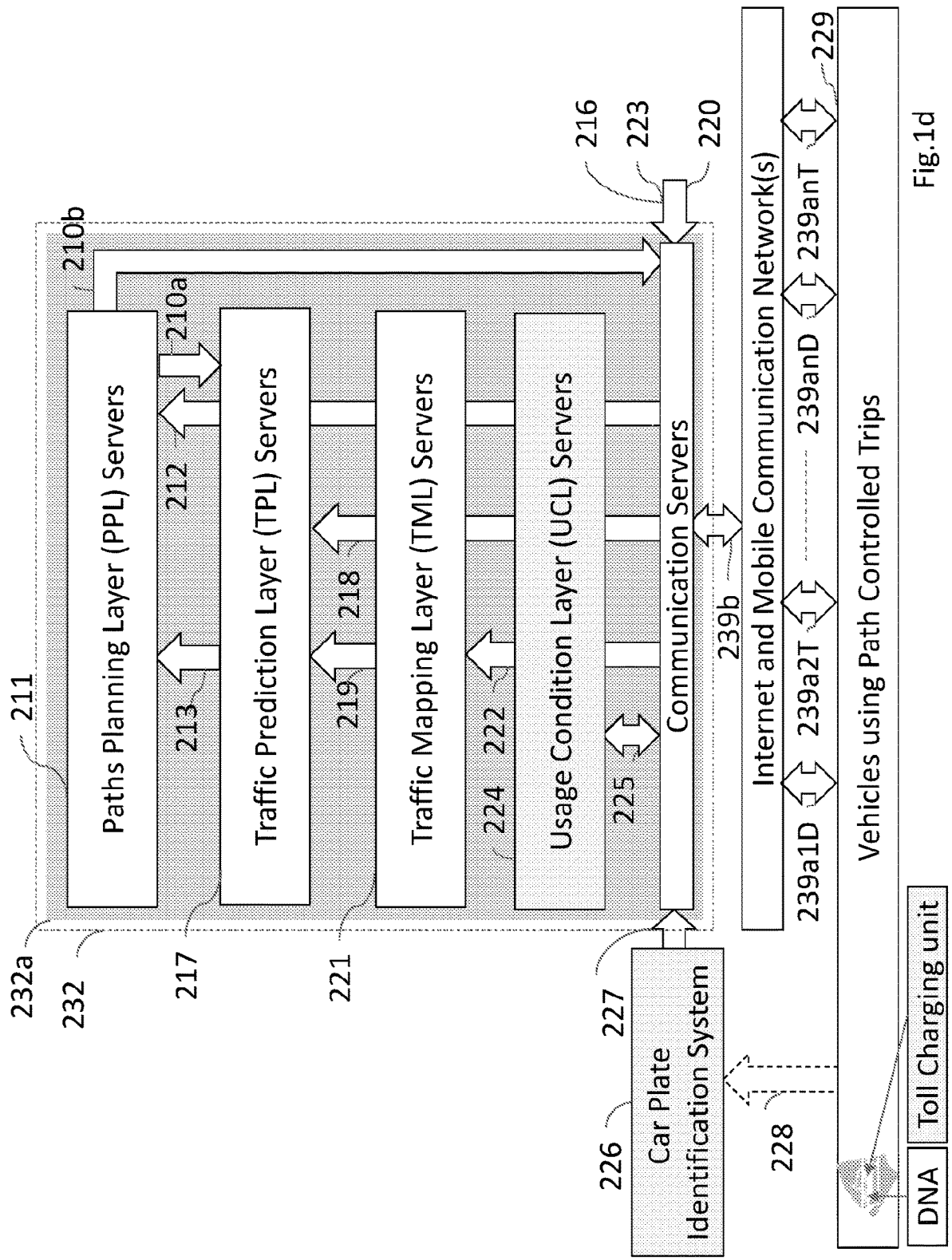
FIG. 1d schematically illustrates top level system data flow to apply predictive traffic load balancing control according to some embodiments, wherein FIG. 1d differs from FIG. 1c, for example, at least by enabling vehicles to communicate separately with the usage condition layer, using a dedicated transmitter for such purpose, for example, a toll charging unit radio transmitter.

FIG. 1*d* schematically illustrates according to some embodiments a system and apparatus to apply path control system 232 which describes top level data flow among described functionalities such as path control layers and vehicular controlled platform 229, wherein FIG. 1*d* differs from FIG. 1*c* by enabling vehicles to communicate separately with the usage condition layer, using a dedicated transmitter for such purpose, for example, a toll charging unit radio transmitter.

The advantage of such transmission is the ability to guarantee isolated and ongoing communication, even when a common radio communication in the vehicle is not active, to respectively block faked interventions and to enable ongoing monitoring of installed toll changing unit in the vehicle. In this respect vehicle 1 for example transmits through 239*a*1T data from the toll charging unit to the usage condition layer and through 239*a*1D data from the DNA to other layers of the path control system.

Figure 1E:
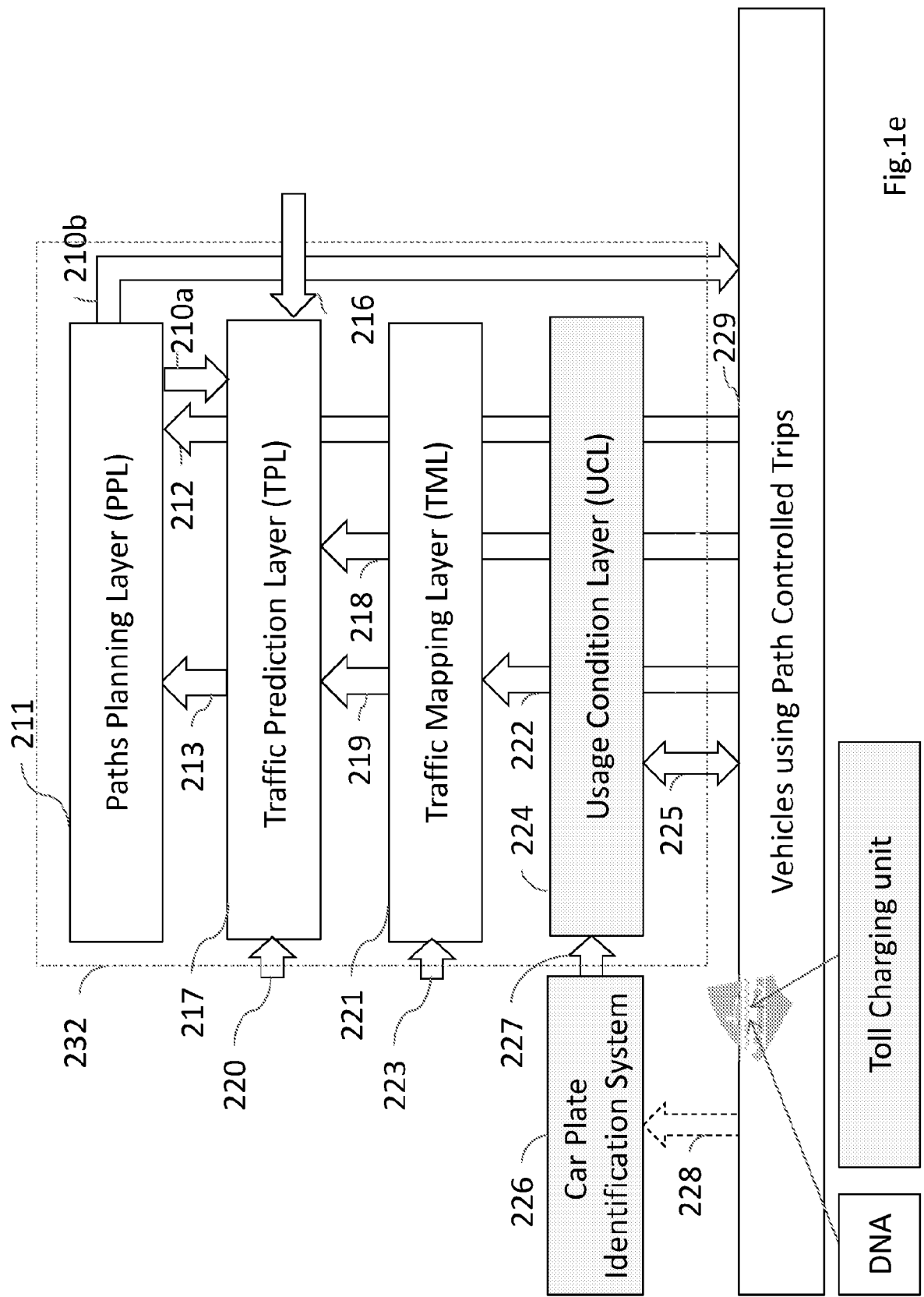
FIG. 1e schematically illustrates top level system data flow to apply predictive traffic load balancing control according to some embodiments, wherein FIG. 1e differs from FIG. 1d and/or FIG. 1c, for example, at least by ignoring the communication apparatus.

FIG. 1*e* differs from FIG. 1*d* and FIG. 1*c*, by ignoring the communication apparatus, enabling to concentrate on data flows in order to facilitate the description of further expansions using FIG. 1*e* as a reference.

Figure 1F:
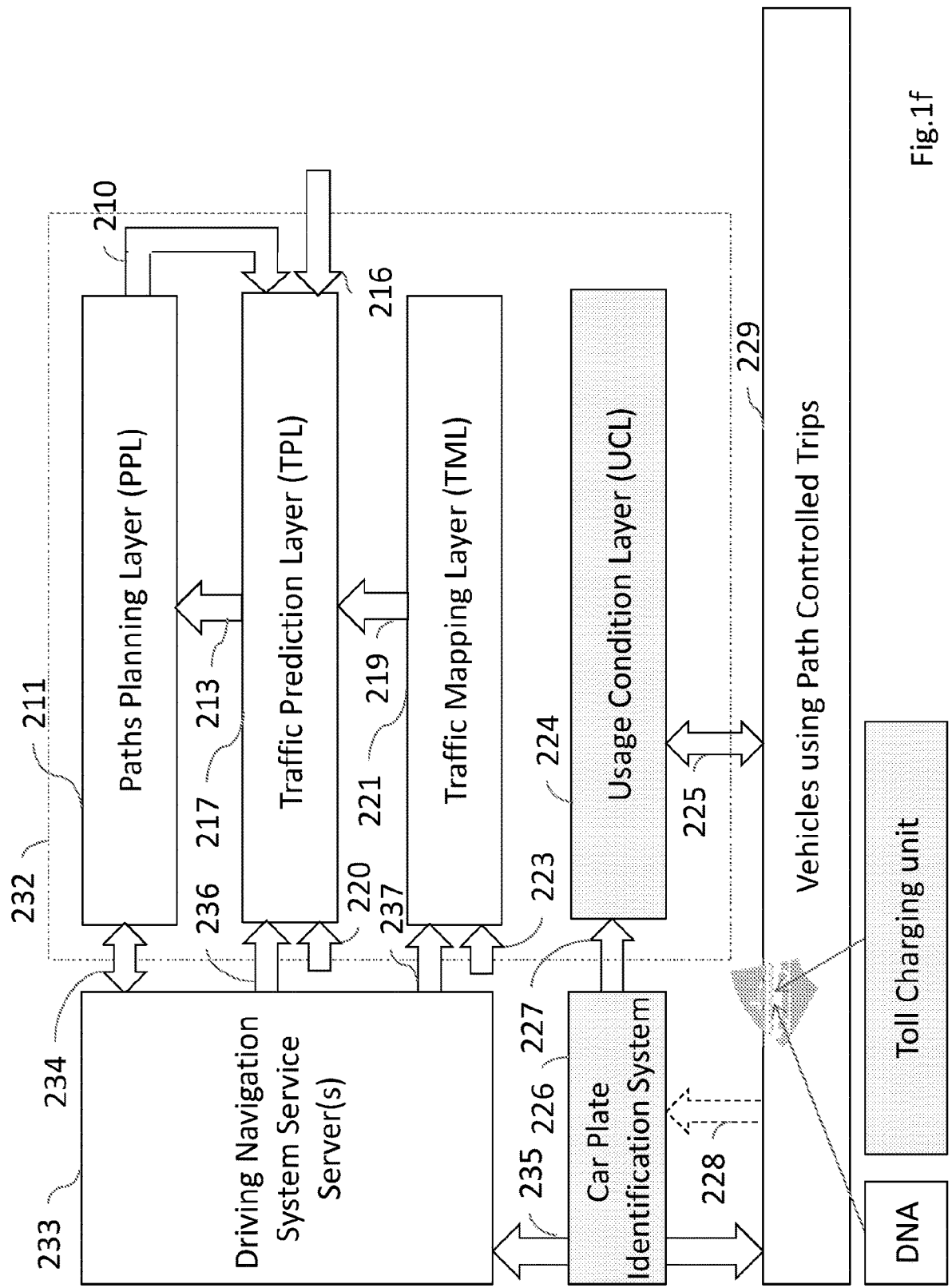
FIG. 1f expands according to some embodiments the system described by FIG. 1e with driving navigation aid which is served by a predictive traffic load balancing control system.

FIG. 1*f* expands according to some embodiments the system described by FIG. 1*e* with driving navigation aid which is served by a path control system. With such embodiments, requests for path controlled trips are handled by the driving navigation system which communicates on one hand with driving navigation aids through 235 and with the path planning layer through 234 for updating vehicles with path controlled trips.

According to such embodiments further data which vehicles may originate to support path control, such as time related positions of path controlled trips, may be received by the path control layers through 234, 236 and 237 through the driving navigation aid.

According to such embodiments, direct communication of vehicles with the traffic mapping layer, with the traffic prediction layer and with the paths planning layer might become redundant.

Figure 1G:
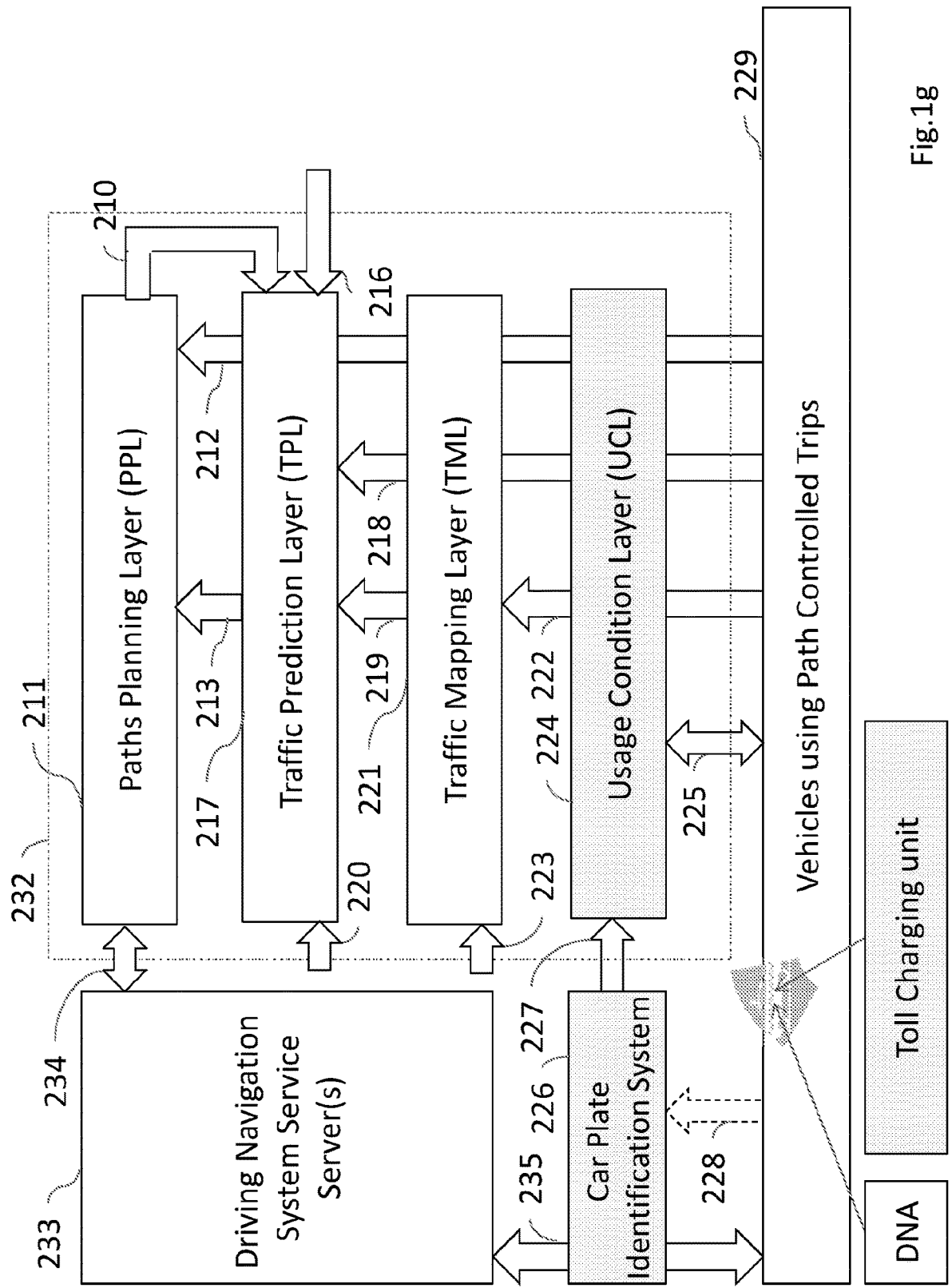
FIG. 1g schematically illustrates top level system data flow to apply predictive traffic load balancing control according to some embodiments, wherein FIG. 1g differs from FIG. 1f, for example, at least by enabling direct updates of time related positions associated with path controlled trips to be transmitted from vehicles to one or more layers and which said updates serve according to some embodiments the need for such data to be used by the traffic prediction layer and by the paths planning layer for their ongoing operation.

FIG. 1*g* differs from FIG. 1*f* by enabling direct updates of time related positions associated with path controlled trips to be transmitted from vehicles to one or more layers of 232 and which said updates serve the need for such data to be used by the traffic prediction layer and by the paths planning layer for their ongoing operation, as described above.

According to such embodiments said updates enable further to confirm, for example, by 211 the usage of path controlled trips according to path controlled trips planned by 211 and transmitted to the DNA through 233. Confirmation according to such embodiments may be obtained by preventing vulnerability to undiscovered intervention of a driving navigation system 233 in the path control and/or in the updates. This can be performed according to some embodiments with minimal involvement of 233 by performing the updates by the toll charging unit which anyhow should receive the path associated with the assigned path controlled trip to the vehicle in which the toll charging unit is installed in order to handle privileged tolling. Associating a position related update with the path of the controlled trip, enables to compare the transmitted path with path controlled trip generated by 211 to validate matches and validate for example by 211 usage of path controlled trips according to assigned paths.

According to some embodiments, an alternative to said transmission and comparison of paths is to associate trip Identification (ID) number with each assigned path for path controlled trip, for example by 211, and further transmit the path associated with the trip ID to 233 through 234 in order to assign the path to a respective DNA through 235. The DNA uses the trip ID number with its updated paths of path controlled trips transmitted to the toll charging unit.

Anonymity of position related updates by a toll charging unit, associated either with path controlled trip or with trip ID, can be maintained by transmitting non vehicle identification updates to the path control system 232. With such approach there is an ability to confirm usage of path controlled trips assigned by 211, as a byproduct of the updates to the layers of 232. A confirmation process can be performed, for example by an extension to 232, preferably to 211 in 232. To assure anonymous transmission of said updates, although updates include no details to identify vehicles, there is still a need to assure that no claim can be raised about privacy preservation due to usage of the toll charging unit for tolling which requires vehicle identification.

Privacy preservation is a sensitive issue with respect to a claim about an ability by an entity or an authority which has access to both vehicle identifying messages such as tolling related messages and anonymous type of messages such as position related updates which are transmitted from a common unit through for example mobile internet. In this respect, even though the different types of messages are transmitted to different layers, a common IP address may enable to associate vehicle ID with an anonymous transmission update. That is, association of vehicle ID with anonymous messages may further enable to associate details about path controlled trips with the respective vehicle ID.

In order to avoid such claims while using the toll charging unit to transmit both types of messages, there would preferably be a need to use different IP addresses with vehicle identifying messages and with anonymous messages. The cheapest approach to apply different IP addresses is by establishing different Internet sessions for anonymous and for non anonymous messages, enabling for example to allocate by a service provider different IP addresses to different sessions. A less robust approach to apply anonymous updates to layers of 232 is by enabling the DNA to transmit directly said anonymous updates associated preferably with said trip IDs. With this approach, preferably under secured communication, the toll charging unit may not mandatorily be equipped with its own mobile internet communication apparatus, enabling tolling to be applied by a toll charging unit through other communication means. Such means may be used by a toll charging unit directly, for example, by using WiFi communication or provide indirect communication through a Smartphone or through a common in-vehicle mobile communication means which can use for example Bluetooth communication, preferably under secured communication which may prevent intervention of a third party in the communication of a toll charging unit with the usage condition layer.

A possibility to fake communication by a non authorized toll charging unit may be avoided by two means. The first possibility refers to the assumption that the chain from production to installation of a vehicular toll charging unit is applied under license and under supervision, and therefore there is no reason that claims about privacy preserving faking product would arise.

The second more stronger additional possibility refers to an ability to validate authentic installation of a toll charging unit to confirm authentic communication by authorized installed toll charging unit. This may be enabled when the toll charging unit transmits a non anonymous position related message associated with vehicle registration number to the usage condition layer, for example, during a privileged tolling procedure. In this respect, a received message by the usage condition layer from a toll charging unit may initiate by the usage condition layer a search process for a match between the transmitted vehicle registration number from a toll charging unit and stored data associated with the vehicle registration number which was received from the car plate identification system (using Automatic Number Plate Recognition—ANRP) by the usage condition layer. According to a match the usage condition layer may further confirm through additional data associated with toll charging messages, such as time related position recorded by the toll charging unit when the vehicle was in the vicinity of a camera (used with Automatic Number Plate Recognition—ANRP) of a car plate identification system, that a vehicle plate identification received from the car plate identification system by the usage condition layer substantially matches the same time related position for the same registration number.

Locations of cameras may for example be updated in the toll charging unit through a process in which the toll charging unit receives such updated location, for example, from the usage condition layer.

According to some embodiments, a further approach enabling to validate authentic installation of a toll charging unit may use a communication signature recording process which the toll charging unit and the usage condition layer activate according to determined criteria as a result of a communication session. Such a recording process records characteristic(s) related to non anonymous communication between the toll charging unit and the usage condition layer which may further be compared to verify matches. Characteristics may include, for example, time of a communication session, type of communication session, and other data related to the communication sessions. Access to stored signatures of a toll charging unit, preferably stored in a non volatile memory, may be part of a regulatory process executed, for example, by entities authorized to make annual regulatory test for vehicles which provides a vehicle with regulatory approval car certificate. Under such test the entity may read by authorized equipment secured stored data from the toll charging unit including but not limited to said signatures. The signatures may further be compared with respective signatures stored by the usage condition layer for the same vehicle (e.g., according to the same registration number). Confirmation of a match according to a comparison may validate usage of authentic communication performed by toll charging unit installed in the vehicle.

Such apparatus and methods to validate authentic installation of a toll charging unit are not unique to the system illustrated in FIG. 1g and may be applied with relevant illustrated systems in other figures.

FIG. 1h differs from FIG. 1g by enabling to feed traffic predictions from a path control system to a traffic light control optimization system 215 through 214 enabling to improve traffic lights control in forward time intervals covered by the predicted flows. This further enables to get feedback from 215 through 216 for adapted traffic light plans according to the traffic predictions from 217 and improve accordingly the path control.

FIG. 1i1 schematically illustrates vehicular apparatus and methods to apply according to some embodiments interaction of a vehicle with a path control system. In this respect separate transmitters for a toll charging unit and for a DNA is suggested to be applied and which such approach may refer to the vehicular apparatus complying with FIG. 1d up to FIG. 1h.

The vehicular apparatus may serve three modes of operation: idle tracked mode, trip tracked mode, and tolling mode.

In the idle tracked mode continuous authentic installation of a toll charging unit in the vehicle is verified by, for example, sampling the toll charging unit by the usage condition layer through 239a1T to assure continuous authentic installation using vehicle authentication records which are stored under authorized installation of a toll charging unit and continuous time records applied with a toll charging unit at all modes of operations (including idle mode). This mode can be applied by an extension to the PTT processing which is further described.

Trip tracked mode operation should be activated while a car is traveling, using for example indication from a GNSS receiver installed in the in-vehicle toll charging unit. During a trip, the toll charging unit activates a Privilege Certification Control processes (PCC), which processes may include but not limited to, for example, tracking obedience to path controlled trip through 246 and certification of the level of obedience with respect to a level of entitlement to privileged road toll according to criteria stored preferably in the toll charging unit, and/or monitoring active contribution to usage of ADAS through for example 246, and/or monitoring active contribution to cooperative safety driving of autonomous vehicles by for example cooperative localization estimation, possibly through 246. Accordingly the PCC may certify such conditions with respect to entitlement to privileged road toll.

Tolling mode may be activated by the toll charging unit according to arrival to destination of a path controlled trip or be activated by a toll charging layer based on stored tolling related data on the toll charging unit. During the tolling mode, trip details related Privacy Preservation Tolling (PPT) processes are activated by the toll charging unit, enabling hidden trip related tolling management, including for example privileges of free of charge toll and/or toll discount to be applied according to certification from PCC processes.

Criteria entitling for privileges may refer but not limited to usage of, for example, path controlled trip and/or elements such as ADAS, and/or using autonomous vehicle enabling to contribute to cooperative safe driving. In case of autonomous vehicles, usage of automatic driving mode by the vehicle may enable to receive indication by the toll charging unit through for example 246, enabling the PCC processes to entitle the vehicle with privilege of, for example, free of charge toll or toll discount.

In case of ADAS usage, for example by any type of vehicle, such privilege may be activated through said indication received by the toll charging unit about usage of certified ADAS or by an integrated device which includes at least a toll charging unit and a certified ADAS. The trip tracked mode may be expanded to include, in addition to said tasks, confirmation of path controlled trip usage and/or other privilege entitling conditions during a trip, and which process may be initiated by a car plate identification system (using Automatic Number Plate Recognition—ANRP) as a result of inspection to enforce toll charge on non privileged entitled trips including usage of path controlled trips and/or other toll privileging conditions.

Conditions entitling vehicle trips with privileges other than usage of path controlled trips should preferably be tracked as well during the trip in order to enable to entitlement for full privileges. Enforcement of tolling on non privileged trips may include identification of a car plate which triggers a confirmation process to confirm usage of path controlled trip by the identified vehicle, for example, by transmitting a message to the usage condition layer to verify and validate entitlement to privileges for the identified vehicle. In turn the usage condition layer transmits a message to the respective toll charging unit to validate entitlement for privilege with respect to the time of the identification. The transmission by the usage condition layer should preferably be performed under conditions in which an IP address is activated by the toll charging unit which differs from an IP address used with anonymous communication, which may serve path controlled trip related position transmission updates, in order to not identify the anonymous source while enabling vehicle identification such as registration number under privacy preservation of trip details. The toll charging unit may accordingly validate trip conditions entitling privileges, such as usage of path controlled trip through the trip tracked mode related processes, and respond with a respective confirming message or a non confirming message to the usage condition layer.

According to some embodiments, direct interaction between the car plate identification system and the toll charging unit may save intervention of the usage condition layer under conditions of confirmed usage of path controlled trip by the vehicle.

Communication between a toll charging unit and the usage condition layer may preferably include secure communication between the toll charging unit and the usage condition layer in order to prevent intervention in the communication chain by a non authorized process.

Figure 2:
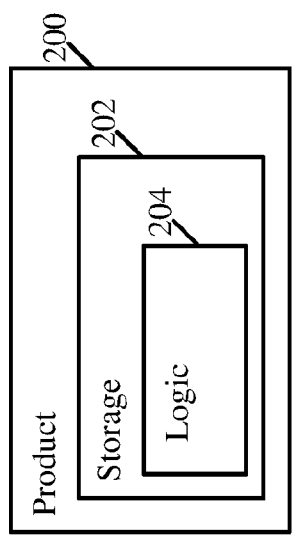

FIG. 1*i*2 illustrates schematically a toll charging unit and its interaction with in-vehicle DNA and a path control system, using according to some embodiments in-vehicle communication means including mobile Internet means, instead of using a dedicated communication means associated with the toll charging unit as illustrated by FIG. 1*i*1. Communication between a toll charging unit and the usage condition layer may preferably include secure communication between the toll charging unit and the usage condition layer in order to prevent intervention in the communication chain by a non authorized process. According some embodiments, the toll charging unit may use, preferably under secured communication, WiFi communication or a Smartphone, through for example Bluetooth, to communicate with the usage condition layer.

FIG. 1*i*3, illustrates schematically expanded configuration of vehicular apparatus described with FIG. 1*i*2, enabling to support privileges to cooperative safe driving. Indication about usage of functionality which activates cooperative safe driving mode is received for example by the toll charging unit from 246*b* through 246 using, for example, wireless local area network (WLAN).

Cooperative safety, which should preferably be applied with automated driving mode of an autonomous vehicle, may preferably use fusion of multiple sensors measurements from multiple vehicles.

According to some embodiments, implementation of free of charge toll or toll discount is used to provide privilege for usage of functionalities which apply cooperative safe driving by a vehicle. Such non full compulsory approach may preferably be applied to generate conditions for robust cooperative safety driving which is a major factor to guarantee safe automated driving by autonomous vehicles and safe driving by Cooperative Intelligent Transportation (C-ITS).

FIG. 1*i*3*a* illustrates schematically the sensing, communication and fusion functionalities involved with cooperative mapping of relative distances between a vehicle and other vehicles, and which mapping may be expanded to improve sensor based localization of a vehicle on high resolution in-vehicle map (used by autonomous vehicles) based also on vehicle to vehicle communication functionalities and functionalities to fuse a plurality of sensor measurements performed by each vehicle of a plurality of vehicles.

Mapping cooperatively interrelated distances among vehicles V1, V2 and V3, may use vehicle to vehicle transmission of in-vehicle sensing measurements through vehicle to vehicle (V2V) communication, wherein each of the vehicles may share with other vehicles measurements enabling by each of the vehicles to fuse similar measurements generated by other vehicles in order to improve by each vehicle its own measurement(s).

Fusion of multiple source measurements by a single vehicle enables to determine more robustly relative dynamic distance which may be applied according to relative weights corresponding to ambiguities in similar measurements performed by different sources using for example weighted least squares. An option to improve in-vehicle sensor based localization of a vehicle on an in-vehicle high resolution road map, by cooperative localization, may be enabled by for example sharing further a localization result performed by a vehicle according to a fixed object, such as a signpost, with other vehicles having used the same object for their localization, and to improve by each vehicle its own localization by fusion of multiple source measurements to determine location according to relative weights corresponding to ambiguities in the measurements using for example weighted least squares. This option may further be used to backup or to complement vehicle to vehicle dynamically estimated distances, according to dynamically estimated distances among vehicles, according to in-vehicle positioning of the vehicles performed to localize the vehicle on a high resolution road map. In this respect fusion of relative dynamically measured distances according to positioning of vehicles, using fixed object having known accurate position as a reference, with relative distances mapped according to relative mapping of dynamic objects, may contribute to the accuracy of both, the localization of the vehicle on a road map and the mapping of distances.

Fusion of multiple estimates by a single vehicle may be applied according to relative weights corresponding to ambiguities in similar estimates, performed by different sources, using for example weighted least squares.

FIG. 1/1 up to FIG. 1/3 illustrate schematically embodiments for the coordination of path controlled trips preferably applied with a basic paths planning layer, wherein inputs and outputs in the figures refer to different inputs and outputs in other figures describing different implementation alternatives to apply a path control system and which some of the alternatives are described by such figures.

FIG. 1/4 and FIG. 1/5 illustrate schematically basic traffic prediction layer with respect to different embodiments in which some of them apply mapping of demand of trips as described in FIG. 1/4. According to some embodiments, when there is lack of data about trip related tracked positions there is a need to estimate complementary data about the distribution of the vehicles on the network and to estimate demand according to traffic information received through 220, and through 219 through 243, enabling state estimation of demand (and indirectly distribution of vehicles on the network) according to state prediction (based on demand prediction) received from 245, under constraints of demand related data received from vehicles through 218 and further through 242 (according to FIG. 1/4) and distribution of position related trips through 219 and further through 240. Path controlled trips, planned according to prior control cycle is fed to the DTA through 210 or 210a. Constraints according to mapped demand performed by the traffic layer may according to FIG. 1/5 be received directly through 218 as illustrated in FIG. 1/5.

Further elaboration on vehicular apparatus, methods, and functionalities, and on apparatus, methods, and functionalities of the path control system, is provided with following description of embodiments of the invention.

Main abilities which require innovation to make such a multi layer approach, including layers such as Usage condition layer, Traffic prediction layer, Paths planning layer and Traffic mapping layer, to be feasible and efficient are:

With paths planning layer: convergence towards coordination of paths on the network, which tends to maximize flow on the network under constraints of real time and fairness in path assignments to path controlled trips, With traffic prediction layer and traffic mapping layer: accuracy of dynamic traffic mapping and prediction under constrains of real time calibration of a dynamic traffic simulation with sufficiently accurate models, With usage condition layer: privacy preservation of trip details under free of charge road toll or toll discounts privilege to facilitate encouragement of path controlled trips usage, and optimizing joint control on demand of trips and on coordination of paths, in order to maximize flow according, for example, economical benefits such as value of travel time.

According to some embodiments, all the above mentioned layers, that is, usage condition layer, traffic mapping layer, traffic prediction layer and paths planning layer, may be applied as complementary layers of a path control system.

According to some other embodiments, each of the layers or functionalities descried with the layers may be applied independently, for example, to support other systems and/or to support a system which applies less functionalities or more functionalities in comparison to described layers or to apply functionalities described hereinafter and above by the present invention at any combination and at any level of complexity of implementation.

The benefit of using all the layers is expected to be highest enabling robust and high performance of path controlled trips and further lower dependency of traffic predictions on non deterministic (stochastic) behavior of drivers with respect to usage of route choice models.

According to some embodiments, applying the traffic prediction layer without using the paths planning layer, should preferably not be supported by the usage condition layer, since non controlled usage of traffic prediction may affect negatively local network flows due to high potential of conflicts among drivers that may attempt to take benefit of predicted freedom degrees on the network without coordinating path control. Therefore, without a paths planning layer applying coordination among path controlled trips, while using just on traffic predictions to support planning of paths, there should be a need to limit the level of usage of driving navigation aids usage to a level which may minimize the negative effects of non-coordinated trips on the network.

According to some embodiments, traffic prediction layer and the paths planning layer, which are applied without applying the usage condition layer, may improve the traffic flow on the network although only a limited percentage of path controlled trips may be expected to be used.

These examples provide some indication on flexibility in the implementation, while in general the above division of a path control system into layers is used for convenience, that is, processes related to any of the layers may be used independently or jointly with other described or non described processes or layers according to implementation needs and constraints.

Therefore, division into system layers is not necessarily associated with some further descriptions of embodiments of the invention, and any association of processes with such further description is left open for implementation convenience. In this respect, embodiments of the invention described hereinafter may be associated with system layers described above or with any other system configuration.

The following describes a method, apparatus and/or system which may enable high utilization of road networks (hereinafter and above the use of the term network without specific relation to a type of a network refers to a road network unless otherwise specified), using control on paths of trips with at least the aim to resolve above mentioned issues. According to some embodiments, such a control on paths may be implemented as an upgrade to available driving navigation aids and/or respective navigation control system used to guide drivers or autonomous driving of vehicles on roads.

A driving navigation aid (hereinafter DNA will refer to driving navigation aid) may refer but not be limited to a dedicated driving navigation aid which assists drivers verbally or visually, or by both means, to reach destination according to a planned route to destination; or may refer to a driving navigation aid software application installed for example on a Smartphone, or may refer to a DNA functionality which is part of an autonomous driving vehicle system which assists autonomous driving toward destination.

A difference between a DNA used to assist a driver and a DNA used to assist an autonomous vehicle is that a DNA which is used to assist a driver may be based solely on GNSS positioning supported by map matching, whereas a DNA used with an autonomous vehicle may take benefit of vehicle localization on high resolution road maps and which its positioning is performed with the support of sensors such as Laser scanner(s) and/or Radar(s) and/or Camera(s). According to some embodiment, said control on paths may be provided as an upgrade to a system that provides driving navigation service, wherein paths for path controlled trips are provided to drivers or autonomous vehicles through DNA by a driving navigation service system platform, or by an upgrade to a virtual model of a driving navigation service system platform which may guide drivers and autonomous vehicles to their respective destinations.

Examples of driving navigation service platforms in this respect may refer but not be limited to system platforms used for example by Google and Waze respective services, or to services provided, for example, by other operators, or to driving navigation system services that are serving, or might upgrade automakers' platform(s) to serve, DNAs.

In this respect an installed base of driving navigation service may, for example, provide a platform or a model for a platform to be upgraded by dynamic path controlled trips, which enables traffic distribution for load balancing on the network, as well as may provide further a platform or a model for an additional upgrade which may enable to generate conditions for high usage of path controlled trips on the network.

Control on path calculations for path controlled trips, refers to a process which is aimed at improving the traffic flow on the network, preferably by leading to load balancing of traffic on the network, and which traffic improvement is aimed at exploiting degrees of freedom on a road network according to predicted demand of trips and predicted traffic, in order to preferably substantially maximize the traffic flow on the network.

Said control on paths may refer hereinafter to the term path control, and may be categorized as a model predictive control oriented system and method in which traffic prediction simulations synthesize, by the support of dynamic traffic assignment (DTA) simulator, traffic development according to path controlled trips, and which path control preferably shapes the traffic toward load balance according to effects of controlled paths on traffic predictions; wherein a DTA simulator enables prediction to be sensitive to non linear and time varying traffic flows on a network with traffic predictions.

According to some embodiments, path control refers further to coordination of path controlled trips, preferably performed by a method which assigns paths dynamically to trips according to controlled traffic predictions, and which paths that are assigned to trips are preferably aimed at converging gradually to substantial fair assignment of paths among trips, leading to substantial load balance on the network.

In this respect fairness that might be considered to be satisfied by non discriminating assignment of paths may cause negative developing effect(s) on the network, due to preferred commitment to apply simultaneous non-discriminating search for paths in order to exploit a common freedom degree(s) on the network, (which means applying simultaneous greedy search for paths), and which said negative effect(s) should preferably be resolved by further path control which gradually diverts minimum initial said non discriminating paths to alternative path s in order to overcome the negative effect(s). The gradual diversion should preferably take benefit of assigned paths which may take benefit of the freedom degrees on the network by some other alternatives to the alternatives which found to be the cause for potential negative effects on the network. Freedom degrees may refer hereinafter and above to, for example, naturally developing freedom degrees on the network due to dynamic demand and/or to, for example, relatively freedom degrees which may develop as result of irregularity in the traffic and/or as a result of changes in paths which reduces load balance of the traffic on the network.

According to some embodiments, with such approach the path control enables both convergence towards load balance and fairness in the assignment of paths. The approach may enable rapid convergence towards load balance which may be achieved by sufficient computation power to maintain control on high share of path controlled trips in the traffic, while maintaining corrections to deviations from substantial load balance by discrete path control on a continuous base.

According to some embodiments, path control is implemented as an upgrade to a system platform which serves driving navigation aids, either as an external system which supports such a system platform to provide path controlled trips, or as a path control functionality within a system platform which serves driving navigation aids.

According to some embodiments, a platform which serves DNAs provides a model for an upgrade wherein an upgrade is implemented on such a system model either internally or externally.

Since the functionality of path control can be provided as an internal upgrade to a system platform that might not be distinguishable from the functionality of an external system upgrade, the term path control which is used by some embodiments may refer to both implementation possibilities.

Freedom degrees on the network, which are used by path control to improve traffic flow, preferably by applying traffic load balancing, may refer to the marginal capacity (non occupied capacity) of links of a network and to the network topology, from which path control may take benefit, and which freedom degrees provide flexibility to dynamically assign paths for trips on the network according to current traffic, controlled traffic predictions and predicted demand of trips within a finite time horizon while considering fixed and dynamic traffic flow constraints on the network.

Demand of trips may be characterized at a high resolution by trip pairs (positions to destinations) and/or at a limited resolution according to trip pairs among zones on the network; wherein aggregated trip pairs may relate to demand among zones with respect to preferably a wide sense stationary time interval.

Predicted demand may refer to non yet served entries of trips to a network which preferably refer to pairs of zones, for example, path controlled trips with relation to a forward time interval associated with pairs of zones, or path controlled trips having for example forward time related interval associated with entries and/or exits related to links on a network, preferably major links.

The flexibility to distribute trips according to paths on the network refers to the flexibility to take benefit of different alternative paths to destinations and the flexibility to apply dynamic rerouting according to dynamically developing traffic. In this respect dynamic rerouting refers to paths assigned to path controlled trips which under path control may dynamically be changed.

Said marginal capacity on a network, which determines freedom degrees on the network, refers to non occupied capacities on network links while considering current and controlled traffic predictions.

Controlled traffic predictions refer in this respect to simulated traffic predictions, applied for example by a DTA simulator, wherein a traffic simulator is fed by paths planned with the path control for path controlled trips, as part of an evaluation of potential effect on travel times on the network, and which evaluation may either lead to further planning of paths (corrections) and/or to assignment of paths to path controlled trips.

Since traditional traffic control (e.g., traffic light control) on a road network, which is integrated in a traffic simulator, may be affected, inter-alia, by interferences caused by human behavior and may be limited by non full coverage on the network, the reliability of said controlled traffic predictions may be degraded due to such effects Degradation may be further a result of lack of traffic information and/or demand information and/or non perfect network demand models, as well as non perfect dynamic supply models. Therefore, the ability to identify at high reliability freedom degrees on the network and to fully exploit the freedom degrees is expected to be limited.

In this respect, high share of path controlled trips may provide a highly valuable solution not just due to the ability to apply more reliable predictive control but also due to the ability to get more traffic and demand related information from path controlled trips, which in turn enables to synthesize by a DTA simulator, having non linear time varying flow models, higher quality of time dependent traffic flow to support predictive path control on network flow.

In order to improve or maximize traffic flow, by predictive path control, the goal should be to maximize usage of path controlled trips which increases the reliability of the information about demand of trips and about traffic flow enabling to apply a more robust control on path controlled trips, while reducing dependency of predictive path control on estimation of demand of trips according to limited traffic data trough DTA models. In this respect the higher the quality and coverage of real time demand and traffic related data, the lower is the sensitivity of model based demand estimation and DTA calibration to real time errors, and, as a result, the higher is the robustness of predictive path control.

A more robust predictive path control, which enables a more effective traffic load balance due to high usage of path controlled trips increases the available capacity on the network, due to reduction of travel times on the network as a result of the tendency to maximize the potential contribution of dynamic rerouting by predictive path control applying traffic load balancing.

A Dynamic Traffic Assignment (DTA) simulation platform which may enable controlled traffic predictions for a predictive path control typically includes demand and supply traffic models.

Different types of DTA simulators are available in the field of transportation and are commonly divided into three categories:
- microscopic DTA simulators, provide the highest traffic simulation resolution which typically assist local traffic planning on a network,
- mesoscopic DTA simulators, which are considered as lower resolution simulators are typically used with network level planning to evaluate typical flows, and
- intermediate DTA simulators which apply resolution in between microscopic and mesoscopic DTA categories.

A less common simulator which is more oriented to real time traffic predictions for wide networks is known as quasi-dynamic traffic simulator which is a simplified simulator for dynamic assignments.

In general the higher the accuracy of the supply model of a DTA, which is further elaborated, the higher is the quality that may be expected from traffic predictions. However, a major issue in this respect is the simulator run time which puts a limit on the accuracy which can be implemented with a DTA in terms of real time calibration (demand and parameter state estimation) by affordable computation power.

A typical DTA simulator is comprised of several sub models and which sub models are associated with two main categories of DTA models, and which main categories are the Demand Model and the Supply Model mentioned above. In this respect a DTA, according to different accuracy levels, may include but not be limited to:

a. A demand Model which divides the network into zones among which trip pairs are assigned, and expanded for real time traffic predictions by a demand prediction model for zone to zone demand of trips. A demand prediction model, which expands the demand model is aimed at enabling real time demand predictions according to past demand data, possibly with the support of historical data which may apply statistical prediction models associated possibly with pattern recognition methods for differential statistical demand prediction. Advanced demand model may include demand control models such as road toll and early/late trip departure recommendations in association with a demand prediction model.

b. A supply Model, which models the network traffic flow development, and which includes sub-models which are, but not limited to, road network characteristics at a level of links and intersections, routes and route choice model for the non controlled paths according to classes of vehicles, plans of traffic control means such as traffic lights and variable signals, and, with high resolution DTA, also intra link related traffic model such as lane changes and behavior related car following having a as potential to be expanded to intra and inter link control models such as, but not limited to, vehicle to vehicle communication effects considered to be applied with autonomous vehicles and/or with Cooperative Intelligent Transportation Systems.

It should be clarified that typical DTA models are used mainly for traffic planning purposes, such as road network planning and traffic lights control planning, while some real time experiments use such DTAs for traffic predictions. Such DTAs may provide prime platforms for required expansions which may further support real time controlled traffic predictions for predictive path control with advanced traffic supply and demand models. Advanced expansions may include but not limited to:

a demand model expanded by demand control which may include sub models such as, for example, road toll effects and/or effects of prescheduled trip requests/recommendations if, for example, prescheduled route recommendations/requests are allowed by a driving navigation service, and/or expansions related to methods, systems and apparatus described by the present invention;

a supply model expanded by sub models such as for example vehicle to vehicle communication effects on traffic development, enabling for example autonomous vehicles to be included in DTA based traffic predictions and/or, for example, vehicle to vehicle and/or vehicle to infrastructure communication effects on traffic development, to be included in DTA based traffic predictions, and which such communication and respective applications may be considered for example with or without deployment of Intelligent Transportation Systems (ITS) or Cooperative ITS.

According to some embodiments, models of such advanced control systems may expand less advanced DTA simulation platforms used typically for planning purposes and/or for traffic predictions under conditions of less advanced traffic control.

Traffic predictions based on traffic models, such as DTA simulators, are mandatory to apply model predictive control which predictive path control is based on. However such approach requires means to calibrate a DTA in substantial real-time in order to enable a DTA to apply traffic predictions, wherein the calibration should preferably be applied using state estimation methods.

State estimation may serve advanced control applications and comprises variety of known methods to support model based predictions, such as Kaman Filter (KF) based methods to support non linear systems by for example Extended Kaman Filter (EKF) and Unscented Kaman Filter (UKF), as well as Monte Carlo based methods such as particle filters and EnKF, just to mention some of them.

Such methods are aimed at enabling to track hidden variables which under simplified description (which is further elaborated) refer to the demand model and preferably also to varying parameters of the supply model of a DTA and which such methods are aimed at enabling substantially real-time calibration of a DTA. In terms of state estimation the demand prediction model is the process model, the supply model is the measurement model, traffic information represent the field measurements in term of state estimation, and the demand hidden variables and possibly also parameters of the supply model are the variables of the state vector in terms of state estimation.

However, under limited traffic information, as well as under limited usage of path controlled trips (i.e., dominance of the DTA stochastic route choice model and hidden demand variables), calibration of a DTA by state estimation becomes more than a major issue.

In this respect, a need to cope with a high dimension problem of high dimension demand state vector, expanded by supply model parameters which require joint or dual state estimation, as well as the need to cope with non linear time varying and stochastic supply model, puts a serious barrier to apply state estimation which is required for predictive path control on city wide networks.

The issue starts with a need for huge computation power even for a quite limited prediction resolution with respect to the size of the demand state vector (time related entries associated with destinations of trips) which the non linear and stochastic nature of the supply converts the issue to a barrier while considering to take benefit of predictive path control for a city size network.

However, this is not the only issue. An irreducible problem in this respect, which computation resources may not resolve, is the conflict between a need to overcome the time varying nature of the developing traffic on the network, by short time intervals of state estimation, and a need to increase the time intervals in order to reduce the ambiguity in the estimation (coefficient variations) to which the high dimension non-linear and stochastic DTA nature is added. This prohibits implementation of high quality predictive path control which is the only approach to exploit the potential of dynamic freedom degrees on a network in order to improve the traffic, or even prohibits justification of such approach in some cases.

As further elaborated, with further embodiments, some innovative methods are suggested to reduce complexity and non reliability issues associated with high dimension non linear time varying state and parameter estimation which may enable to reduce issues associated with the TDA calibration at substantial real time and which such methods improve and generalize the solution in comparison to some limited concrete cases which exclude typical traffic in a city wide network.

Potential exploitation of freedom degrees on the network may only be obtained by high quality controllable traffic predictions, that is, enabling to control traffic distribution by predictive path control which exploits high time resolution in a relatively long time horizon according to the predictions (hereinafter and above the terms path control and predictive path control may be used interchangeably).

As described with some embodiments a major step towards a possibility to obtain such an objective is to motivate high usage of path controlled trips and coordination of such trips. This may minimize or even eliminate the issue associated with calibration of a DTA and enable high or even full control on the traffic distribution as further elaborated.

Another major step towards efficient traffic predictions is to encourage prescheduled trips associated with encouraged usage of path controlled trips which may reduce also ambiguities associated with statistical predictions of the demand and which along the range of a prediction time horizon may reduce the demand resolution (zone to zone demand of trips). With lack of sufficient prescheduled trips, the further the time interval in the horizon of the prediction the lower is the resolution (longer time intervals are required in further time intervals in order to maintain the same level of statistical errors).

Prescheduled trips may reduce in this respect errors associated with predictions of demand applied by statistical models, which for example may use time series analysis preferably supported, for example, by historical patterns to linearize time series behavior by performing time series analysis for the differences between similar historical and current patterns (possibly including respective traffic patterns). As a result the resolution of relatively long predictions may be increased and respectively the efficiency of the predictive control will increase or even become fully exploited.

Motivation to use prescheduled path controlled trips may be applied based on differential privileges according to which higher privilege may be provided to prescheduled path controlled trip than a privilege provided to non prescheduled path controlled trip.

The functionality of a service which applies prescheduled trips may be described from a point of view of a user software application installed on, for example, a Smartphone. Activation of such a software application, at a time or recurrently, should be associated with a certain vehicle, for example, according to its registration number. Such an application includes a functionality enabling to transmit a request for prescheduled path controlled trip, according to a position to a destination, and to receive a response to the request. Preferably a response includes one or more recommendations for departure times, associated preferably with estimated travel time savings, of which one recommendation is selected and accordingly transmitted as a confirmed selection. According to options which may preferably provided with the software application to determine the departure position, a departure position may be identified automatically or be specified by the user. For example, automatic identification may be applied according to the position of the Smartphone from which the request is transmitted, if applicable, or according to stored position of the vehicle on the Smartphone, if applicable, or according to stored position of the vehicle which is transmitted from a service center which tracks the vehicle position, if applicable. Specified departure position may further be an option according to which a street name and number of a building are fed to the software application by a user.

Generation of conditions for high usage of path controlled trips on a network may enable to increase the level of the control on the distribution of the traffic and hence the potential exploitation of the traffic demand to supply ratio on the network, which includes drastic reduction or even elimination of the high dimension non linear time varying and stochastic state estimation issues.

In this respect, generating motivation for high usage, while applying a method for coordination of paths by predictive path control enabling further fairness in path assignment under predictive path control, may encourage high usage of path controlled trips. Under such conditions, the higher the share of path controlled trips, the less dependence on the stochastic part of the supply model is obtained as well as the lower could be the coefficient variations of the estimation (due to stochastic data and models) and the bias (due to non linear models) in zone to zone demand estimation (if estimation is still needed), and as a result high performance of predictive path control may be applied (with high usage of path controlled trips) or even the highest performance control (with full usage of path controlled trips) may be achieved.

According to some embodiments, increase in the share of path controlled trips may be obtained by providing free of charge road toll (hereinafter the term toll refers also to road toll) for path controlled trips in order to encourage usage of path controlled trips.

According to some embodiments, increase in the share of path controlled trips may be obtained by providing free of charge toll or toll discount for path controlled trips to encourage usage of path controlled trips.

Implementation of such approach introduces an innovative strategy which has near term and long term aspects that may enable to realize predictive traffic optimization on the network gradually, with minimum or even with no potential objections from the public. Such approach may start with robust privacy preserving free of charge road-tolling, provided as privilege to encourage usage of path controlled trips by robust predictive path control, and according to a need, further enabling to apply discounted tolling in order to control freedom degrees on the network, by dilution of the demand, which in turn enables ultimate predictive optimization of traffic flows on the network. Such approach may further be expanded to apply authentic and anonymous requests for prescheduled trips which enable more accurate optimization of traffic on the network, for longer controlled time horizons, in comparison to statistical predictions associated with zone to zone demand.

Privacy preserving toll charging is a key factor that should be considered in order to avoid raised potential claim that trip details might be vulnerable to non authorized access which is the case with exposure of trip details to a toll charging center. In this respect, according to some embodiments, an innovative robust privacy preservation is introduced which enables to hide trip details from a toll charging center while enabling to apply tolling transactions by an upgrade to a relatively low cost tolling concept.

In this respect a GNNS tolling concept, which introduces a relatively low cost tolling platform may be upgraded by innovative robust privacy preserving tolling transactions for wide coverage as described further with some embodiments. In this respect, under provision of free of charge toll privilege, there is no need for costly automatic car plate identification traps to be widely deployed since there is no real incentive to drivers to bypass free of charge tolling while being guided according to most efficient path controlled trips. The advantage of such approach has further aspects than just the low cost aspect, as the GNNS tolling vehicular platform may provide a platform to support further robust predictive path control based on authentic vehicular related data which may be received by a path control system and which may include: real time updates of authentic anonymous predictive demand for trips (which complements anonymous provision of paths to path controlled trips according to anonymous requests by dynamically determined communication procedure with certified vehicular units), and real time updates of authentic anonymous progress of trips (based on anonymous provision of paths to path controlled trips according to anonymous requests by dynamically determined communication procedure with certified vehicular units).

A complementary innovative element which may complement cooperative driving, applied by privileged path controlled trips, is cooperative safe driving on road networks which its efficiency is dependent on massive usage of matured autonomous vehicles and which according some embodiments may be applied as an expansion to a privileged path control system and/or as independent privileged cooperative safe driving.

In this respect, according to some embodiments, free of charge toll or toll discount are provided as privilege to encourage usage of autonomous vehicles which are equipped with apparatus enabling cooperative positioning of moving vehicles, wherein positions and preferably also short term predicted positions, which are determined by each vehicle, are exchanged among vehicles by vehicle to vehicle communication. In this respect high density of such vehicles may be generated on the network by said privileges to usage of automatic driving, enabling robust cooperative safe driving according to current and anticipated relative distances among vehicles which such vehicles may calculate according said current and anticipated exchanged positions.

The robustness of cooperative safe driving may further be improved by fusion of direct relative distance measurements between a vehicle and vehicles in its vicinity, applied by each vehicle of a plurality of autonomous vehicles, and disseminating by each vehicle to other vehicles (in its vicinity) the measurements through vehicle to vehicle communication. This enables fusion of complementary pairs of measurements by each vehicle in order to reduce potential error of a single measurement. Fusion in this respect may apply weighted least square based methods, preferably expanded to predictive fusion which determine dynamic relative distances among vehicles according to predictive positions which may be applies according to in-vehicle calibrated model based motion simulator which may determine predicted weights. Such approach under high density of autonomous vehicles on a network may further enable to reduce costs of sensors which may count on fusion of multiple measurements from multiple sensors installed on different vehicles.

Privileges to encourage cooperative safe driving are preferably combined with privileges to encourage usage of path controlled trips, according to some embodiments, for example, by providing privilege which discriminates between contribution to safe driving and efficient driving. Since automatic driving of autonomous vehicles depends on a DNA it is natural to expect that free of charge road toll or toll discount may be applied at some stage to encourage usage of autonomous vehicles due to both safe and efficient usage of road network. Entitlement to privilege at such a stage requires indication about usage of apparatus which enables said cooperative safe driving which, for example, usage of automatic driving mode may provide.

Methods and apparatus to realize such a concept is described hereinafter by respective embodiments, while considering according to some embodiments identification of conditions which enable tolerated reaction of a tolling system (vehicular and central apparatus) to proved exceptional situations by providing for example privileges to trips under such situations. Exceptional situations may include, according to some embodiments, inability of an autonomous vehicle or a driver to be guided by path controlled trips due to malfunction in the communication with in-vehicle apparatus or due to malfunction in in-vehicle apparatus which prevents usage of path controlled trips. In order to avoid a need to prove frequent inability of usage of path controlled trips, tolerated reaction may further include, according to some embodiments, provision of toll privileges to non full usage of path control along a trip and/or to a number and/or to a percentage of trips and/or to a portion of trips which were not using or obeying to path control during a predetermined aggregated period of time such as for example during a certain period of time in a month or a week.

According to some embodiments, toll discount, or free of charge toll, are applied by using a toll charging unit installed in the car, or by emulated functionality supported partially or fully by one or more in-vehicle devices, and which unit or functionality of the unit has interaction with an in vehicle DNA and with a toll charging center, as well with means through which vehicle authentication can be determined by the installed unit. An independent vehicular toll charging unit is a dedicated in-vehicle (on board) toll unit, enabling according to some embodiments to guarantee secured toll charging independently of other in-vehicle devices, preferably by enabling in-vehicle toll charges or free of charge tolls to be managed without exposure of trip details to a toll charging center while reporting to a toll charging center about the sum of calculated toll or free of charge toll. With such approach the independence of toll charging unit of other in-vehicle devices prevents exposure of the toll charging unit data and processes from non authorized access. In this respect, according to some embodiments, a toll charging unit or its functionality may preferably include, but not be limited to include: vehicle positioning means such as a GNSS receiver; communication apparatus and processes enabling to receive path related trips used with a DNA to guide a driver or an autonomous vehicle on a road network; processing and memory apparatus as well as processes to manage in-vehicle said secured toll charges according to said guiding path received from a DNA and tracked positions of the vehicle according to in-vehicle positioning means, and according to pre-stored data and processes to calculate toll charges or to decide on free of charge toll; process enabling to report to a toll charging center about toll charges which include but not limited to vehicle authentication data which is securely stored on the toll charging unit memory, preferably on nonvolatile memory and preferably stored by an authorized entity and by authorized apparatus and processes; communication apparatus and processes to interact with a toll charging center with respect to toll charging and/or free of charge toll, preferably including a process enabling frequent monitoring of connectivity of the toll charging unit, preferably with a toll charging center; apparatus and processes to support possible additional features related to a need to guarantee any further certified and secured toll related activity and installation of the toll charging unit in a vehicle. An alternative implementation of a toll charging unit functionality, which potentially may have a lower level of potential acceptance for certification, can be based on a software and/or hardware add-on to one or more in-vehicle devices which provide a non independent toll charging unit with full functionality upgrade, preferably using one or more in-vehicle platforms (hereinafter device and vehicular platform may be used interchangeably) for example by communication of such non independent toll charging unit with complementary software and hardware of in-vehicle devices or by integration/emulation of a toll charging unit functionality with/by an in-vehicle device. According to some embodiments, implementation of a toll charging unit, which is an independent unit, may include hardware and software means that a non independent unit may be equipped with access to one or more of them. Such in-vehicle means, preferably associated with an independent unit, or complementary means to which a dependent unit may have access, may include but not be limited to:

Positioning means including but not limited to: GNSS based positioning using a positioning means such as a GPS receiver and/or Galileo receiver and/or GLONASS receiver and/or BeiDou receiver and/or Compass navigation system receiver and/or differential GPS receiver and/or GNSS receiver supported by data from an augmentation system such as EGNOS and/or a positioning means such as differential GPS RTK and/or GNSS receiver supported by map matching, or a positioning means such as localization means on roads used to see beyond sensing with high definition/resolution road and/or lane maps wherein localization means may include sensors such as Laser scanner(s) (LIDAR) and/or radar(s) and/or camera(s) supported by computer vision estimation methods to determine the location of a vehicle on road maps typically on high resolution maps serving autonomous vehicles.

Computation means including CPU, memory and non volatile memory,

In-vehicle (on-board) communication means to communicate with a DNA application, which may require wired or wireless communication and which in case of wireless communication may enable, for example, communication with a DNA application installed on a smart phone and/or with an in-dash DNA or with a DNA integrated in an in-car entertainment system (also known as in-vehicle infotainment system); and which wireless communication may be implemented through for example Bluetooth communication and/or Wi-Fi and/or through for example in car communication means enabling to communicate with in-vehicle devices using communication means such as available with connected cars which further enable to utilize by a toll charging unit in-vehicle available resources and data required with a toll charging unit functionality including, but not limited to, the ability to communicate with an in-car entertainment system which usually includes a DNA, with devices including vehicle positioning means, with devices including computation resources, with on board means which stores vehicle authentication related data such as for example certified data source for vehicle identification number and/or vehicle registration number, with device which may serve directly or indirectly as a means for Internet communication including but not limited to communication through mobile cellular networks and/or through Wi-Fi, and/or through Dedicated Short Range Communication (DSRC)—enabling a toll charging unit functionality to communicate further with a toll charging center or a toll charging center functionality.

Communication means to communicate with a toll charging center or a toll charging center functionality indirectly, through for example communication means installed on the toll charging unit enabling the toll charging unit to communicate with connected car wireless communication means and/or enabling to communicate with in-vehicle Internet communication means, or for example, with a Smartphone Bluetooth communication means and/or, for example, with in-vehicle Dedicated Short Range Communication (DSRC) used with Intelligent Transportation Systems (ITS) for vehicle to infrastructure and possibly also vice-versa (infrastructure to vehicle). In case of DSRC, time related positions of a vehicle for toll charging can be determined according to road side infrastructure locations rather than by in-vehicle positioning, and in such a case a GPS receiver may be used with a toll charging unit as an option, for example, to improve resolution of vehicle positioning for non-dense DSRC road side infrastructure and/or to increase limited coverage of DSRC through other communication network(s) such as cellular mobile networks.

communication means to read vehicle authentication data through for example connected car wireless communication means enabling to communicate with in-vehicle means which store vehicle authentication related data such as for example certified data source for vehicle identification number and/or vehicle registration number, or, for example, to receive vehicle identification number through on-board diagnostic connector or on-board diagnostic port in the vehicle or through a split of an access to on board diagnostic port, and which authentication data is transmitted when communicating with a toll charging center with respect to a road toll transaction.

communication means through which data related to a vehicle operation mode, entitling the vehicle with road toll privileges, is updated indirectly through, for example, connected car wireless communication means enabling to communicate with in-vehicle means which stores data related to vehicle operation mode such as, for example, certified usage of path controlled trips and/or other modes such as contribution of a vehicle to safely driving and/or to safe and efficient distance kept from other vehicles in its vicinity especially useful with automatic driving mode of autonomous vehicle, or directly, with devices in which such data is stored, and which indication of such data is transmitted when communicating with a toll charging center with respect to a road toll transaction.

An alternative to upgrading a non independent toll charging unit by complementary means may use a vehicular platform to be upgraded by toll charging vehicular unit functionality which may refer but not be limited to vehicular platform such as, for example: an in-car entertainment system; a GNSS tolling on-board unit applied for example with road pricing for tracks in Europe; sensor(s) based localization of a vehicle on a road map (used for example by autonomous vehicles for positioning a vehicle on in-vehicle high resolution road map); a driving navigation aid (DNA), including but not limited to a DNA based on a satnav or a DNA used for example with an autonomous vehicle; a black box installed on a vehicle to track driver behavior, for example for insurance related applications; a green box installed on a vehicle to track driver behavior; an Advanced Driver Assistance System (ADAS) which for example may refer to ADAS based on camera(s) and/or radar(s) and/or other sensors for warning drivers and/or a control system using such sensors to support various levels of automated vehicle classification such as Level 1 up to level 5 determined by the Society of Automotive Engineers; a GNSS based vehicle position tracking device; a telematics unit; a driving navigation control aid associated with an autonomous vehicle supported by a DNA which feeds a control system of an autonomous vehicle; an in-vehicle DSRC unit; a vehicular platform constructed by more than one of the mentioned platforms (hereinafter the term vehicular platform which may refer to a vehicular device, may further be used interchangeably with a platform constructed by a plurality of vehicular devices and have the same meaning from functionality point of view). Such vehicular devices provide platforms for an upgrade by a toll charging vehicular unit functionality to implement an application which motivates the use of path controlled trips, for example, by free of charge road toll or by provision of discount to toll charge. In this respect road toll might not be the only means to motivate usage of path controlled trips. For example, mass usage of autonomous vehicles on the network should create a need to apply path controlled trips on networks in order to at least prevent non desirable traffic development as a result of non coordinated guidance, but this by itself can't guarantee high utilization of a network which suffers from high traffic load due to high demand of trips, and for which case there is a need to also dilute traffic by for example a road toll charging system, and which free of charge toll at early stages and toll discount at advanced stages may enable. Therefore, in order to guarantee high utilization of a road network, path controlled trips usage supported by traffic dilution should be considered according to needs. In this respect it should be noted that usage of path controlled trips contribute by itself to traffic dilution and which traffic dilution on the network increases with the increase of the share of path controlled trips in the traffic and which toll charging may further increase the dilution according to needs (if path controlled trips are not sufficient to generate desirable flow under highly traffic loaded network). Some other vehicular platforms, which according to some demonstrative embodiments of the invention may be upgraded in order to motivate path controlled trips usage, are black boxes and/or green boxes used to evaluate the level of entitled privilege for discounts in insurance policy price for cars, which price is determined according to various parameters and which parameters may include behavior of drivers and/or the annual mileage of a vehicle. According a demonstrative embodiment, additional discount to insurance policy price may be obtained by a black box or a green box indirectly if efficient path control is used. Path controlled trips which may reduce mileage, contributes to discount privilege according to mileage parameter supported by black boxes and green boxes records. According to a demonstrative embodiment, a condition to obtain discount by a black box or green box is to contribute to traffic improvement by path control and which such a condition may motivate usage of path controlled trips. Such an approach may serve government authorities which, for example, through one authority control on the cost of insurance prices relates to human injuries in case of car accidents may be applied, while through another authority responsibility for traffic improvement may further be applied. In this respect, increase in usage of efficient path controlled trips may have progressive contribution to trip time reductions on the network, and hence to risk reduction as well, which may motivate promotion of path controlled trips by government authorities and insurance companies. However, this approach by itself can't guarantee high utilization of a network which suffers from high traffic load and for which case there is a need to dilute traffic by for example a road toll charging system and which free of charge toll at early stages, and toll discount at later stages, may motivate path controlled trips usage supported by traffic dilution according to needs. That is, road toll which should be considered sooner or later as a means to dilute traffic on the network, may be used at an initial stage to encourage path controlled trips by providing preferably free of charge toll to path controlled trips and when this approach becomes exhausted then road toll may start to be implemented to dilute traffic in conjunction with toll discount for path controlled trips. According to embodiments, toll charging unit may either refer to a dedicated unit or to an upgraded vehicular platform which enables functionality of a toll charging unit, and which software and/or hardware that are used to upgrade a said vehicular platform are subject to implementation decision to take benefit of software and/or hardware elements which in common can be used by a said vehicular platform and by the toll charging unit functionality.

Since a toll charging vehicular unit functionality which provides upgrade to vehicular platforms might not be distinguished from the functionality of a standalone toll charging unit, the term toll charging unit used by descriptive embodiments of the invention may refer to both implementation possibilities although the unit in this respect might be reduced to software implementation level.

According to some embodiments, path controlled trips, which are encouraged to be used by free of charge road toll or by toll discount, are supported during a trip by a toll charging application, preferably installed within a toll charging unit, which record positions of the vehicle at an acceptable frequency, using preferably non volatile memory. Records of positions which may be related just to selective roads or selective parts of roads (in case that the toll charging application and data apply selective records) are used as a reference for comparison with records of positions of trips that according to path control were recommended for a trip, for example through a DNA application. Trips which are found to be following routes according to path control and which related positions of trips were preferably transferred to the toll charging unit installed in the vehicle, for example from the DNA vehicular application, will be entitled to receive discount or not being charged by toll.

According to some embodiments, the toll charging unit may transmit to a toll charging center positions which characterize a trip and which trip or part of it may be entitled for a privilege of toll discount or free of charge toll such as in case that the path control is used with the trip. According to an embodiment, trips which are entitled to be free of charge can be saved from being transmitted to a toll charging center for privacy preservation reasons and can be erased from user facilities.

According to some embodiments, encouraging usage of path controlled trips by entitling free of charge privacy preservation toll includes, for example, recording at an acceptable frequency positions of a vehicle during a trip by a toll charging application installed for example on a said toll charging unit, in order to acceptably characterize a trip for a possible need to charge toll if obedience to recommended path control trip was not performed.

If a path controlled trip is performed according to a DNA application, then the DNA application will preferably transfer trip positions that characterize the path controlled trip to the toll charging unit during, or after the trips ends. The toll charging unit will use a trip comparison process to compare its position records with the path controlled position records and determine whether the trip is found to be substantially the same.

According to some embodiments, if the trips were found to be substantially the same, then, according to predetermined criteria, no charge will be assigned to such a trip. According to some embodiments, positions which characterize a non charged trip will be erased from the memory of a toll charging unit, that is, there is no need to keep such records in the toll charging unit, if there is no need to involve external facility such as a toll charging center which toll charges.

According to some embodiments, trip related data which are transferred from a DNA application to a toll charging unit will be authenticated as data which relate to a path controlled trip tracked by a toll charging unit by the support of a toll center related trip authentication process, which is an authorized trip authentication process, and which process may preferably be a common process related to a path control system and to a toll charging center; wherein, a non source identifying path controlled trip related characteristic is used in common by a toll charging unit and a DNA, preferably before and during a trip, and wherein the trip related characteristic is constructed of a number or characters, or a combination of both of them; and wherein, generation of the trip related characteristic is performed according to some embodiments preferably by the trip authentication process, and preferably as part of a request for a path controlled trip; and wherein according to some embodiments authentication is based on reception of the trip related characteristic by the DNA and by the toll charging unit independently under the control of a toll center related trip authentication process by an acceptable independence.

Independence according to some embodiments may be implemented by using independent communication channels by the DNA and by the toll charging unit, or by at least acceptably independent applications using a common communication channel with the trip authentication process. Independent reception of a common trip related characteristic may enable to check by a toll charging unit authenticated data received by the toll charging unit from a DNA, such as trip related positions associated with authentic trip related characteristic which is common to the DNA and to the respective toll charging unit that serve a path controlled trip.

According to some embodiments, a trip related characteristic may be generated by a DNA related process or by the toll charging unit related process and be transferred for an authentication of common path controlled trip data, from one to the other, through an authorized trip authentication process. According to some embodiments, in order to facilitate a trip comparison process, time synchronized positions can be taken by a toll charging unit and by a path controlled DNA application during a trip, wherein synchronization can be made according to predetermined procedure which facilitates common positioning for a trip comparison process. A Global Navigation Satellite System receiver, such as a GPS receiver, can be used as a common positioning and timing source for the DNA application and for the toll charging unit. In some embodiments, synchronization can be made between a DNA application and a toll charging unit, by using a common positioning means such as a GPS receiver installed in a toll charging unit, in order to reduce positioning and timing ambiguity.

According to some embodiments, predetermined location based records of positions, for the comparison, may be generated by a process which guarantees higher match between the records, wherein predetermined positions on a road map are used to determine locations for positioning records on a road map, which is available to the path controlled DNA application and to a toll charging unit application, and which positions and respective times are recorded as a result of passing a predetermined position during a trip.

With such an approach, differences in positions that characterize trips by a toll charging unit and positions that characterize path controlled trips by a DNA, will not be an issue with the trip comparison process. In this respect the differences in timing of trip positioning records might also not be an issue if it is assumed that the positions were recorded within a time interval that allows differences which may have no effect on ability to accept that the compared trips by the trip comparison process refer to the same trip.

According to some embodiments, privacy preservation of trips associated with toll charging procedure can take benefit of a road map wherein access to the map is available to a toll charging unit. According to some embodiments, a road map, which may or may not include the positioning records with respective attributes of predetermined locations, may include updated attributes for time dependent toll charging values assigned to roads. Updates may be applied either by access to such common data on a remote server or by receiving such respective data.

According to some embodiments, such charging values may enable on board (in vehicle) calculation of toll charge amount per trip, preferably by a toll charging unit which is authorized to convert records of positions that characterize trips—into a toll charging amount, according to a road map having attributes of charging values for passing roads or road segments, for example according to daily time intervals.

According to some embodiments, the attributes of charging values may enable to use different charge values for different hours and for different roads used during a trip. In this respect said different types of trips may refer to trips or part of trips that followed assigned path to path controlled trip and trips that were not using or were not following paths assigned to path controlled trips.

According to some embodiments, the road map and respective updates are received by the toll charging unit, for example, by reading updates from a remote database server which may be part of the toll charging center, for example, directly through communication means of the toll charging unit, or, for example, indirectly through Bluetooth which communicates with a Smartphone and which Smartphone communicates with a database server.

According to some embodiments, after determination of the accumulated amount of the toll charge, by a toll charging unit, the amount will be transmitted to the toll charging center according to a predetermined procedure which identifies the car but does not have to expose trip details while enabling toll charging. Such privacy preservation may support toll charging in case of toll discount and/or charging toll of non path controlled trips used to encourage path controlled trips, including cases of charging toll without relation to free of charge path controlled trips or discount for path controlled trips.

In this respect, with path controlled trips which are aimed at providing free of charge service, there is no reason to disclose the sources of trip related data, and therefore, the service needs no special privacy preservation technique to handle personal trip related positions and destination data. However, in case that path controlled trips are encouraged to be used by toll discount or free of charge toll, according to trips, a privacy preservation technique is required in order to prevent reluctance of usage of path controlled trips which negatively affect path control performance. Therefore, disclosure of trip related data, which is considered to be associated with a toll charge transaction should be avoided, even though such data may be encrypted, and the said privacy preserving toll charging may assure the nondisclosure of trip related data.

Free of charge toll or toll discount, provided with path controlled trip usage, may need legal enforcement means in order to guarantee high path controlled trips usage. According to some embodiments, a GNSS tolling system based on car number plate identification (using Automatic Number Plate Recognition—ANRP) may be used to transfer time related location of identified vehicle to for example a toll charging center. According to time related car number plate identification, interaction with a respective toll charging unit may be activated for example by a toll charging unit, wherein such activation may at least determine whether a toll charging unit was active in the identified vehicle at the time the car plate identification was activated. If the result is that the toll charging unit was active at that time, then according to the toll charging policy associated with the use of toll charging unit may be activated at any time determined by the system according to respective policies. If the result is that there was no response from a toll charging unit, or there is no associated toll charging unit within the identified vehicle, then a toll charge enforcement procedure may be activated, enabling a further possible procedure that should exclude enforced toll charging in case of a failure to interact with a toll charging unit for which the charged driver has no responsibility.

According to some embodiments, a GNSS tolling system based on car number plate identification may be deployed for some of the roads, that is, not all roads on a network may be monitored by such infrastructure, in order to reduce cost of infrastructure which may relate for example to roadside infrastructure. With such limited coverage approach enforced toll may still be effective if high toll charge is applied to discourage non path controlled trips while encouraging path controlled trips by free of charge toll or toll discount with the support of a complementary toll charging unit.

According to some embodiments, said toll enforcement, as well as path controlled trip usage toll privileges with privacy preserving toll charging functionalities described with vehicular toll charging unit, may upgrade a GNSS toll charging system to include such functionalities wherein GNSS positioning may be substituted by sensor localization on a map in case of for example autonomous vehicles. According to some embodiments, DSRC system can be used to perform interaction with a toll charging unit if DSRC in car units are used by cars to communicate between a toll charging center and toll charging units. According to some embodiments, in case that two way communication DSRC usage is mandatory according to regulation then DSRC may provide a substitution to car plate identification functionality as described above. Privacy preserving path control, supported by privacy preserving free of charge toll or toll discount, may reduce reluctance to use path controlled trips and as a result high usage of path controlled trips which is expected to be developed, may enable to generate high degrees of freedom and to apply efficient network traffic load balancing being supported by:

a. Improved traffic mapping constructed by enriched anonymous position related data tracking of vehicles during their trips which may according to some embodiments feed, for example, a traffic mapping process within a path control system or, for example, a traffic mapping process within a functionality of a path control system which for example upgrades a driving navigation system platform, or a traffic mapping process within an external traffic mapping means which serves a path control system or a said functionality of path control system, wherein external traffic mapping means may include a traffic mapping process within a driving navigation system platform or within a toll charging center, which may feed a path control system or a path control system functionality with mapped traffic, and wherein the source of positions related data may be a toll charging units, or a functionality of a toll charging unit which upgrades said vehicular platforms, and/or a DNA or a functionality of DNA integrated within a vehicular system platform such as an autonomous vehicle control platform and/or in-car entertainment system which may include functionalities such as for example a DNA and/or in-car wireless communication such as LAN and/or Internet connectivity and/or vehicle diagnostics control, or a DNA application on Smartphone, and/or a Smartphone (independent of a DNA application), and/or said vehicular platforms which can be upgraded by toll charging unit functionality, and/or said upgraded vehicular platforms with toll charging unit functionality. According to some embodiments, anonymous position related data are transmitted from toll charging units to a path control system, According to some embodiments, anonymous position related data are transmitted from toll charging units to a mapping means which serves a path control system. According to some embodiments, anonymous position related data are transmitted from DNA to a path control system, According to some embodiments, anonymous position related data are transmitted from DNA to a mapping means which serves a path control system. According to some embodiments anonymous position related data are received by a path control system from a driving navigation service platform or from any system which serves either said vehicular platforms or said upgraded vehicular platforms or from both systems.

b. Improved DTA based synthesized traffic predictions, using enriched anonymous position to destination data as demand pairs of trips, which enables the DTA to feed substantially at real time enriched authentic trip events to the DTA supply model and which enables a demand prediction model to be fed by enriched authentic current and past events to feed by predicted trip events the DTA supply model to synthesize traffic related predictions. The source for positions and destinations related data may be toll charging units or a functionality of a toll charging unit which upgrades said vehicular platforms, and/or DNA, and/or a functionality of DNA integrated within a vehicular system platform such as an autonomous vehicle control platform and/or in-car entertainment system of a connected car, and/or in-dash DNA and/or a DNA applications on smart phones, and/or a Smartphone (independent of a DNA application), and/or said vehicular platforms which can be upgraded by toll charging unit functionality and which a toll changing unit is fed by trip destination originated for example with the support of a DNA and transmitted to a toll charging unit or to a toll charging unit functionality. According to some embodiments, anonymous trip related position and destination data are transmitted from toll charging units to a path control system. According to some embodiments, anonymous trip related position and destination data are transmitted from toll charging units to a mapping means which serves a path control system. According to some embodiments, anonymous trip related position and destination data are transmitted from DNA to a path control system, According to some embodiments anonymous trip related position and destination data are received by a path control system from a driving navigation service platform or from a system which serves said upgraded vehicular platforms.

Privacy preserving path control, supported by privacy preserving free of charge toll or toll discount, may reduce reluctance to apply and use path controlled trips usage and may therefore enable to generate high usage of path controlled trips, which with said improved traffic mapping and traffic prediction provide good conditions for high performance traffic load balancing. Performance of traffic load balancing has direct and indirect aspects. That is, traffic load balancing (which may refer also to the term load balancing) performed by a path control system, in case that path controlled trips are taking only a share in the trips on the network, contributes indirectly to the improvement of the entire traffic on a road network. To be more precise, even with a small percentage of usage of path controlled trips on the network it should be expected that the contribution of path control to aggregated travel time saving on the network will be significant. In such conditions, the majority of the aggregated travel time savings is expected to be a result of travel time savings to trips which are not using path control, although the travel time savings to the minority of the trips which are using path control is typically higher. Nevertheless, the increase in the share of path controlled trips usage on the network, which increases the performance of path control usage to all trips, should be the objective of a high performance enabled path control. In this respect, in one example, a system and method of path control may be considered from a wide perspective, which preferably includes the following aspects.

An operational aspect may refer to:
- An objective to create motivation to use path controlled trips, that is, to create conditions for potential maximization of path control performance on the network which enables to take benefit of the highest degrees of freedom to utilize the network potential in order to serve demand of trips on a network with the highest traffic flow.
- According to some embodiments, the objective is obtained by a "carrot and stick" approach which uses toll charge discounts or free of charge toll to motivate usage of path controlled trips.
- In this respect, free of charge toll, which is provided as a privilege to motivate path controlled trips usage, may justify an objective to improve traffic flow at a first stage, before a need to dilute traffic by toll; whereas, toll discount, provided as a privilege to motivate usage of path controlled trips, may be justified for a second stage in which reducing motivation to generate trips on the network, or on parts of it, is added.
- In some embodiments, free of charge toll is implemented for improving traffic as means to motivate high path control usage even though toll charging means did not exist prior to the implementation of path control.

According such embodiments, methods and system described above and hereinafter may be used as free of charge toll to motivate path control usage. According to another embodiment, methods and system described above may be used with toll discount charges to motivate path control usage.

Another complementary objective to the objective to obtain efficient usage of a road network, by high usage of path controlled trips, is safe driving; wherein high density of usage of cooperative safe driving apparatus may generate robust safe driving at a stage when autonomous vehicles become mature.

In this respect, an approach which may shorten the time to obtain both objectives may preferably apply provision of privileges to usage of cooperative safe driving apparatus as an expansion to a system and methods which may encourage high usage of path controlled trips for example by free of charge toll of toll discount. At such a stage, provision of privileges may discriminate among usage safe driving apparatus, path controlled trips or both.

Acceptance aspect to facilitate operation aspects may refer to:

In some embodiments, privacy preserving path control which need not identify the served vehicle by authentic data, and privacy preserving toll charge which may use systems and methods as described above that hide trip related data, may be used to facilitate acceptance of at least the first stage for traffic improvement by path controlled trips.

In some embodiments, privacy preserving path control on trips and privacy preserving toll charge, which may use systems and methods as described above, are used to facilitate acceptance of the second stage for traffic improvement by path controlled trips.

Additional acceptance aspect refers to fairness in providing path controlled trip recommendations, which is further described in some embodiments.

Another acceptance aspect refers to a preference of saving the need for drivers to change driving navigation service platform for using path control. Further to the non convenience issue involved with a change, there is a conflict issue with current services to DNA which already have invested in creating wide installed base of DNA users and may be interested to keep their share in the market. Therefore, in some embodiments, path control is provided as an upgrade on top of one or more available services providing driving routes to driving navigation aids, wherein path controlled trips or corrected paths to routes planed by a driving navigation system service according to path control, are provided by a path control system to a driving navigation system service which serves the driving navigation aids with driving routes and are transmitted by the driving navigation system service to driving navigation aids.

In some embodiments, the ability to provide path control service as an upgrade to a third party, such as a commercial service provider which serves driving navigation aids with driving routes, and which may claim that routes which may be required to be transmitted to a path control system, even though anonymously, are exposing information that may be associated with complementary data which may enable to identify a requesting source for path controlled trip, and hence may not be accepted by DNA users. Such claims can be countered by means which are described in the following. The first means is to provide an awareness notice to path control user which explains that the issue is a far-fetched issue and privacy preservation is kept. Awareness procedure may include confirmation for awareness acceptance. Awareness and acceptance confirmation may be applied either through a DNA application which is served by path control, or through an entry to path control application that activates a third party DNA application, for example, an application installed on a Smartphone or on in dashboard DNA.

In some embodiments, authentication of data associated with a toll charging unit may be confirmed by, for example, a checking procedure between a toll charging center and a toll charging unit which enables the toll charging center to be aware of whether an installed toll charging unit is still effective. Installation removal may be protected by, for example, monitoring non removal of the toll charging unit by remote sampling of the toll changing unit.

In some embodiments, authentication of a toll charging unit may use vehicle identification number that can be read through on board diagnostic connector of a vehicle and be transmitted along with toll charging procedures as related data to a toll charging center.

In some embodiments, disconnecting of a toll charging unit from on board diagnostic connector of a vehicle may be recorded on the memory of the toll charging unit, to provide indication on the need to reconfirm authorized use of the toll charging unit by, for example, sending a message to a toll charging center and/or to the driver through Bluetooth communication to a mobile application on a Smartphone or to an in dash DNA application or through any of said vehicular platforms upgraded by functionality of a toll charging unit.

In some embodiments, reconfirmation can be performed by first reading a record of mileage of a vehicle from the toll charging unit, which can be initialized with an installation of a toll charging unit by an authorized entity according the mileage of the vehicle and maintained by the toll charging unit during trips. After a reading, a comparison between the toll charging mileage record and the current mileage of the vehicle is performed and if no difference or small difference within allowed range is found then the toll charging unit may be re-authorized preferably without any further intervention. According to some embodiments, the comparison is made by reading car mileage into the toll charging unit through the on board diagnostic connector, or according to other embodiments the comparison is made visually by an authorized entity.

According to some embodiments, methods which are used to satisfy an authority or an insurance company for authentication of data on a black box or a green box can be used for the authentication of data which serves a toll charging unit or a said vehicular platform upgraded by functionality of a toll charging unit.

In some embodiments, privacy preserving checking of a bill which is related to details of trips can be applied upon privacy preserving toll charging. According to some embodiments, for a determined period of time, the toll charging unit will keep the trips and charging details stored on its memory, wherein such details can be available to be read, for example, by a Smartphone or by in-dash DNA through Bluetooth communication between the Smartphone or in-dash DNA and a toll charging unit. With such access to charging details, and possibly according to a printed version of such details, an appeal can be submitted for a non accepted bill.

According to some other embodiments, a toll charging unit functionality on a said upgraded vehicular platform enables to preserve privacy of trips records performed by toll charging unit functionality for a cost of elements which prevent remote access to trip data related to toll charging unit functionality or at least when it is not allowed by the keeper of privacy preserved trips related data.

Control technology related aspects may refer to:

A system and method which preferably apply a concept of predictive path control that coordinates paths of trips on a network to exploit freedom degrees on the network enabling to improve and preferably maximize traffic on the network, and which coordination of paths is supported by synthesis of controlled traffic predictions, preferably by DTA simulations performed according to planned paths associated with the coordination. These technological aspects should preferably be complemented by prior mentioned aspects which refer to the operational and acceptance aspects in order to enable to maximize performance of predictive path control.

In this respect high acceptance of operational aspects, may enable to generate high level degrees of freedom on the network for predictive path control, which coordinates paths, and which increases the performance of the path control due to high usage of path controlled trips.

High acceptance of an operation, applying predictive path control, has a major effect on the control efficiency which is beyond the ability to achieve higher control on the traffic, and which refers to the ability to enrich traffic and trip demand information which may enable more robust control due to reduction of errors in the mapping of the traffic conditions and the ability to support real time (on line) calibration of DTA if non full acceptance (usage) is applicable. In this respect the higher the percentage of path control usage the higher is the quality of predictive path control that can be obtained.

In some embodiments, demand of trips and possibly also parameters of the supply model of a DTA simulator are estimated respectively by/for DTA based predictions, for example, by state estimation method in which the DTA demand prediction model acts as a process model within the state estimation and the DTA supply model acts as the measurement model, wherein the state vector (hidden variables) of a state estimation method is the demand of trips represented by zone to zone (position to destination related zones) pairs. Furthermore, due to an increase in the domination of path controlled trips in the traffic, as a result of an increase in predictive path control usage, the dependency on stochastic route choice models, used by a DTA supply model, is reduced.

According to some embodiments, a method and a system which may be used for coordinating paths on the network should preferably have an ability to generate and maintain traffic load balancing on the network, by utilizing current and predicted degrees of freedom on the network. Preferably such a method and a system apply distributed computation with calculation processes to coordinate paths associated with path controlled trips, to guide drivers and/or to guide autonomous vehicles on a road network by driving navigation aids.

Such a method and a system, in order to be efficient, should encourage high percentage of usage of path controlled trips on a network, while path recommendations should preferably be provided on a fair basis, that is, taking into consideration that sets of paths which are planned intentionally to affect unfavorably on travel time of a trip, or travel times of part of trips, for the benefit of improving average trip times on the network, may discourage potential participation in such a path control service. Therefore, a coordination method should apply fairness constraint in order to enable wide acceptance, that is, from a point of view of drivers (and passengers) the interest of one driver should a-priori not be compromised for the benefit of others while cooperation may not be excluded with coordination processes. According to some embodiments, a path control method which enables to satisfy fairness, and at the same time to improve traffic flow on the network, can be applied by a system in which preferably each of the controlled paths are associated with a computerized agent process which maintains the interest associated with individual path controlled trip (hereinafter the term agent process may refer also to agent) enabling each agent to act according to common acceptable rules. According to some embodiments, parallel computation by agent processes is applied on a path control system, for example, a said path planning layer supported by a said traffic prediction layer, wherein each of the agents may according to a predetermined simplified procedure receive or have access to predictive path control related data which include but not limited to:

a. Destination and time dependent position pair for one or more path controlled trips,
b. Feedbacks on potential time related effects associated with substantial simultaneous planning of a set of paths by a plurality of agents, which refer to time related travel times and respective traffic volume to capacity ratios, and according to some embodiments to prioritized relatively loaded links,
c. Criteria to calculate a path according to the feedbacks,
d. Criteria to accept calculated path,
e. Criteria to assign an accepted path to a path control trip,
f. Schedule to maintain simultaneous, or substantially simultaneous, calculations by an agent with other agents.

The concept of applying fairness in coordinated path assignments for load balancing on the network, may preferably allow, under control, greedy as well as cooperative calculation of paths by agents according to the stage of the trip and the stage of the path control.

Preferably simultaneous attempts to improve travel times by agents according to developing freedom degrees on the network should be allowed from fairness point of view; as well as simultaneous attempts to mitigate potential negative effects on network links, due to said fairness consideration, should also be allowed; wherein both or at least the mitigation processes should be applied under control.

According to some embodiments, a cooperative process, which is aimed at enabling a gradual mitigation of potential overloads due to potential negative effects of planned path on the network, should also enable fairness considerations but with such a process fairness may be considered from a point of view of the result of convergence of the set of paths to apply load balance or at least to apply a more balanced traffic.

With such approach, tight path control may enable to maintain coordination of paths which apply both fairness and load balance on the network.

Coordination control processes which are aimed at converging the traffic toward substantial load balance may include but not be limited to: synchronization of processes preferably applied by distributed computation performed by agents to plan sets of coordinated paths, traffic prediction feedbacks to evaluate effects of planned sets of paths, traffic mapping, on-line calibration of a traffic simulation platform (DTA) according to the traffic mapping, coordination of input and output processes required with the planning of sets of paths for path-controlled trips.

According to some embodiments, agents may be applied as hardware to accelerate path calculations.

According to some embodiments, part or all path calculations are performed by agents installed on a DNA and which respective coordination control processes communicates with such driving navigation aids through for example mobile Internet.

According to some embodiments, coordination control processes, under limited computation power, are load balancing control processes applying dynamic identification of relatively loaded links having high potential to negatively contribute to load balance according to current and controlled traffic predictions, and accordingly may further determine current highest priority links for gradual load balancing on a network, and which such links are referred to as relatively loaded links stored as a content of a load balancing priority layer.

Such a layer, may support gradual load balancing by coordination control processes, for example, as part of a path planning system layer supported by the traffic prediction layer, and may be updated by currently anticipated relatively loaded links which may have potential negative effect on the load balancing.

Relatively loaded links associated with load balancing priority layer enable to substantially synchronize planning of paths for gradual load balancing of traffic which determination of relatively loaded links may include static and dynamic determination.

Static determination may refer to virtual determination of links as relatively loaded links, which links may not necessarily be loaded by traffic, wherein the aim of determination of such links as relatively loaded links should be a need to exclude links from network resources on which traffic load balancing is applied. Moreover, such links if are becoming relatively loaded links they should preferably be diluted as part of the load balancing. Such links may refer to network links on which traffic load balancing may, for example, disturb quality of life such as living or business defined areas and from which, as part of load balancing, traffic should be diverted to a part of a network on which load balancing is applied.

Dynamic determination of such links may be required under limited computation resources to apply, according some embodiments, gradual traffic load balancing on the network or part of the network on which load balancing is applied, and/or, according to some embodiments, to apply dynamic constraints on network links according to which traffic is diverted from relatively low capacity links towards a part of the network on which traffic is or planned to be concentrated for load balancing, as further elaborated.

In this respect, under non-recurrent, or under exceptional traffic conditions, for which computation resources of the coordination control processes are insufficient, determination of prioritized relatively loaded links in a load balancing priority layer may enable not to lose control on maintaining convergence toward load balance although the load balancing is less tight in such cases.

Examples of causes for which prioritization of relatively loaded links should preferably be used are: traffic development which may relate to an exceptional demand of trips (football game event etc,) and/or incident(s), and/or a situation that creates a need to evacuate or to dilute traffic on a link or on a certain part of a network, and/or any other high change in the dynamics of the traffic for which the given computation resources may be too weak to apply sufficient control on traffic load balancing, for example, by predictive coordinating path control system applying load balancing control processes associated with coordination control processes.

According to embodiments which is adaptive to dynamic constraints according to which the load balancing is dynamically concentrated on parts of a network, while traffic is diluted from less preferred links, substantial robust traffic load balance may be maintained under limited computation resources for large dynamic range of traffic dynamics and loads on the network.

According to some embodiments, indication for a need to apply dynamic concentration of traffic may be an identified reduction, or identified anticipated reduction, in control on the traffic load balance which has but may not afford required frequency of control steps (cycles/phases or iterations/sub-phases) to generate or maintain substantial load balance on the network. In such a case, priority may be given, preferably temporarily, to coordination control processes on links having relatively high flow capacity potential on the network by diluting the non load balanced part of a network and concentrating the traffic on relatively high flow capacity links on the network.

According to some embodiment, an indication of inability to apply required frequency of control steps may be provided by evaluating updated data about the overall current and preferably also respective anticipated relatively loaded links on the network (not just links associated with the load balancing priority layer) during the load balancing. In this respect, if there is no decrease, or there is insufficient decrease, or otherwise an increase in the number and/or in the level of load associated with overall relatively loaded links, then, preferably according to a match with stored data, respective constraint is determined for desirable concentration of the traffic flow on restricted part of preferred links on the network.

A said match with stored data may refer to a match between time related patterns of traffic volume to capacity ratios of the current, and preferably respective recent and predicted traffic on links of the network, and time related stored data of traffic scenarios which contain patterns of traffic volume to capacity ratios on links of the network associated with stored desirable concentration of traffic on the network.

According to identification of an increase or insufficient decrease in overall relatively loaded links during coordination control processes, a search for a said match of current patterns with stored patterns may indicate on transition to desirable flow concentration on the network. A match may be performed between a single pattern or preferably a set of patterns that represent the traffic dynamics and stored patterns associated with respective recommended concentration of traffic flow. The stored data may be constructed by off-line simulations of coordination control processes that may prepare storage of desirable concentrations of the flow for certain patterns. The higher the resolution of the traffic simulation scenarios the richer is the storage, and the higher is the efficiency of such a method. In this respect, the increase in the resolution among the different scenarios of patterns may enable to find a closer match with the current pattern or a current set of patterns.

Such a method may be applied further for traffic development that allows to reduce limitations on the concentration of the traffic on the network with respect to computation resources which method applies coordination control processes under sufficient increase in the stability of load balance. In this respect, the search for a match will be due to, for example, identified reduction in the number, and preferably the level, of overall relatively loaded links on the network. Such identification may be performed for example by tracking and comparing, along recent coordination control processes, the dynamics in the patterns of overall relatively loaded links.

In this respect, stored patterns that are indicating on traffic dynamics, which allow increase in the number of preferred links associated with reduction in the traffic concentration, may be prepared by off-line computer simulations applying coordination control processes for different dynamics in traffic.

The update of a storage with respect to relation between different dynamics in traffic and desirable use of a part of a network, preferably according to time intervals during a day, may be triggered by real time identified situations which may require off-line simulation to support future real time similar situations according to which the same or similar change in the concentration of the traffic on a part of a network may enable acceptable anticipated improvement in coordination control processes.

In this respect, the update of the storage is a sort of a learning process which may progressively include more scenarios in said storage, and therefore it is expected that the said storage will be searched for a match that may sufficiently be acceptable according to similar characteristics of traffic, and which search for a match does not compel to find a full match if there is no such possibility. Thus, due to some ambiguity in a match, different real time scenarios may share a common acceptable match to determine preferred concentration of traffic on part of the links of a network.

A new load balancing priority layer should be re-determined after determination of preferred links on the network on which traffic should preferably be concentrated and load balanced by coordination control processes.

As mentioned before, the objective of dynamic increase or decrease in traffic concentration on a network is to enable optimal usage of the computation resources for acceptable control on the load balancing. Such control should preferably maintain at the worst case short-term reaction to the main flow, by accelerating the convergence to substantial load balance on preferred part of the network, preferably on links that have relatively high traffic flow potential, and diverting traffic to such links if there are no further restrictions (e.g., a destination of a vehicle on a non preferred link).

After obtaining substantial load balance on preferred links, the level of traffic concentration may be reduced to include, or gradually include, more preferred links (converted from non-preferred to preferred links) in order to enable traffic load balancing on a higher network resolution for further exploitation of the network by coordination control processes.

According to some embodiments, according to which dynamic constraints on the controlled network are considered, more effective control cycle (i.e., phase) or a control iteration (i.e., sub-phase) may be applied by coordination control processes for a cost of less effective usage of the network from time to time. In this respect, more effective control is a result of the ability to apply smaller effect of control steps (cycles/phases or iteration/sub-phase) with a non linear system (modeled by a DTA supply model).

However, the potential attractiveness of load balance, or acceptable load balance, which may be expected from load balancing, and which should attract obedience to the path-controlled trips, could be lost under a constraint to apply load balancing on a part of a network. In this respect, diluted non-preferred links on the network may result in non obedience to paths of path controlled trips on the load balanced part of the network due to freedom degrees which are developing on another part of the network.

Nevertheless, the incentive to use path controlled trips due to privileges such as free of charge toll or toll discount, which according to some embodiments may be applied for substantially the entire network, and the objective to maximize usage of the network with a tendency to converge to load balance under reasonable control constraints, may maintain high obedience to controlled paths assigned to vehicles according to coordination control processes by applying negative incentive associated with the free of charge toll or toll discount on non preferred links on the network. In this respect free of charge toll or toll discount will not be provided on said non preferred links on the network.

With such approach, a pure commercial solution may not applicable for efficient implementation of load balancing, which should be associated with negative incentives of non privileged tolling on said non preferred links and which efficient load balancing requires regulation with respect to the negative incentives to be applied on non load balanced part of the network. Such approach which is associated with negative incentives may further be expanded to determine non-preferred links associated with dynamic needs to handle traffic under exceptional conditions which, for example, may include a need to dilute traffic or even to evacuate traffic from links or regions in which there is a danger or, for example, a need to enable rapid access of emergency vehicles.

Under privileged tolling, according to some embodiments, coordination control processes are gradually applied for increasing percentage of usage of coordinating path controlled trips in the traffic, for example, in order to enable adaptation of freedom degrees applied with coordination control processes to ratios of time related demand to traffic supply on the network.

In this respect, gradual calibration of freedom degrees may include for example said dynamic assignment of preferred links as well as a need to cope with shortening the convergence time of coordination control processes by consideration of insufficiently small but still effective control steps which have non linear effect on the network.

An issue in this respect may refer to non linear varying travel times on links as a result of varying volume to capacity ratios on different links having different lengths and different capacities that under coordination control processes should enable convergence toward load balance with respect to fair assignment of paths enabling to arrive to destinations through different alternatives (due to the need to obtain substantial load balance) according to coordination of path-controlled trips subject to some differentiating effect due to given limitations on the control.

Adding to such an issue non-linear effect of merger of traffic among such links, makes the issue to be worse with respect to potential instability in the process which should enable convergence towards load balance. Instability may include substantially stable oscillations and non-stable oscillations such as propagated and increasing oscillations on the network with respect to calculated paths, and for which, according to some embodiments, forced traffic distribution and refinements to control steps are applied for acceptable level of non oscillating calculated paths or otherwise for non acceptable oscillation of potential relatively loaded links on the network.

During gradual increase in the usage of said coordinating path controlled trips, the percentage of non coordinated trips may preferably be guided according to path controlled trips which reflect route choice behavior model in a pre-coordinated traffic stage, preferably reflecting a typical set of routes which are possibly chosen from a calibrated stochastic DTA route choice model. The use of the typical set of routes may enable acceptance of such approach and may guarantee robust traffic predictions based on predictive path assignments, wherein coordinating and non coordinating paths may be assigned randomly to path controlled trip users in order to maintain fairness in the type of the assignment along the time while maintaining a certain percentage of coordinating path controlled trips in the traffic.

According to some embodiments, in order to enable obedience to path control in a preliminary stage in which a certain percentage of coordinating path controlled trips is maintained, obedience may be encouraged by entitling all path controlled trips with the same privilege, that is, provision of free of charge toll or toll discount, even though not all the controlled trips are coordinating path controlled trips. In this respect the negative incentive associated with free of charge toll or toll discount may guarantee the obedience to any type of path associated with path controlled trip, and a said random assignment of coordinating and non coordinating path controlled trips may enable to maintain fairness in the assignment.

In this respect it should be noted that significant indirect improvement in travel time is expected to be gained by the non coordinating path controlled trips through even small percentage of coordinating path controlled trips on the network.

According to some embodiments, said negative incentive associated with free of charge toll or toll discount privileges is applied by preventing to obtain privilege for trip if the trip uses said non preferred links, that is, for example, when a non coordinating or coordinating path controlled trip bypasses preferred links on the network (on which traffic is concentrated or planned to be concentrated) by passing through non preferred links, if such links are not used by a trip as a destination.

According to some embodiments, an indication that a link is used as a destination may be a stoppage criterion which entitles a trip for a privilege, according to which a trip has to stop for a minimum time interval in order that a link will be considered as a destination. In other words, indication about a stoppage under such privilege constraint may exclude a trip from being considered as passing through such links. This may be applied by tracking the trip details (preferably supported by privacy preserving privileged tolling as described with some embodiments) and determining accordingly, by for example a vehicular toll charging unit functionality (described with some embodiments), whether non preferred links were used as a destination or not.

In this respect, according to some embodiments, privilege entitlement may be applied by free of charge toll or toll discount which includes a privilege entitling criterion according to which traveling from preferred links to non preferred links and back to preferred links require that a trip will be stopped for a minimum predetermined time on non preferred links.

Concentration of traffic by diverting the traffic from a higher network resolution to a lower network resolution, that is, diverting traffic towards a preferred part of the network, or vice-versa, may use respectively an encouraging or a discouraging means with calculations and assignments of paths.

In this respect, under increase in the level of a constraint to concentrate traffic on parts of the links of a network (on preferred links), a discouraging process may increase synthetically the travel time entry costs to non-preferred links from preferred links by a value that is higher than the real travel time costs, in order to dilute traffic on non preferred links by path planning processes which may include coordination control process for trips which pass through preferred links.

Under a decrease in the level of a constraint to concentrate traffic on the network, an encouraging process to use links which may become converted into preferred links (from non preferred links) a decrease in the travel time entry cost value for such links may be applied by assigning real travel time costs or gradually decreasing synthetic costs for calculation of paths, wherein gradual change in the cost may enable moderate entry to such links in order to prevent potential traffic overloads during re-distribution of the traffic. For example, at the beginning of a redistribution the travel time costs can be lower in comparison to travel time costs in a more advanced distribution stage, wherein the travel time costs should converge to the real costs at the end of the re-distribution, preferably towards substantial load balance on preferred links.

With respect to a need to stabilize substantial load balance under reasonable utilization of computation power resources, there would preferably be a need to prevent overload on computation resources required to generate and maintain substantial load balance on preferred links of a network.

According to some embodiments, this may be applied by not allowing changes in path calculations, due to small changes in travel time costs on the network, which for a small, or for non-meaningful, benefit may either overload the computation resources along convergence towards load balance or under substantial load balance conditions (by unacceptable frequent and marginally benefiting calculation of paths), or create a need for non justified computation resources for an expected marginal benefit.

The non-desirable effect of small changes in travel time costs on calculation of paths may be reduced to an acceptable level, for example, by allowing discrete changes in travel time costs on links Such discrete changes may be adapted to enable affordable computation resources to cope with more stable and less frequent path calculations that are still acceptable from cost performance point of view.

According to some embodiments, said discrete travel time costs may preferably refer to time dependent travel time costs that include current and predicted travel time costs, preferably according to controllable DTA traffic predictions. In this respect, the proportion among travel time costs on non-preferred links, which may be modified to represent non real travel time costs for calculation of paths, should preferably maintain the proportion among links which real time costs reflect, that is, enabling to maintain the ability to apply path calculation and assignments for effective paths to destinations on, and to, non-preferred links according to time dependent travel time costs applied with time dependent shortest path calculations.

This method should preferably be applied with said dynamic and static assignment of non-preferred or otherwise preferred links on the network.

According to some embodiments, a complementary method to a method which prevents frequent and non sufficiently stable changes in path assignments, by said discrete changes in travel time costs, is applied by assigning a calculated alternative path to a path controlled trip under a path assignment criterion, preferably an adaptable criterion according to traffic conditions, which require that some minimum potential reduction in travel time of a trip (improvement of a path assigned to a trip) may be anticipated to be obtained by the alternative path in order to justify a modification to an assigned path associated with a path controlled trip.

In this respect, an assigning criterion for making a modification to a path according to calculated alternative path may differ from a criterion to apply discrete levels for travel times, and/or usage of further described coordination control processes, in order to prevent too frequent path calculations.

Consideration that may have to be taken into account with making modification to an assigned path may include, inter-alia, reaction time to a modification by human driver or by an autonomously driven vehicle, and/or human reaction to frequent changes to paths, as well as sufficient sensitivity of path assignment to generate traffic flow improvement on the network which should sufficiently satisfy both, users of coordinating path controlled trips and authorities that may be expected to be involved in regulation for applying such approach.

According to some embodiments, after obtaining substantial load balance under a constraining level that limits said preferred links on a network, the concentration of traffic on part of the network may be allowed as mentioned before to be reduced or eliminated by allowing more links to be preferred links on the network.

A reduction in a constraint level may be performed according to identification of reduction in the overall relatively loaded links and possibly also under conditions of sufficient reduction in traffic loads in order to prevent rapid changes that may cause loss of control. In this respect, the control may divert traffic to be distributed on the network at a higher level of flow, that is, to make the traffic concentration on the network for less dense traffic load balancing.

The transition from one level of traffic concentration on a network to another level may depend on acceptable level to control traffic load balancing, and should preferably consider that transition from one level of traffic concentration to another level may not take benefit of tight load balance of a previous level, and therefore, less than tight load balance may preferably applied if a transition to less concentrated traffic on the network is considered.

In this respect, the objective to increase the number of preferred links is to improve the traffic flow, if it becomes affordable by the computation resources, while the objective to decrease the number of preferred links is to guarantee acceptable control under high changes in traffic dynamics.

According to some embodiments, transition from one concentration level to another should be sensitive to include anticipated time related positions of vehicles traveling from non-preferred links towards preferred links and vice-versa.

In this respect, according to some embodiments, traffic simulations are applied for a network which includes the preferred and the non preferred links although from a point of view of path calculations coordination control processes may be applied on preferred links based on predicted trip entries from non preferred links.

Assuming that coordination control processes are performed continuously, from early hours in the morning until late hours in the evening (from substantial free flow to substantial free flow conditions on the network), it may be expected that said traffic concentration might be a need if at all from time to time, for example, due to significant changes in the traffic demand to supply ratios or due to irregularities in the traffic.

Without limitation to include more aspects, coordination control processes applying load balancing, under real time conditions, are expected to be performed daily on a continuous base (from early hours in the morning until late hours at the evening) with the aim to enable convergence towards affordable load balance for affordable part of the network under given computation resources and affordable non discriminating distribution of path controlled trips on the affordable part of the network under given traffic potential freedom degrees on the network and traffic control constraints.

Therefore, coordination of path controlled trips, may be designed to maintain load balancing without significant limitations. However, under non controllable irregularities in the traffic or in the traffic demand, the load balancing might face instability issues, Such issues may include said oscillations in path calculations due to competition on alternative paths and propagation of oscillations to some other or additional links on the network.

The issues may become worse, with respect to real time constraints for convergence towards substantial load balance, which a need for transition among different levels of said traffic concentration on the network makes the load balancing most demanding.

According to some embodiments the negative effects of such issues, either with respect to transition from one traffic concentration level to another or not, may be reduced by upgrading said methods, according to which sufficient level of match of current patterns with stored patterns of volume to capacity ratio on links may determine desirable concentration of the traffic on the network.

In this respect, the upgrade may include additional stored predictive control data associated with each stored traffic concentration level, which predictive control data refer to stored historical data for a similar demand and traffic distribution, for which sets of routes and possibly also time dependent travel time costs along a controlled horizon which may be used for preliminary coordination control processes in order to shorten traffic development towards a roughly desirable load balance that may further be refined. Refinements may be applied by coordination control cycles/phases or iterations/sub-phases which are further elaborated. Refinements may enable to overcome differences between the desirable load balance which may preferably be obtained according to current, recent and predicted traffic development, and the rough load balance which was obtained according to the respective stored scenarios associated with predictive control data.

An upgraded method may be applied either for a transition of traffic to a higher concentration level from a lower concentration level or vice-versa. Preferably a traffic concentration level is associated with a plurality of predictive control data according to different traffic demand and traffic distribution scenarios.

Such stored predictive control data may be constructed by off line traffic simulation applying coordination control processes under no real time constraints. Such data may determine, inter-alia, recommended paths according to current and predicted zones to zone and/or link to link related position to destination pairs, as well as possibly according to synthetic respective time dependent travel time costs on links which enable accelerating convergence towards load balance on a respective part of a network.

In this respect, according to some embodiments, said historical synthetic time dependent travel time costs on links, may temporarily substitute real travel time costs and/or predicted travel time costs for path calculations associated with the transition towards desirable balanced traffic on the respective part of the network. This may further enable coordination control processes to accelerate convergence towards load balance by non-small affecting control steps (cycle/phase or iteration/sub-phase), which otherwise may negatively affect convergence towards load balance on a non linear system, and which control steps may be associated with the respective stored control data.

According to some embodiments, load balancing applied by gradual coordination control processes on a certain part of network links may determine the content of said load balancing priority layer, which is determined and updated by a load balancing priority layer update process, according to the non balanced level in a network subject to available computation power to apply sufficiently frequent coordination control processes for load balancing.

Hereinafter and above, if no clear difference between coordination control processes and load balancing control processes is specified, then both terms may have the same meaning with respect to load balancing, while in general load balancing control processes may have some wider aspect which include synchronization and communication means applied with coordination control processes and which may be relevant to implementation favor according to current and continuously developing technologies for distributed computation and communication.

A disadvantage associated with gradual load balancing for a certain part of a network, which may be applied in case of non sufficient computation resources to maintain load balancing for certain concentration level of traffic, is that it may be expected to apply less tight load balance and less tight fairness in the transition towards load balance.

Therefore, availability of sufficient computation power for load balancing which may guarantee faster and tighter convergence to network load balance and fairness in path assignment for trips on a certain part of load balance controlled network should preferably be applied.

High usage of path controlled trips may in this respect be the first step towards reduction in highly computation consuming on-line calibration of a high dimension, non linear, stochastic and time varying DTA based traffic simulation platforms, whereas the second step is to apply prioritized relatively loaded links with gradual load balancing which is further elaborated.

With respect to the first step, when path control can't be applied to all or almost all trips which have freedom to use non specific route to their destination, computation power and prediction accuracy issues arise with a need to apply real time calibration of a DTA simulator. In this respect the issue is not just the DTA simulation run time for acceptable accuracy of models but also the stochastic nature of the route choice model within the supply model as mentioned before.

The issues and remedies to the issues are further elaborated in further described embodiments, wherein the preferred remedy is to avoid as much as possible the need to use route choice model or at least to minimize the share of a route choice model effect on the DTA simulation. In this respect the increase in the share of path controlled trips in the traffic, by for example methods to motivate path controlled usage as described above, provides a remedy for reducing the negative effect of a route choice model on DTA based traffic predictions for load balancing as well as enabling to increase the accuracy of the demand for trips by facilitating implementation of prescheduled path controlled trips as described above.

With respect to said second step, under non sufficient computation resources, gradual load balancing for a certain part of the network may apply prioritized relatively loaded links to be updated dynamically in a load balancing priority layer. According to some embodiments, the content of a load balancing priority layer is preferably determined according to current and predicted distribution of traffic volume to capacity ratios on links, and preferably related to time dependent ratios in acceptable forward time intervals along a finite time horizon within a rolling horizon in order to satisfy required gradual load balancing performance.

In some embodiments, a finite time horizon may be divided into linear time intervals for determination of time dependent relatively loaded links and respectively associated with a load balancing priority layer according to priorities. According to another embodiment a finite time horizon may be divided into non linear time intervals, wherein short term time intervals within the time horizon may be discriminated according to short time intervals in comparison to longer term time intervals in the time horizon, which longer term time intervals may be discriminated for the same level of confidence in prediction as the short term intervals. The division of time horizon into time intervals with respect to relatively loaded links, that is, determination of time dependence resolution, may or may not comply with time dependence resolution applied with time dependent travel time costs for path calculations according to different embodiments.

According to some embodiments, discrimination among time intervals within a predicted finite time horizon is performed by a discrimination process which determines the number of the time intervals within the time horizon, and preferably the non linearity of the discrimination as well. According to some embodiments, the discrimination process may determine the number and the non linear discrimination of time intervals according to the dynamics of traffic in the prediction time horizon, wherein, lower dynamics may be satisfied by smaller number of time intervals in comparison to higher number which may preferably satisfy higher traffic dynamics.

Relatively loaded links, determined by the load balancing priority layer update process and updated in the load balancing priority layer for load balancing on a determined part of a network (possibly as a result of concentration of load balanced traffic on a certain part of a network), may according to some embodiments be identified dynamically according to dynamic changes in tracked predictions of traffic volume to capacity ratios on network links, during coordination control processes, preferably according to computation power constraints.

Prioritized relatively loaded links in a load balancing priority layer may enable to shorten the convergence rate of coordination control processes for a cost which minimizes predicted aggregated travel times of simulated trips on the network at a lower level than can be obtained if non limited computation resources may be applied. Such compromise may be considered with coordination control processes when it is detected that the convergence is too long under real time constraints, that is, there is no sufficient time to apply sufficient number of coordination cycles/phases and/or coordination iterations/sub-phases to detect minimization of aggregated travel times of simulated trips under coordination control processes applied for a controlled time horizon.

Convergence can be shortened by increasing the limitation on relatively loaded links to be included in a load balancing priority layer, wherein the convergence rate should preferably be gradually adapted in order to minimize aggregated travel times by minimum limit on inclusion of relatively loaded links in the load balancing priority layer under given computation resources.

According to some embodiments, minimum aggregated travel time may be obtained by a gradual search for minimum limit on the content of relatively loaded links in a load balancing priority layer.

With such a process, the determination of the content of relatively loaded links in a load balancing priority layer may dynamically be changed not just in terms of the number of such links but also in terms of the degree of the predicted traffic volume to capacity ratios on network links According to some embodiments, the content of relatively loaded links in the load balancing priority layer is dynamic with respect to the lower limiting bound criteria to include relatively loaded links.

According to some embodiments, evaluation of a need to stop lowering the current lower bound limiting criteria may include, further to the said detection of minimum aggregated travel times of simulated trips, a process to identify reduction in the difference between expected load on links which were determined as relatively loaded links for the content of load balancing priority layer and links that were not included in the layer due its lower bound criteria but starting to show similar link loads due to convergence of the load balancing.

Load balancing applying coordination control processes by load balancing control processes, which are aimed at distributing path controlled trips on a network, may be categorized as model predictive control, or more concretely model predictive path control, aimed to converge towards substantial load balance on the network.

As mentioned before, the potential efficiency of such approach depends on the level of usage of path controlled trips, that is, the higher the usage of path controlled trips the higher is the potential to improve the traffic.

Coordination control processes, as mentioned above, preferably apply control cycles and iterations with the planning of paths for coordinating path controlled trips. Iterations may be applied as intra cycle iterations, that is, sub phases of a control cycle which are performed as iterations aimed at coordinating path controlled trips. Control cycles are applied to maintain non potentially interfering attempts to improve travel times for paths associated with path controlled trips while iterative processes to coordinate path control trips are applied, wherein potentially interfering attempts are preferably allowed in the transition from one cycle to another.

According to some embodiments, in case that cycles are not applied, potentially interfering attempts to improve travel times, due to new developing freedom degrees on the network, should preferably not be synchronized. For example, such attempts may be controlled by some a-priori random discriminating approach according to which the timing of attempts to improve travel times involve random delays associated possibly with further described embodiments.

A-priori discrimination, although it has lower implementation priority as further described, is not an approach which is aimed at applying discrimination in the assignment of paths at the stage of convergence but rather allows temporal priority to potential alternative paths which may contribute to higher reduction in travel times on the network which in turn contribute to other traffic to gain benefit indirectly, that is, to gain reduction in travel times before allowing lower priority path controlled trips to take benefit of freedom degrees developing on the network which in turn contribute also indirectly to reduction in travel times of other trips.

The coordination control processes which are aimed at planning predictive coordinated sets of paths for said coordinating path controlled trips, preferably maintain a-priori acceptable level of non-discriminating (fair) paths for path controlled trips preferably under a limit that an alternative path to an assigned path will not be expected to be a-priori a less preferred path, and under further limits as further described.

Coordination control processes are applying in this respect load balancing which is beyond a response of individual attempts to a feedback about the potential effect of the attempts to improve travel times of path controlled trips. In this respect, coordination is preferably applied for high usage of path controlled trips in the traffic on the network. The feedback which determines time dependent traffic volumes to capacity ratios on network links, and respectively time dependent travel times, may support gradual coordination of path controlled trips, wherein gradual coordination in this respect may apply said prioritized dynamic determination of highest priority relatively loaded links in a load balancing priority layer.

From a point of view of a driver or an autonomous vehicle, non discriminating coordination control processes, under said gradual or non gradual coordination, preferably include as much as possible a-priori allowance for simultaneous or substantially simultaneous independent attempts to improve travel times as a result of dynamically developing freedom degrees on the network and which said freedom degrees may include relatively developed freedom degrees due to irregularities in the traffic.

Such attempts are preferably based, at first, on the potential of coordination control processes to simultaneously take benefit from developing freedom degrees on the network for path controlled trips, and then, applying an iterative processes to mitigate potential overloads due to simultaneous attempts to improve travel times, that is, to mitigate potential relatively loaded links which might divert the traffic from load balance on the network, due to said simultaneous independent attempts to improve travel times, wherein iterative mitigation processes preferably apply simultaneous gradual mitigation attempts to accelerate mitigation.

Mitigation of potential relatively loaded links is required when a failure of said attempts to improve travel times for path controlled trips, according to developing freedom degrees on the network along the controlled time horizon, is detected, for example, by traffic prediction that is based on a DTA prediction which is fed by control paths associated with the attempts to improve travel times.

In this respect, according to some embodiments, the determination of relatively loaded links may be performed under an iteration of a cycle of coordination control processes by a comparison between:

a. time dependent traffic volumes to capacity ratios on network links along the predicted time horizon, which is determined by a DTA based traffic prediction fed by paths which include:
  1. current and predicted assigned paths associated with path controlled trips, which are not associated with non mitigated pending paths;
  2. non-mitigated pending paths that may refer also to non mitigated paths, which are determined as paths associated with path controlled trips providing pending potential alternatives, or pending potential alternatives which are subject to be substituted by new alternatives to current or predicted assigned paths to path controlled trips, according to mitigation, and which non mitigated paths may be generated at the initialization of a cycle of coordination control processes—due to independent simultaneous attempts to improve travel times for current and predicted assigned paths to current and predicted path controlled trips by simultaneous searches for shortest paths according to potential reduction in time dependent travel time costs (developed by freedom degrees or relatively freedom degrees on the network), and as a result of the evaluation of the effect of the simultaneous attempts on travel time costs (along the controlled time horizon associated with current cycle by a synthesis of DTA traffic prediction fed by current and predicted paths associated with said simultaneous attempts and further by other current and predicted paths on the network which may include but not be limited to: current and predicted paths associated with path controlled trips for which said attempts were not performed, current and predicted route choice model based trips, current and predicted non coordinating path controlled trips) such paths may became a potential cause for relatively loaded links on the network, that is, paths which failed to provide acceptable alternative to assigned paths associated with path controlled trips and determined in terms of potential mitigation as non mitigated pending paths, and which such paths, with respect to prior iteration(s), are paths that failed to be passively mitigated (accepted as an alternative to path associated with respective path controlled trip) by prior iteration(s) of mitigation (due to active mitigation which may convert other non-mitigated pending paths to new acceptable alternatives and which such alternatives have in common with the passively non mitigated pending paths relatively loaded links) or failed to be actively mitigated by prior iteration(s) of mitigation which may convert non-mitigated pending paths to new acceptable alternatives during prior iteration(s) of mitigation;

3. current and predicted non path controlled trips, which are applicable to trips which have non flexible routes, and according to some embodiment if the traffic on the network include route choice model based trips;

4. current and predicted non coordinating path controlled trips, which according to some embodiments are applicable with an early stage of deployment of path controlled trips in which the coordination control processes require some learning process, while path controlled trips are applied gradually, and in which case non coordinating path control trips are assigned with typical route choice model based paths according to calibrated DTA performed prior to the deployment of path controlled trips;

and b. reference time dependent traffic volume to capacity ratios on links of the road network along predicted time horizon, which are determined by DTA based traffic prediction fed by paths which include:

a. current and predicted assigned paths associated with path controlled trips which according to some embodiments include paths that are associated with mitigated paths up to the current iteration in current cycle; whereas according to some other embodiments, path controlled trips which were associated with non-mitigated paths and were mitigated during the current cycle, are not included but rather assigned paths and predicted paths assigned to path controlled trips before the mitigation in the current cycle are included;

b. current and predicted non path controlled trips, which is applicable to trips which have non flexible routes, and according to some embodiment if the traffic on the network includes route choice model based trips;

c. current and predicted non coordinating path controlled trips, which case is applicable according to some embodiments to an early stage of deployment of path controlled trips in which the coordination control processes require some learning process while path controlled trips are applied gradually and in which case non coordinating path control trips are assigned with typical route choice model based paths according calibrated DTA performed prior to the deployment of path controlled trips;

wherein, according to the comparison, links on which time dependent differences of traffic volume to capacity ratios are found to be above the reference ratios, along the prediction time horizon, may be determined as time dependent relatively loaded links.

Such mitigation preferably should include control elements which enable to prohibit meaningful justification to raise a claim that the mitigation is a discrimination process (unfair) under controllable conditions applying predictive load balancing by the coordination control processes.

According to some embodiments, mitigation of potential relatively loaded links may be applied by gradual top-down controlled approach according to which potential relatively loaded links are gradually mitigated by making gradual changes to paths which are detected to fail to improve travel times according to said simultaneous attempts and become a potential cause for relatively loaded links.

According to some embodiments, mitigation of potential traffic loads for potential relatively loaded links may be applied by gradual bottom-up controlled approach according to which the mitigation process gradually fills such links, along a plurality of iterations or even cycles of coordination control processes, by enabling under control to apply gradual simultaneous attempts which otherwise, under evaluation of DTA based predictions of non gradually controlled simultaneous attempts the attempts, fail to improve travel times and are detected to be a cause for relatively loaded links.

Such gradual bottom-up controlled mitigation ignores paths associated with non gradually controlled simultaneous attempts to improve travel times due to developing freedom degrees on the network, if such non gradually simultaneous attempts are applied before a gradual bottom-up is initiated. Nevertheless, initiation of a bottom-up process by non controlled attempts may preferably applied in order to make the bottom-up approach non blind approach which has no reference to determine required control steps for the bottom-up approach, that is, if evaluation of the potential effect of non controlled simultaneous attempts is not performed.

According to some embodiments, gradual controlled mitigation may preferably apply simultaneous mitigation attempts, under iteration control steps which may preferably be adaptive to detected convergence rate to minimize aggregated travel times of simulated trips, which may be evaluated by said DTA predictions according to controlled changes in paths, wherein, the criterion to make a change to a path by an iteration control step is that a minimum level of improvement in the travel time may be expected to be obtained, according to the adaptive control step, before a further evaluation to simultaneous mitigation is performed by a DTA prediction according to potential simultaneous allowed changes to paths by the iteration control step.

According to some embodiments, the top-down mitigation applies simultaneous attempts to mitigate relatively loaded links under iteration control steps, which may preferably be adaptive to the rate in the aggregated travel times improvement of simulated trips, wherein the criterion to make a change to a path by an iteration of coordination control processes according to an iteration control step is a minimum travel time improvement.

Such top-down mitigation approach refers hereinafter to conservative top-down mitigation which may be less vulnerable to instability in comparison the a non conservative top-down mitigation approach which, according to some embodiments, may fill gradually the potential relatively under-loaded links due to the attempts that cause potential relatively loaded links, and which said non-conservative mitigation approach uses travel time costs on the network according to evaluated DTA based traffic prediction effect according to gradually changing paths to mitigate potential loads of potential relatively loaded links.

A non-conservative mitigation approach, uses travel time costs on the network according to DTA based traffic predictions fed by gradually changing paths which mitigate potential loads of potential relatively loaded links, while excluding with the search, for alternative paths links, which are not yet mitigated to become non relatively loaded links or in case of gradual coordination to become links which are not part of the load balancing priority layer.

Another non-conservative mitigation, which may modify said conservative or said non conservative mitigation approaches, may include according to some embodiments allowance to apply chained changes to failed mitigated paths along the iterative mitigation process, that is, non mitigated paths are subject to be replaced by paths which failed to mitigate prior non mitigated paths.

From a point of view of efficiency, the top-down mitigation approach may have advantage over bottom-up approach due to an ability to monitor directly the effect of the mitigation according to DTA traffic predictions which may provide indication on the rate of the convergence toward load balance (especially in a case in which the mitigation enables to recover from a potential deviation from maintained load balance) and further to adapt the control steps according to the mitigation effect on the network, wherein, in any case both top-down and bottom-up approaches identify convergence according to the same criteria which may include identified convergence to minimum aggregated travel times of simulated trips in controlled time horizon.

The minimum may be discovered by a detection of a change in the trend towards improvement of aggregated travel times, along a plurality of iterations which may be expanded to a plurality of cycles, and which according to a change in the trend—a return to prior set of paths, which enable higher aggregated travel times, is performed.

From a point of view of efficiency combined with non-discriminating mitigation, a top-down approach has an advantage over bottom-up approach as a top down approach provides no direct priority to paths which have higher potential to improve travel times on the network and which the efficiency of bottom-up approach depends on such priority provision. Therefore, a top-down approach is more appealing to users of path controlled trips and to authorities. In this respect a top-down approach balances the demand to take benefits from developing freedom degrees on the network, without compromising on efficiency and fairness as further elaborated, whereas a bottom-up approach may not have such ability.

In this respect, with a top-down mitigation to paths which failed to provide an alternative to assigned path of a path controlled trip, due to simultaneous attempt to improve travel times, some of such non realistic paths are expected to be converted along a plurality of iterations to alternatives which are aimed to have the least worse realistic potential to improve travel times of path controlled trips (in comparison to the non realistic potential of failed alternatives), while some other non realistic alternative paths may become passively realistic to improve travel time of path controlled trips along a plurality of iterations.

Although it seems that a top-down approach has advantage to be the a-priory choice, however, under high demand to take benefit from developing freedom degrees on the network, convergence time of a top-down approach might be too long and a bottom-up approach may be considered to be used in such cases to support the top-down approach by limiting the simultaneous attempts according to prioritized travel time potential savings or according to a random limit on the allowance to take benefit of developed freedom degrees on the network and which random limit restricts the percentage of path controlled trips that are allowed to participate in simultaneous attempts to improve travel time in a cycle. In this respect, combined top-down and bottom-up approaches provide a realistic compromise between convergence time and ideal acceptance conditions to apply coordinating path controlled trips.

From a point of view of stability the conservative top-down approach may have advantage, while being somewhat more complex than the non conservative approach. Therefore respective embodiments associated with mitigation are elaborated hereinafter to clarify the complexity which is not required with potential implementation of other approaches and which other said approaches may be considered as simplified approaches of the conservative top-down mitigation approach with some modifications.

With such said conservative mitigation approach and with other said mitigation approaches, the coordination control processes are aimed at improving the traffic flow with an objective to gradually maximize the flow on the controlled part of the network.

According to some embodiments, such coordination control related processes may preferably be applied in a centralized control system, in which each of the path controlled trips is preferably associated with a computerized agent which maintains its interest, wherein a plurality of agents associated with a plurality of calculation of paths for a path-controlled trip may serve path controlled trips with an objective to shorten travel times to destinations, and wherein each agent related process monitors a common feedback about potential effects of simultaneous or substantial simultaneous attempts to improve travel time on the network and to mitigate potential overloads.

The said feedback is preferably a traffic prediction feedback applied by simulation of a DTA which is fed inter-alia by control related paths which are associated with simultaneous attempts to improve travel times for path controlled trips or with simultaneous attempts to mitigate potential overloads.

Hereinafter and before the terms simultaneous associated with for example calculation of paths or with attempts to improve travel times or with search for paths, may refer either to simultaneous or substantial simultaneous calculation of paths or to attempts to improve travel times or to search for paths.

As mentioned briefly above uncertainty associated with the number of the simultaneous processes, motivated by individual interests, cause uncertainty in the effect of the traffic on the network, and under lack of efficient control, said uncertainty may cause instability in convergence towards load balance under condition of high usage (e.g., high time usage and high percentage of users) of path controlled trips on the network.

It is worth noting that instability in assignment of paths may not mandatorily cause instability in traffic development since instability in assignment of paths might eventually be resolved without a need for special coordination in some cases during the traffic development, at split points (junctions) on the network between alternatives according to said dynamically updated feedbacks received by said agents associated with calculation of paths for path controlled trips.

However, at high level of usage of path controlled trips, this possibility becomes more rare and coordination becomes mandatory in such cases, while anyhow (with or without natural resolved instabilities) minimization or even prevention of unstable assignment of paths (which doesn't imply minimization in calculation of paths which under iterative control calculation of paths have higher frequency than the frequency of assignments of paths) is also an issue with respect to negative effects on communication loads (associated with a centralized control on assigned paths) and further with respect to negative effects on human perception e.g., drivers and passengers who might be, or are, aware of an instability of assigned paths.

With respect to potential instability in traffic development, under allowance of simultaneous attempts to improve travel time of assigned paths and simultaneous reaction to mitigation of potential negative effects of said simultaneous attempt, the least worse case may result with some oscillations in assignments of paths whereas a worse case is dispersion of the instability which prevents convergence towards load balance.

Therefore, according to some embodiments, said coordination of paths should preferably apply a method which mitigates potential instability (oscillations as well as propagation and/or dispersion of instabilities) and which method may enable to coordinate path controlled trips applying a sort of controlled user-optimal approach (i.e., preferably allowing simultaneous attempts to improve travel times and then mitigating potential overloads) and which method might be crucial to cope with a need to apply load balancing based on fairness for high usage of path controlled trips.

According to some embodiments, such coordination, which might be limited by the potential rate to mitigate potential relatively loaded links on a large network—due to the number and/or the level of the relative loads and/or due to the level of instability—under given computation resources, may apply gradual coordination control processes as mentioned before. In this respect, potential relatively loaded links are identified according to controllable traffic prediction, and then such links may be updated according to a need in a load balancing priority layer in a common database which is available, for example, to be accessed by said agents, providing prioritized feedback to said agents and accordingly apply gradual distributed computation which apply convergence towards load balance under gradual coordination applied by gradual coordination control processes.

With respect to gradual coordination, which may contribute to an ability to cope with instability by such approach, the following described method which may be associated with some embodiments is introduced. In this respect, instability in the relatively loaded links, according to some embodiments, is handled, as part of gradual coordination control processes, by applying mitigation for prioritized relatively loaded links while forcing non-discriminating distribution of oscillating paths, which are associated with oscillations on prioritized links associated with a load balancing priority layer, on the network, and, further freezing temporarily the distribution for a certain time which may enable to prevent temporal interference to mitigation of prioritized relatively loaded links. At the end of the freeze time, frozen paths are gradually released enabling refinements to the forced distribution under more converged conditions towards load balance. The release may by applied gradually during the mitigation by the mitigating control processes.

In this respect, it should be taken into account that a strategy to obtain convergence towards high quality of load balance might take longer than a strategy to obtain temporarily a lower quality of load balance by a shorter time convergence.

It worth noting that instability in assignment of paths may not mandatorily cause instability in traffic development since instability in assignment of paths might eventually be resolved without a need for special coordination in some cases during the traffic development, at split points on the network among alternatives according to said dynamically updated feedbacks received by said agents associated with calculation of paths for path controlled trips.

However, at high level of usage of path controlled trips this possibility becomes more rare and coordination becomes mandatory in such cases, while minimization or even prevention of such unstable assignment of paths (which doesn't imply minimization in calculation of paths which under iterative control calculation of paths have higher frequency than the frequency of assignments of paths) is also an issue which negatively affects communication load associated with a centralized control on assigned paths and which further negatively affects human perception of unstable assigned paths e.g., drivers and passengers who might be, or are, aware of an instability.

Different strategies may be applied according to different levels of diversion of the traffic from load balance and which strategies may be constructed by combining different aspects which may contribute either to acceleration of convergence towards load balance or to a refinement to the load balance by a longer time convergence if the computation resources may make it affordable. Said aspects, according to different embodiments with a reference to pending paths that are subject to mitigation with respect to a need to mitigate Relatively Loaded Links (RLL), may include:

a) determination of RLL from a point of view of the pending path, that is, ignoring RLL on the network which are not on the pending path, b) determination of RLL from a network point of view, that is, including RLL associated with paths other than the path for which an alternative is searched for, wherein the network point of view is regional or RLL associated with distinguishable part of the traffic on the network, and wherein such aspect may serve also simultaneous attempts to improve travel times of an assigned path associated with a path controlled trip at a time before it becomes associated with a pending path; and wherein a distinguishable part of the traffic has, on the one hand, high interrelated interaction on the network within the horizon of traffic predictions associated with load balancing control processes and, on the other hand, sufficiently low interaction with other one or more distinguishable parts of the traffic. Examples of low or non interrelated interaction between two parts of traffic on a network is opposite traffic flows such as north to south flow interaction with south to north flow, or even east to west flow interaction with south to north flow. This may further be expanded, for example, to parallel flows in the same direction having low or no interaction within the prediction time horizon, and to separate flows having low or no potential interaction within the prediction time horizon.

c) determination of distinguishable RLL with respect to short term time horizon of the traffic predictions and with respect to longer term time horizon in the prediction, wherein the short term may refer to determination of RLL according to "b)" and the long term part to "a)", and wherein the time horizon may be individually determined with respect to a path controlled trip from its pending path point of view, d) determination of distinguishable RLL with respect to short term time horizon of the traffic predictions and with respect to longer term time horizon in the prediction, wherein the short term may refer to determination of RLL according to "a)" and the long term part to "b)", and wherein the time horizon may be individually determined with respect to a path controlled trip from its pending path point of view, Aspects which include "b)', "c)" and "d)" may gain benefit from a knowledge about the effect on the convergence towards load balance while excluding RLL which are not associated with a single pending path when searching for an alternative path to a pending path.

The knowledge may take benefit of recent historical RLL with respect to convergence, and further from, for example, off-line load balancing simulation results of load balancing control processes.

In this respect, it is assumed that load balancing control processes are applied from early morning hours, during which free flow conditions are expected to be on a network, and therefore simultaneous attempts to improve travel times may decline the level of load balance and a failure to improve travel times by simultaneous attempt under such conditions may indicate on one or more links which contribute to declination in the load balance. In this respect, some preference may be provided to a prior stage in which higher level of load balance may be expected.

Links which may be determined as RLL may according to some embodiments be links on which there is an expected significant potential selective increase in the traffic volume to capacity ratios according to said simultaneous attempt and may be determined according to a comparison of the current traffic load to capacity ratios on network link with stored trend of the traffic load to capacity ratios on the network under similar demand. For example, simultaneous attempts which were evaluated by controlled predictions may indicate on declination in the level of the load balance by said comparison if it can be assumed that the objective of the load balancing is to maintain load balance.

This could be a reasonable assumption under conditions that the load balancing processes are applied from early hours in the morning, in which free flow is expected on the network, and that the processes are sufficiently effective to maintain load balancing at substantial real time.

In case of loss of load balance, which preferably should not be allowed under effective design of a system platform with sufficient redundancy, said significant selective increase in the traffic volume to capacity ratios may be determined according to off line simulations of load balancing control processes for specific hours and days for a specific network, providing typical values to guide on-line traffic load balancing.

In this respect, traffic load to capacity ratios on network links, and preferably also control related data which is relevant to support adjustment of current traffic towards load balance, may be retrieved from storage which may be updated by prior on line load balancing control processes or by off line simulation of load balancing processes, and which refers to load balanced traffic having relevance to adjust current traffic, and which said loaded traffic volume to capacity ratios may be used as a reference to first determine the difference between known traffic load to capacity ratios at a stage of load balance and ratios at current traffic conditions, and then to determine, according to a need, RLL to be associated with load balancing priority layer.

In case that a deviation from load balance was due to slow response time of the path control processes then the stored data may contribute to put in order the priority in handling relatively loaded links and which the load balancing may be expected in such a case to perform at a coarser resolution than the off line simulation. A slow response may be identified according to the trend in the increase or decrease in the number of relatively loaded links and in the level of loads, e.g., according to real time stored history of relatively loaded links.

An ideal load balance may be a stage in which no attempt to improve travel time may be obtained while in reality this might not be the case due to continuous dynamic changes in the freedom degrees on the network which are affected at least by the dynamic entries and exits from the controlled network.

Hereinafter and above, reference to freedom degrees on the network refer further to predicted freedom degrees with respect to time dependent predicted demand and time dependent predicted traffic. In this respect coordination control processes are predictive control processes applied as part of predictive load balancing control processes of predictive path control.

According to some embodiments, an iteration of coordination control processes is based on predetermined processes associated for planning and assigning paths to path control trips, and which mitigation of relatively loaded links, associated with iterations of coordination control processes, may but not be limited to further be associated with above and further described processes, rules associated with processes and access to data required to be used with processes.

According to some embodiments, processes, rules and access to data, associated with processes of an iteration of, for example, said conservative top-down mitigation provide a skeleton for possible modifications or expansions, according but not limited to relevant embodiments described hereinafter and above, and which such iteration may but not be limited to include according to some embodiments additional, all, or part of the following processes, rules and data, as long as the ultimate objective, under acceptable or non controlled constraints, is to improve load balance of traffic on a road network and which an iteration of conservative top-down mitigation may comprise:

A. Access to initial conditions related data, which according to some embodiments an iteration starts with receiving or having access to such data and which a previous iteration ends with relevant updates to such data for a subsequent iteration, and which initial conditions related data may but not be limited to comprise according to some embodiments:

1. current and predicted assigned paths associated with path controlled trips which include paths that are associated with mitigated paths up to the current iteration in current cycle; whereas according to some embodiments, with respect to further determination of relatively loaded links, current and predicted stored paths, which were assigned to path controlled trips and their non mitigated paths were mitigated during the current cycle, are assumed to be considered as current and predicted assigned paths associated with path controlled trips for determination of relatively loaded links as further described with "B", that is, paths which were assigned to path controlled trips and which were substituted according to mitigation in the current cycle by a prior iteration or a plurality of iterations;

2. non-mitigated pending paths that may refer also to non mitigated paths, which are determined as paths associated with path controlled trips providing pending potential alternatives, or pending potential alternatives which are subject to be substituted by new alternatives to current or predicted assigned paths to path controlled trips, according to mitigation, and which non mitigated paths may be generated at the initialization of a cycle of coordination control processes—due to independent simultaneous attempts to improve travel times for current and predicted assigned paths to current and predicted path controlled trips by simultaneous searches for shortest paths according to potential reduction in time dependent travel time costs (developed by freedom degrees or relatively freedom degrees on the network), and as a result of the evaluation of the effect of the simultaneous attempts on travel time costs (along the controlled time horizon associated with current cycle by a synthesis of DTA traffic prediction fed by current and predicted paths associated with said simultaneous attempts and further by other current and predicted paths on the network which may include but not be limited to: current and predicted paths associated with path controlled trips for which said attempts were not performed, current and predicted route choice model based trips, current and predicted non coordinating path controlled trips) such paths may became a potential cause for relatively loaded links on the network, that is, paths which failed to provide acceptable alternative to assigned paths associated with path controlled trips and determined in terms of potential mitigation as non mitigated pending paths, and which such paths, with respect to prior iteration(s), are paths that failed to be passively mitigated (accepted as an alternative to path associated with respective path controlled trip) by prior iteration(s) of mitigation (due to active mitigation which may convert other non-mitigated pending paths to new acceptable alternatives and which such alternatives have in common with the passively non mitigated pending paths relatively loaded links) or failed to be actively mitigated by prior iteration(s) of mitigation which may convert non-mitigated pending paths to new acceptable alternatives during prior iteration(s) of mitigation;

3. current and predicted paths assigned to non path controlled trips, which are applicable to trips which have non flexible routes, and according to some embodiment if the traffic on the network includes route choice model for trips;

4. current and predicted path assigned to non coordinating path controlled trips, which according to some embodiments are applicable with an early stage of deployment of path controlled trips in which the coordination control processes require some learning process, while path controlled trips are applied gradually, and in which case non coordinating path control trips are assigned with typical route choice model based paths according to calibrated DTA performed prior to the deployment of path controlled trips;

5. data and decision criteria used and/or produced and/or modified by one or more prior iterations and which are subject to be used and/or modified by the current iteration and which usage according to the following specifies such relevant data and/or criteria, including but not limited to a threshold related acceptance criterion to accept new alternative paths to path controlled trips and which is adapted along iterations to mitigate relatively loaded links.

B. Determination of relatively loaded links by evaluating potential time-dependent effect of mitigated and non mitigated pending paths, updated by the previous iteration, on the volume to capacity ratios of network links along the currently mitigated time horizon, by feeding an on line calibrated DTA based traffic prediction simulator with part of the received paths according to "A" wherein the fed paths are not including assigned paths associated with path controlled trips with which non mitigated paths are associated while including instead the non-mitigated paths associated an a pending alternative to path controlled trips, and according to synthesis of DTA traffic prediction for the currently mitigated time horizon—determining time dependent relatively loaded links by a comparison between:

1. time dependent traffic volumes to capacity ratios on network links along the currently mitigated time horizon, which is determined by the synthesis of DTA traffic prediction fed by said paths (as said above in "B", i.e., with reference to "A" assigned paths associated with path controlled trips are not included while their respective non mitigated pending paths which were considered as alternative are included), and 2. reference time dependent traffic volume to capacity ratios on links which are determined by synthesis of DTA traffic prediction fed by paths which with respect to coordinating path controlled trips include assigned paths (which according to some embodiments include mitigated paths, which were assigned to path controlled trips as alternatives up to the current iteration of the current cycle, whereas according to some other embodiments includes no mitigated paths assigned to path controlled trips in the current cycle) and exclude non mitigated paths associated with assigned paths, wherein, according to the comparison, links on which time dependent differences of traffic volume to capacity ratios are found to be above the reference ratios, along the prediction time horizon, mainly due to non mitigated pending paths, may be determined as time dependent relatively loaded links According to some embodiments, the determination of time dependence for relatively loaded links is performed for time intervals which may be longer than the time intervals that discriminate the time horizon for which the current cycle is performed if it is required to maintain more stable mitigation.

C. Determination and update of prioritized load balancing priority layer, subject to a case in which there is a need for gradual coordination control, that is, when the coordination control processes maintain load balancing preferably under non major deviation from load balance, which may or may not require further concentration of traffic on part of the network. In this respect, according to some embodiments, the determination of prioritized relatively loaded links in a load balancing priority layer is performed according to the potential convergence of the mitigation under real time constraints, that is, slow trend in the reduction of aggregated travel times or increase in the aggregated ravel times may enable to reduce the number of the relatively loaded links in the load balancing priority layer by providing priority to higher level of relatively loaded links.

D. Mitigation of traffic loads on relatively loaded links by:
1. searching for new alternative paths to yet non-mitigated pending alternative paths, preferably by substantially simultaneous search processes, wherein, according to some embodiments, time dependent travel times that are associated with a search are determined by synthesis of DTA based traffic prediction fed by said paths according to "A" while non-mitigated paths up to the current iteration are excluded (not fed), and wherein the search with respect to links excludes from the controlled network said relatively loaded links determined by "B" if the link is not a destination link, whereas, if gradual coordination is applied then the search excludes prioritized relatively loaded links determined by "C" if the link is not a destination link According to some embodiment, if new alternative paths are not accepted by the current iteration according to further determined acceptance procedure they are ignored with further iterations of the mitigation, that is, the reference to search for new alternative paths in a subsequent iteration are said yet not mitigated pending alternative paths. According to less conservative embodiments the new alternative paths are not ignored and used as a reference for acceptance procedure by the subsequent iteration and are substituting said non mitigated paths in "A". According to some embodiments, exclusion of relatively loaded links refers to exclusion of the first link associated with a non mitigated path or links which are associated with travel times (associated with the non mitigated path) along part of the prediction time horizon. According to some embodiments, said searches for paths are preferably performed substantially simultaneously by agents, wherein according to available computation power for real time related performance, an agent is associated with a search for one or more new alternative paths, and wherein a search is performed by calculating a shortest or a substantially shortest path according to said time dependent travel times, and wherein in this respect, and hereinafter and above described embodiments, the term search or the term path calculation for a path refer, if not otherwise specified, to applying a shortest path algorithm known in the art including, for example, A* (A star) algorithm or related variants known in the art, wherein the costs are time dependent travel times on network links in predicted time horizon intervals.

2. Determining a threshold related acceptance criterion to accept new alternative paths as a substitution to assigned path controlled trips, wherein the threshold is adaptively determined in order to enable controllable mitigation by the current iteration in perspective of one or more prior iterations; and wherein, according to prior mitigation rate, preferably during a plurality of iterations, the threshold in previous iteration is modified to enable further higher increase or lower increase or no change in the mitigation, or to return to prior conditions of prior iterations in order to decrease the level of overreaction to mitigation performed by the previous iteration which may negatively affect the mitigation convergence; and wherein the criterion to choose the required trend in the mitigation relates to the functionality of the threshold to limit mitigation of non-deterministic number of non-mitigated paths which may preferably prevent as much as possible non acceptable discrimination in assignment of paths as well as non linear or at least significant non linear effects on the network, in order to enable fairness and controllable convergence along a plurality of iterations. In this respect the threshold should preferably be dynamically adapted along a plurality of iterations in order to allow on the one hand predictable convergence and on the other hand rapid convergence. According to some embodiments, in order to avoid solely real time adaptation of the threshold, which might not be sufficiently effective for non substantially recurrent traffic developments, predetermined sets of thresholds may be prepared and stored for different scenarios in order to support coarse reference to real time refined adaptation. In this respect, real time adaptation of the threshold is supported by, for example, said stored predictive control data which may be expanded to include recommended sets of thresholds according to acceptable match between current patterns of traffic and stored patterns of traffic associated with set or sets of thresholds, enabling to retrieve according to said match desirable coarse set or sets of thresholds which may be refined in real time. According to some embodiments, a dynamically determined threshold is preferably related to distinguishable part of the traffic on the network, and wherein a distinguishable part of the traffic has, on the one hand, high interrelated interaction on the network within the horizon of traffic predictions associated with coordination control processes and, on the other hand, sufficiently low interaction with other one or more distinguishable parts of the traffic. Examples of low or non interrelated interaction between two parts of traffic on a network is opposite traffic flows such as north to south flow interaction with south to north flow, or even east to west flow interaction with south to north flow. This may further be expanded to parallel flows in the same direction having low or no interaction within the prediction time horizon, and to any other separate flows having low or no potential interaction within the prediction time horizon.

3. Accepting new alternative paths or pending alternative paths according to a predetermined acceptance procedure which may but not be limited to a threshold which enables to put a limit on acceptance of said new alternative paths, according to search results from "D.1"; that is, if the potential improvement in travel time of the new alternative, which according to the predetermined procedure should be less than the potential improvement that was assumed to be gained by a search for the alternative path to an assigned path and which failed to provide improvement due to simultaneous attempts and became a non mitigated pending path (determined in "A.2" or according to some embodiment in "D.3"), a threshold puts a limit on the maximum accepted reduction in potential travel time improvement in comparison to the potential travel time improvement that was assumed to be gained by the search for a path which became a non mitigated pending path (at the time before it was found to fail to provide an alternative to an assigned path due to said substantially simultaneous search processes); wherein the assumed travel time difference according to the threshold is preferably a marginal value (as mentioned in "D.2) in order to enable acceptable mitigation during a plurality of iterations. Such approach contributes to both objectives: efficiency associated with coordination control processes and fairness. In this respect, the efficiency objective is obtained by providing relatively lower priority to changes to non mitigated paths (failed alternative paths) which according to the search in "E.1" were assumed to have high travel time potential savings, while due to simultaneous attempt to improve travel times the alternative paths failed to improve travel times and are left to be non mitigated pending paths which are subject to potential mitigation along cycle iterations, either directly as a result of accepting new alternative paths or indirectly as a result of accepting new alternatives to other related non mitigated pending paths with respect to common non mitigated relatively loaded links. The complementary objective, which is fairness, enabling further to obtain controllable convergence objective along a plurality of iterations of mitigations (due to linear or less non linear effects on synthesis of DTA traffic predictions), are obtained by enabling marginal differences in travel times to be applied with a new alternative path according to the threshold, that is, acceptance of a new alternative, under an iteration, is associated preferably with marginal changes with respect to travel time improvements which were assumed to be gained with the search for paths that became non mitigated paths (the potential travel time improvements of the non mitigated alternative paths were found to be fictitious improvements and therefore such paths became non mitigated pending paths). According to some embodiments the difference in travel time may be based on absolute values and according to some other embodiments the difference in travel time may be based on a relative values, E. Assignment of mitigated paths, that is, accepted new alternative paths or pending paths, to path controlled trips according to assignment acceptance criteria which may have to take into account that making a modification to an assigned path should preferably avoid, inter-alia, too short reaction time to a modification by human driver or by an autonomously driven vehicle, and/or too frequent changes to assigned paths which from human perception point of view negatively affect the confidence in path control trips, and which too frequent changes to assigned paths further produce non productive usage of communication resources. Assignment acceptance criteria may, for example, include:

1. a condition that the path preferably complies with acceptable frequency of changes to an assigned path to a path controlled trip, to prevent non-productive communication loads and negative effect on human perception which may be interpreted as non stable control, and/or
2. a condition that the accepted path according to the threshold, contributes to travel time improvement in comparison to the travel time of the current assigned path which is preferably evaluated by synthesis of DTA traffic prediction fed by respective paths according to the mitigation processes which were performed up to the current iterations.

F. Updating results from the iteration to provide initial conditions for the subsequent iteration and which data related to initial conditions are determined in "A".

Expansions or modifications to the described iteration may further include but not be limited to:

According to some embodiments, on-line calibration of a DTA simulator, which is used with traffic predictions, is applied at least once in a cycle to serve iterations in the cycle. Cycle times, according to some embodiments may have same or a different time duration along coordination control processes which depends on the convergence time of the mitigation.

According to some embodiments, further to association of a said threshold with a dynamically or statically said distinguishable part of the traffic, the relatively loaded links (including links in a load balancing priority layer when gradual coordination is applied) are also determined according to said distinguishable parts of traffic. In this respect, load balancing priority layer may, for example, refer hereinafter and above to load balancing priority layer in context of distinguishable part of traffic on the network if such approach is applied.

According to some embodiments, under bottom-up mitigation approach a threshold may refer to an opposite functionality than in case of top-down mitigation approach, wherein, according to a bottom up approach, instead of enabling controlled mitigation of potential overloads of traffic associated with relatively loaded links, due to unlimited initial simultaneous attempts to improve travel times, the objective with a bottom-up mitigation approach is to mitigate non exploited usage of freedom degrees on the network to improve travel times. Nevertheless, a bottom-up mitigation approach is not free from a need to mitigate potential overloads of traffic which the bottom-up mitigation may cause, due to its allowance to apply simultaneous attempts to improve travel times. In this respect, although potential overloads that may be associated with a bottom-up mitigation approach may be expected to be less severe than potential overloads under non limited allowance, the bottom-up mitigation approach is still exposed to generating potential overloads and therefore should preferably include logic associated with an adaptive threshold to mitigate potential traffic overloads, for example, by top-down mitigation, or by return to prior conditions in order to apply more moderate reaction to the bottom-up approach by a more conservative threshold. The functionality of a Top-Down Mitigation (TDM) threshold associated with mitigation of potential traffic overloads is distinguished from a bottom-up mitigation threshold, wherein the objective of a bottom-up mitigation threshold is to limit potential simultaneous attempts to improve travel time of paths assigned to path control trips, due to developed freedom degrees on the network to improve travel time, whereas the objective of TDM threshold is to limit the potential simultaneous attempts to find alternative to disappointing simultaneous attempts to improve travel times. In this respect, a TDM threshold, which is determined dynamically along a plurality of iterations to gradually mitigate potential overloads, limits potential attempts to contribute to mitigation of overloads by providing priority to find alternative paths to paths according to which slight changes to pending paths are made (disappointing paths due to a simultaneous attempt that was made to improve travel times). With such approach linearization of the load balancing control processes and substantial fairness may be maintained in order to prevent non sufficiently predictive effects on network travel time costs and to avoid potential objections to cooperate with an operation which applies such approach.

According to some embodiments, in the transition from one cycle to another, a search for a path to be assigned to a new entry, or a new predicted entry, of path controlled trip into the network, or a search for an alternative path to an assigned path which is not associated with relatively loaded links (or prioritized loaded links in case that gradual coordination is applied according to the content of a load balancing priority layer), may be performed by shortest path search algorithm according to time dependent travel time costs while relatively loaded links (or prioritized relatively loaded links associated with the content of a load balancing priority layer in case that gradual coordination is applied) are excluded from the search with an exception that if the destination link is a relatively loaded link then the link is not excluded. The time dependent travel time costs associated with such a search is preferably determined according to synthesis of DTA traffic predictions (before referring to the comparison) according to the updated paths by the previous iteration.

Such an iteration, and iterations associated with other top-down mitigation or with bottom-up mitigation approaches, may refer with further and above described embodiments to coordination control iteration or to load balancing coordination iteration or to load balancing coordination sub phase or to coordination control sub phase, wherein the term phase refers in this respect to a cycle and the term sub-phase refers to an iteration. In this respect a plurality of load balancing coordination iterations or load balancing coordination sub-phases or coordination control iterations or coordination control sub phases are associated with a load balancing coordination cycle or a load balancing coordination phase or coordination control cycle or coordination control phase. The difference between load balancing coordination and coordination control is associated with the difference between load balancing control processes and coordination control processes determined above and which synchronization aspects are associated with the load balancing related terms in comparison to coordination control related terms and while referring to one of such terms their respective terms are referred to indirectly.

Expansions with respect to cycles/phases for coordination control processes and/or to a path control system and/or to any method associated with a path control system and/or to a vehicular apparatus and/or methods associated with vehicular apparatus, may comprise:

According to some embodiments, a said expansion may comprise determination of instability in assigned paths along a plurality of cycles, according to respective recent historical records of relatively loaded links and accordingly applying non-discriminating distribution of respective non mitigated paths which are a cause for the instability, for example, a simple oscillation between two or more alternatives may be distributed to present substantially equal travel times between the alternatives, and which such paths may further be frozen for a certain number of said cycles in order to prohibit interference to the convergence of coordination control processes. The number of cycles during which the paths are frozen and during which they are released, preferably gradually, may be determined according to different predetermined similar enough scenarios which were performed by off line simulation which indicate on potential convergence efficiency under potential reduction of instability which under real time constraints may cause at the best case inefficiency in the mitigation of relatively loaded links (too slow convergence), and at a worse case to prevent convergence.

According to some embodiments, a said expansion may further comprise declination of an issue of a need to cope with search for paths which their destination time horizons may be beyond the time horizon applied with DTA traffic prediction and which, according to some embodiments, a remedy to lighten the issue is to apply more frequently coordination control iterations and extend the time horizon to the maximum efficient time horizon under computation power constraints for most benefiting results according to DTA accuracy. According to some embodiments, another remedy may apply with a search beyond the time horizon, travel time costs on network links which can be statistical predictions and possibly rely on stored historical time patterns that may have sufficient match with current traffic related patterns.

According to some embodiments, a said expansion may further comprise a search for a path which may include personal preferences that put constraints on a shortest path search, wherein constraints may relate to, for example, behavior and preferences of drivers which may further include according to some embodiments a tradeoff between reaction to personal constraints and coordination of paths for most efficient traffic flow. In this respect, traffic efficiency might but not necessarily be reduced while personal considerations are taken into account. For example, hesitancy level of a driver may be taken into account as a personal constraint by choosing a path for a trip which for example minimizes, or possibly excludes, roads and intersections in a calculation of a path to which hesitancy behavior may either affect negatively the travel time on the network or make the driving non sufficiently safe. Safe driving related constraints which might be counterproductive to optimized traffic flow may at least contribute to a more safe driving if drivers may be enabled with their driving navigation aids to setup and/or detect personal safety related constraints to be used with path controlled trips requests (in conjunction with position and destination pairs) as well as with other possibly allowed constraints.

According to some embodiments, a said expansion may further comprise safety related constraints, which may be detected by an in vehicle process that tracks behavior of drivers, for example a black box which serves insurers may determine hesitance or aggressive level of a driver, and/or any other driving behavior indication, which may enable a path control system to assign selectively a path to a driver to maximize traffic flow on the network. For example, according to indication of hesitance level of driving, minimization, or exclusion, with an assigned path of non traffic light controlled intersections, and/or possibly roundabouts, and/or roads in which hesitance may negatively affect the traffic flow, etc., is applied.

According to some embodiments, a said expansion may further comprise automatic detection of hesitance or aggressive level in driving, which may be performed by a black box which may serve insurers to determine entitled discount for an insurance policy.

According to some embodiments, a said expansion may further comprise automatic detection of hesitance or aggressive level in driving in relation to potential interference to merge into non traffic lights controlled traffic, which may be performed by a modified method and apparatus aimed at facilitating merger of an autonomous vehicle in traffic. According to such embodiment, a learning process during autonomous driving may determine reference for deviation from acceptable behavior of merger into traffic per situation, for example, a roundabout under known traffic load and mix of behavior of drivers. If the autonomous vehicle is in non automatic driving mode (used by a driver) it may identify deviation levels from said acceptable behavior, to be informed to the path control system in order to put respective constraints on path assignment to the vehicle by a path control system, under non automatic driving mode and under the exceptional detected behavior.

According to some embodiments, a said expansion may further comprise constraints on path assignments which may but not be limited to further include: estimated time to enter the network, avoiding non privileged road toll, preference to highways etc.

According to some embodiments, a said expansion may further comprise, with respective described approaches, a tradeoff which preferably takes into account current as well as predicted traffic with path control which might further consider a compromise between personal constraints and which might but not necessarily reduce travel time savings on the network and optimal flow on the network. If personal constraints may relate to safety of driving, a respective path assignment may have positive contribution to economical aspect related to the network flow, and might not stay in conflict with negative effect on travel time reduction. The possibility of non being in said conflict could be either a result of the possibility to improve the travel time savings on the network by adapting trips assignments by the path control system to behavior of drivers in a way that minimizes interference to the flow, and hence improves the flow, or a result of a possibility to compensate by considering the safety related economical value of the effect of safety related personal preferences which puts limits on the ability to obtain optimal traffic flow generated due to reaction to safety constraints.

According to some embodiments, a said expansion may further comprise a multiple destinations trip, such as for example a cooperative trip in which case a vehicle picks-up one or more passengers having different destinations, for example according to a prescheduled trip, and which the trip affects a time horizon of coordination control processes, and in this respect such a trip may be handled either as multiple discrete trips or as a trip having sub destinations.

According to some embodiments, a said expansion may further comprise, in case of multiple discrete trips, conversion of each destination into an origin towards a subsequent destination at a time it arrives to the farthest destination, ignoring further destinations which affect the demand of trips under coordination control processes. In this respect, a service which supports constraints on trips with pre-scheduled pickup destinations may enable, by informing about such constraints as part of a request for trip, a more accurate traffic prediction according to multiple destination pending trips. For example, a sub-trip, that is, destination to destination sub-trip, may be handled as predictable demand constructing prescheduled chain of sub-trips. According to such embodiments, times of arrival to destinations, which are converted in due course into origins along prescheduled trips, may be used by the predicted path control to refine predicted demand from one coordination control cycle to another. For example, a traffic prediction which is a result of a recent coordination control cycle may feed a subsequent cycle with respective predicted demand according to recent traffic prediction, enabling to refine the respective part of time dependent predicted demand and accordingly traffic predictions. Such demand may preferably include delays required with picking up passengers. Such refinement to predicted demand may further be expanded to include any prescheduled trips either multi-destination trips or single destination trips to refine the time dependent predicted demand for time dependent traffic prediction.

According to some embodiments, a said expansion may further comprise an application of a driving navigation service which supports planning of pre-scheduled destinations trip and which service may further enable dynamic changes in the destinations of the trip, before and during a trip, which should preferably update a path control system by trip related destinations in order to enable multi destination path control. In turn, the path control system may enable updates to the said service about changes in estimated time of arrival to destinations through, for example, server to server communication which updates by a path control system the service application estimated times of arrivals to destinations. This may enable the service application to update accordingly the driver, and preferably also participants in a prescheduled trip, with estimated time of arrivals to destinations.

According to some embodiments, a said expansion may further comprise search for time dependent K shortest paths which is applied with said search for a new alternative path to mitigate relatively loaded links in an iteration of mitigation, enabling more efficient mitigation. In this respect, faster mitigation may use time dependent K shortest paths under travel time constraints by choosing randomly one path out of the K paths a new alternative path, wherein the random choice is made under a limit that the longest possible path complies with the threshold associated with the mitigation.

According to some embodiments, a said expansion may further comprise, under conditions in which traffic evacuation or traffic dilution is required from a certain part of a network, determination of destinations to be assigned to a vehicle before a search for paths is applied. In this respect, coordination control processes, which should maintain fairness by assigning non-discriminating paths to vehicles, are expanded to support evacuation or dilution towards common destinations which are preferably located farther than effective destinations on the network in order to enable to apply efficient, non discriminating and flexible evacuation or dilution of vehicles towards a plurality of effective destinations (potential multi effective destinations per said common farther destination) according the developing dynamics in the evacuated or the diluted part of the network.

According to some embodiments, a said expansion may further comprise expanded coordination control processes which assign fictitious destinations to vehicles on a fictitiously expanded road map. Fictitious expansion to a map (beyond the part of a real network which should be evacuated) is applied in a case when it may facilitate efficiency and fairness in the assignment of paths during the evacuation or the dilution. According to some embodiments, fictitious links are planned and assigned on a fictitious expanded part of the road map enabling expanded coordination control processes to guide vehicles towards fictitious destinations through effective potential exits associated with the real part of a network to be evacuated or diluted.

According to some embodiments, a said expansion may further comprise fictitious destinations which may preferably be dynamically distributed around the evacuated or diluted angles enabling to assign dynamic fictitious destinations to vehicles according to dynamic development of the flow on the evacuated or diluted part of the network.

According to some embodiments, a said expansion may further comprise a dynamic assignment of a fictitious destination for a vehicle may be applied by an agent associated with calculation of paths for the vehicle according to increase or decrease in the traffic flow towards a fictitious destination of a vehicle. In this respect, two or more of the above described cycles of coordination control processes are applies in parallel, wherein each cycle is applied with different fictitious destination. The plurality of results may be evaluated by controlled traffic predictions, by synthesis of different DTA simulations fed by different result of paths according to different fictitious destinations. According to the shortest estimated time result to effective destinations, a decision process may determine the preferred fictitious destination to be assigned for a vehicle with further evacuation or dilution of traffic. The smaller the difference between adjacent fictitious destination, applied by said cycles, the higher is the efficiency to control dynamically assignments of fictitious destinations.

According to some embodiments, a said expansion may further comprise different fictitious destinations which are predetermined as adjacent destinations according to which changes to fictitious destinations are applied.

According to some embodiments, said expansion may further comprise a first choice to assign a fictitious destination which is the fictitious shortest straight line towards a fictitious destination while preferably fictitious destination are more densely determined with respect to more dense exits from the evacuated or diluted part of the network.

According to some embodiments, said expansion may further comprise acceptable exits on a roads map from the evacuated or diluted part of the network which may expand the part of the map of the evacuated or diluted part of the network by straight links towards fictitious destinations, which fictitious links are assigned with fictitious capacities that may not change priorities of said exits. In this respect adaptation of capacities and lengths of fictitious links towards fictitious destinations may preferably be assigned dynamically according to developed flows on the evacuated or diluted part of the network.

According to such embodiments, fairness in assignments of paths may be maintained by the tendency of dynamic convergence associated inherently with coordination control cycles and iterations of coordination control processes. In this respect, tendency towards fair assignments of routes refers to non-discriminating convergence in terms of travel time for same trip conditions at the time of assignment of paths. For example, dynamic assignment of paths to vehicles, having substantially the same position to destination pairs, will be maintained according to current coordination control cycle or iteration using traffic predictions respectively with finite time horizon of a rolling time horizon.

According to some embodiments, a said expansion may further comprise trips that are, or might have been considered, to be assigned with paths, according to coordination control processes, and are not yet within a part of a network that should be evacuated or diluted, and which paths are or might have been assigned with paths which pass through the part of a network before evacuation or dilution has required, may be diverted from the evacuated or diluted part of the network according to a method which uses fictitious time dependent travel time on the evacuated or diluted part of the network. According to such embodiments, mapped and predicted time dependent travel times on the part of the network that should be evacuated or diluted, may artificially be adapted to prevent or dilute entries of non authorized vehicles to the evacuated or diluted part of the network. In this respect, travel times on links that are related to a part of a network under evacuation may be changed artificially to high travel time costs that prevent assignment of paths by coordination control processes to non authorized vehicles, outside the evacuated part of the network, to enter the evacuated part of the network. In case which refers to dilution of a part of a network, the travel time costs of links on such part of the network may be adapted artificially to an allowable level of traffic entry to the diluted part of the network. In order to have control on the allowable level the time, costs should be adapted dynamically according to developed alternatives on the network and according to the dynamic freedom degrees on the network for allowed entries to the diluted part of the network.

According to some embodiments, a said expansion may further comprise a diluted part of the network which may refer to a part of the network to which evacuated vehicles are guided, and which part of the diluted network includes the destinations of the evacuated vehicles. According to some embodiments, the evacuated and the diluted parts of the network are divided into sectors, possibly overlapped sectors, enabling the evacuated traffic to be distributed within the evacuated and the diluted parts of the network enabling to shorten the evacuation time under said fairness constraint. DTA based simulation of traffic prediction for a finite time horizon may preferably be long enough to enable evaluation of the potential evacuation result, and which weights to time intervals within the time horizon may preferably be used with the confidence level in predictions associated with forward time intervals. (the term simulation used hereinafter and above may refer to computer simulation).

According to some embodiments, a said expansion may further comprise a path control system which may be expanded to support traffic lights control system, wherein predicted traffic, which is a result of a traffic load balancing performed by a path control system according to a given traffic light timing plan is transmitted to a traffic light optimization system and which accordingly the traffic light optimization system optimizes the timing of the traffic lights timing plan. In turn, the updated traffic lights timing plan is transmitted back to the path control system to further perform load balancing by the path control system according to the updated traffic lights timing plan. Such an interaction between a path control system and a traffic lights optimization system may be performed periodically. A basis to determine optimization periods can start from performing such an interaction for each traffic prediction by a path control system up to any period which can be based on traffic lights adaptation to the load balancing applied by the path control system according to predicted average traffic development along a day, or along any other period of time. According to some embodiments, criterion to determine the period of time may be the stability of the interaction, wherein too frequent interactions may cause instability in the coordination control processes and in the traffic lights control, while less frequent interactions may enable convergence to lower deviations from optimal network flow. Empirical trial and error process may enable to adapt the frequency of the interactions according to system resources and different levels of dynamics in the traffic.

According to some embodiments, a said expansion may further comprise processes associated with agents which are preferably performed in parallel at substantially the same time, that is, a path associated with a trip is associated with a respective agent, or at least a plurality of agents utilize available computation power to maximize parallel computation. In this respect, a path associated with a trip is associated with an agent which may for example refer to an agent associated with a plurality of trips.

According to some demonstrative embodiments, said expansion may further comprise links on the network for which load balancing is applied and which links are links on the network that exclude minor roads or roads with minor traffic. The aim of using a diluted network in this respect is to reduce computation power related to path calculations on the network for path controlled trips. With such an approach path calculations for load balancing may avoid a need for coordination of paths on links which won't worth to be considered for load balancing as described above.

According to some embodiments, a said expansion may further comprise a system which provides driving navigation service, and which served by a path control system, calculates a path for a trip according to a request from a DNA, and then, if the path refers to a part of the network which is served by the path control system, then the system which provides driving navigation service transmits to the path control system, in case of for example an entry to a path controlled region, the estimated entry time, entry position and destination with respect to the path controlled served region to the path control system. In case that the vehicle has an origin in the served region or should (preferably) just pass through the served region, while the destination is outside the served region, then a position that relates to destination is transmitted to the path control system enabling the path control system to decide on preferred exit from served region by a path controlled trip. Transmitted destination should preferably be associated with time dependent arrival position to the served region which may refer to time dependent position related information for a delayed entry of a trip to the part of the network which is served by predictive path control. A delayed entry of a trip to a served region by path control may refer not only to a trip which departs from a position which is outside of a region which is served by a path control system and which anticipated to enter a region which is served by path control at an anticipated time but also to a pre-scheduled trip which may depart from a position within the served region.

According to some embodiments, a said expansion may further comprise optimization of degrees of freedom on a network for load balancing wherein optimization may optimize traffic dilution generated by road toll charging, and wherein the determination of the level of the charged toll is performed according to analysis of the contribution of the traffic dilution to improved flow on a network which is generated by for example the said path control system. According to an analysis, toll charge values may for example be determined to provide optimal degrees of freedom on the network enabling to apply most efficient coordination control processes. Toll charge values which affect the efficiency of a load balancing control processes may use flow trend criteria in order to be optimized. In this respect, if an increase in the flow on the network is a result of an increase in the toll charged values, locally or globally, then further respective increase in the value of the toll is evaluated and so forth. If an increase in the charged value reduces the flow, then a reduction in the toll charge values may be applied. With such approach a search for optimal flow may be obtained for load balancing under local or global demand control. In order to prevent negative responses from the public to changes in the toll charged values, there is a possibility to evaluate the potential increase or decrease in the flow according to simulated increase and decrease in the demand and accordingly to identify trends in flow. According some embodiments, value of travel time related criteria may be added to the flow trend criteria, wherein, according to different periods of time priority may be provided to different zones or roads or sections of roads to optimize local flow according to toll charge values. In this respect, if according to the simulation, the cost of the flow in terms of value of time may be reduces to certain zones or roads by differentiations in demand control, then priority according to value of time may be used to determine local toll charge values. As a result, there is a possibility that in order to minimize cost of flow in terms of value of time the overall flow on the network might not be maximized while value of travel time criteria are added. An example in which priority might be considered relates to zones and access to zones where the value of travel time is more costly. With such a view, it is valuable according to some embodiments to consider with implementation of load balancing a dormant road toll infrastructure which may motivate high usage of controlled trips by a "carrot and stick" means, wherein toll is executed if a vehicle avoids contribution to load balancing and if further dilution in traffic is required then discounted toll can be applied for optimizing economical benefits. This may enable to control the timing to maximize flow and economical benefits by load balancing which is supported by positive and negative incentives to use path controlled trips. Which such an approach there is a possibility to substitute a brute force road toll approach by approach that enables to balance between negative incentives of road toll and positive incentives provided with privileges to controlled trips. Such a balance may enable to maintain optimal flow on the network with respect to an ability to optimize benefits in terms transportation economics and sensitivity to the public possible responses.

In the following a description of state estimation and calibration with respect to provision of remedies to issues associated with DTA based predictions for traffic while part of the traffic should be modeled and in which case there is a need to calibrate in substantially real time the DTA simulator for and by the models associated with the DTA simulator (hopefully a rare need while model based path controlled trips may be used partially during a period of a transition from non to full usage of coordinating path controlled trips to full usage).

With such approach, physical phenomena and human related behavior of non controlled trips are modeled by a DTA enabling some level of realistic predictions to evaluate the potential effect of a control trips in a finite time horizon within a rolling horizon. Under model predictive control approach, which predictive coordination control processes apply, the partial model based trips should be calibrated according traffic related information (preferably flow related data) by joint/dual state estimation with respect to the DTA demand state vector (hidden variables) and parameters of the models (hereinafter and above the term predictive coordination control processes refer to the term coordination control processes and which both may be used interchangeably). Typical division is made between the process (causation) model of a state estimation method applied by the zone to zone demand model of a DTA, and a measurement (effected) model of a state estimation method applied by the supply model of a DTA.

However, some major issues raise with the calibration of A DTA while major part of the trips are modeled and which issues refer to:

a) Very high dimension demand state vector, in case of a city wide homogeneous networks, makes the potential quality of state estimation to be a very serious issue to say the least. In his respect, the issue is a twofold issue wherein the first issue refers to the need for high/huge computation power to cope with estimation which is based on a non linear time varying supply model and wherein the second issue is the very limited potential accuracy that may be achieved from such estimation while the supply model is further a stochastic model. This simplified description is further associated with further issues elaborated hereinafter.

b) Stochastic route choice model, which is part of a supply model, categorizes the supply model as a stochastic model (high dimension probabilistic multi model) which under recurrent traffic is noisy, while under non-recurrent traffic (irregularities on the network) is noisy and biased (due to lack of a reasonable route choice model for irregular traffic), c) High coefficient variations associated with high dimension demand state vector (zone to zone demand pairs), while a decreases in the dimension increases the size of the zones and as a result resolution of traffic simulations, maintaining in both cases limited accuracy to say the least.

d) Time varying non linear supply model adds another obstacle to an ability to calibrate at a high resolution a DTA simulator. In this respect, the non linearity of the supply model is a dynamic which puts a limit on a possibility to decrease the state time interval in order to reduce coefficient variations associated with the zone to zone demand state vector, in order to gain higher resolution in traffic predictions which in turn enables more efficient and more robust predictive control.

e) High cost infrastructure, required with high quality flow related field measurements at high coverage on a city wide network—in order to enable from measurements part point of view potential calibration at acceptable quality (if other issues would have been resolved), puts a high economical barrier towards implementation of high quality DTA calibration in real time.

f) Lack of covariance elements (required with variance-covariance matrix) for the estimation of the state vector and further covariance elements required with joint estimation of demand state vector and supply model parameters, g) Traffic information about irregularities provided to drivers by different private and public entities is counterproductive to determination of route choice model.

h) Dilution of network links in order to reduce the dimension of DTA calibration may become a non linear, noisy and costly issue. With respect to non linearity and noise, demand prediction are based on statistical models while non linear flow entries and exits from/to the diluted part of the network are at best case might be biased and noisy whereas in the worst case biased and very noisy (in case of entries and exits from/to small links). With respect to the cost, high cost flow related sensors to measure flow related entries and exits make such a solution costly.

i) Decomposition of the DTA calibration applying distributed state estimation, in order to cope by feasible computation power with reasonable dimension of a demand state vector estimation, raise not just a non linear demand prediction issue on the borders of decomposed parts of the network, but also an issue of convergence due to interrelated effects among state estimations applied for different parts of the decomposed network. This raises an issue of iterative state estimation in order to enable reductions of interrelated estimation errors which under real time constraints is expected to leave the demand state estimation erroneous (the issue of non linear time varying stochastic supply model is not vanished by such approach and in this case the issue has further chained effect on interrelated parts of the network).

j) Lack of high quality traffic data, which due to high cost of traffic counting sensors may not be expected to enable high coverage and which raises the issues mentioned with diluted network.

Alternative sources for demand data, for example, from external sources such as tracked cell-phones by mobile network operators, are non predictive (delayed) and are not reliable for robust predictive control; wherein as long as a vehicle has not arrived to its destination respective demand should still be estimated (no magic solution is expected in this respect). Furthermore, ambiguities about location and number of cell-phones per vehicle makes such data non reliable for robust DTA calibration and, therefore, an operation which should guarantee robust path controlled trips may not be acceptable based on such data.

Bi-directional DSRC infrastructure, which may be considered as another alternative to generate demand data, suffers also from non predictive demand data but in comparison to the former approach it may be expanded to gather predictive demand from DNAs. However such infrastructure is very costly and therefore may not be expected to provide high coverage on a network, and as a result, may support at most a diluted network which may not enable to apply robust predictive path control as mentioned in "h".

Car plate identification, which theoretically may apply a functionality of unidirectional DSRC, is not a predictive solution and suffers, in addition of a need to consider diluted network due to high costs, from big brother syndrome.

Recent concept considering low cost Bluetooth traps to count vehicles on roads and in intersections, are applicable if cell phones are used with open Bluetooth, however, such approach is not predictive and suffers from small sampled non predictive demand data and from ambiguities about number of cell phones in a vehicle and, therefore, may not enable to contribute to robust predictive path control.

This maintains the issue of a need to apply state estimation, while traditional approaches of state estimation are not able to cope with the mentioned issues, if the relative share of path controlled trips on the network is not very high. Examples of known methods which have considered to be able to cope with some of the mentioned issues are not generic solutions and may refer to:

1) Combination of off line and on line state estimation such as LimKF, which presents an approach for reducing the on line computation power by pre-prepared off-line data, may not enable to cope with dynamic derivatives expected in typical urban traffic (actually LimKF implements a sort of steady state Kaman Filter which may not be applicable for time varying derivatives associated with a non linear system).

2) Combination of SPSA with EKF may not guarantee acceptable number of converging iterations for high dimension state vector estimation with respect to affordable computation power and may not vanish the issues associated with the stochastic nature of a supply model which should be a simplified model as well in order to cope with run time issues.

Therefore it may be critical to address the above mentioned issues by a more generic and robust approach, wherein the most attractive approach in this respect is to encourage the use of path controlled trips preferably under the supervision of authorities in order to avoid or at least minimize the effect of state estimation issues, that is, minimizing the dependency of traffic prediction on state estimation and avoiding or at least minimizing the stochastic effect of the route choice model on predictions. Generating high share of path control usage on a network may solve the above mentioned issues which raise another issue of a need to apply incentives to encourage high usage. Incentive in this respect should preferably consider a platform which may provide a vision which may enable ultimate optimization of the network, enable high acceptance and be a relatively low cost solution.

Such a solution may start with free of charge road-tolling that further may, according to a need, be expanded to discounted tolling which enables to optimize the ratio between traffic demand and freedom degrees on a network, wherein a relatively low cost solution in this respect is GNNS tolling concept which further creates a vehicular platform that under marginal upgrade may enable to apply robust predictive path control based on authentic data which is gathered from expanded vehicular GNNS tolling system and which may include: predictive demand, predictive routes (paths) and accurate traffic data, which is gathered anonymously; and which further said optimization of the traffic on the network may be supported by longer time horizon predictive demand based on implementation of prescheduled trips. In case that prescheduled trips are not applied, or partially applied, then long term predictions of demand may preferably apply progressively increased time intervals for prediction in the prediction horizon which improves the reliability of predictions but limits the resolution of discrete demand predictions, e.g., with usage of time series analysis methods.

In this respect, increased confidence reduces the resolution of zone to zone demand while tradeoff has to be considered between positive effect of lower demand resolution on demand prediction and its negative effect on network traffic flow prediction by the supply model. With such an approach "K means clustering" method, for example, can support zone to zone resolution changes under required constraints. According to some embodiments, prior knowledge about expected exceptional demand can be used to enable earlier reaction and more reliable demand predictions. According to some embodiments, demand based on classified vehicles may further be used to predict demand based on the current and historical mix of classes of vehicles with respect to zone to zone demand pairs. That is, enabling fusion of multi time series analysis according to one or more classes for a zone to zone demand pair, while providing weight to each time series analysis result in the fusion process.

Acceptance of such approach, may not be avoidable if robust non discriminating and most efficient predictive path control is considered. However such approach may guarantee high acceptance in case that robust privacy preservation of trip details may be guaranteed, and for which some embodiments provide an innovative solution. In case that the usage level of path controlled trips might still not be sufficient (which under the suggested concept of tolling privileges may doubtfully have a case), the lack of sufficient demand related data may require to be complemented by innovative methods that provide remedies to the issues mentioned with on-line state estimation and calibration of a DTA that is based on sampled traffic and partial demand data.

According to some embodiments, the dimension of a demand state vector in this respect may be reduced by a few orders of magnitude if according to empirical study there is a substantial time dependent stationary random split distribution of zone to other zones demand of trip pairs associated with zones on the network. Such a phenomenon is known as quasi dynamic demand which was discovered by empirical studies. According to conditions of quasi dynamic demand time intervals associated with a zone, some or all of the zones in the demand model may be used as elements of the state vector instead of zone to zone demand of trip pairs. In this respect the generated traffic by a zone, which has inherent probabilistic destination choice model, has to be estimated as the demand in the state vector. That is, traditional demand of zone to zone demand of trip pairs is converted into quasi dynamic demand of zones in state vector which enables to reduce the dimension drastically. This in turn, expands the route choice model by probabilistic split associated with a quasi dynamic demand from the zone to destination zones (hereinafter, quasi dynamic zone). For example, if there are 300 zones in a medium size city, then the number of potential active zone to zone demand of trip pairs should have been 300 multiplied by 299 which produces a figure close to a 5 order figure, and if in an extreme case the state vector can be constructed of 300 quasi dynamic zones then it may reduce the dimension of a state vector by 3 orders. However, the stochastic level of the DTA in such a case increases by the probabilistic splits associated with quasi dynamic zones and therefore the gain from dimension reduction in the state vector has a cost in a need to increase the simulation runs of the prediction phase in the state estimation in order to maintain acceptable (averaged) estimation of the demand. The increase in simulation runs may have high cost in computation power, while still leaving open the issue of lack of inter zone related covariance (similar to lack of inter related covariance among zone to zone demand of trip pairs) in the state vector. This method, might contribute to a more acceptable state estimation due to reduced computation power, for example, in comparison to Extended Kalman Filter (EKF). However a transition toward Monte Carlo simulation involvement in conjunction with EKF or UKF, or maybe toward a use of an ensemble Kaman Filter, increases the stochastic issue and as a result limits the potential accuracy of the demand estimation with respect to non sufficient computation power.

However the benefits of using quasi dynamic zones to estimate the demand is justified not just by the reduction in computation power, in comparison to pure zone to zone demand of trip pairs, but also by the ability;

to overcome coefficient variation issues associated with the state vector, and to reduce the level of network decomposition required with large networks for which distributed and iterative state estimation is required to reduce interrelated errors among state estimation performed in parallel on adjacent sub networks.

According to an embodiment, reducing the effect of the stochastic issue on traffic predictions may be performed by adding a Monte Carlo DTA post process to the state estimation, wherein according to an updated state vector, produced for example by an average of a plurality of state estimates while using Monte Carlo DTA runs, the Monte Carlo DTA post process searches for a seed or a plurality of seeds that according to acceptable confidence may best match current field measurements, and then uses the matched seed or the plurality of seeds to synthesize traffic predictions for path control; wherein a plurality of seeds enable to average traffic predictions. In this respect reduced number of more relevant runs of a stochastic DTA simulator may be used for predictions.

Such an approach may further support a certain level of irregularities in traffic as well, where more suitable seeds are used to overcome deviations from typical traffic under non major irregularities. Major irregularities may require identification of the location and size of irregularity and accordingly apply changes in the route choice and in network capacity models. Identification of irregular traffic location(s) and mapping respective development of queues may be found in prior published patents of the inventor of the present invention, describing queue mapping methods. According to some embodiments of the present invention, subject to identified location of a front end of a queue, the length of the queue, and preferably arrival and departure rates from a queue which develops on a network, temporal capacity correction is made to a respective location on the network, by rerunning the DTA supply model according to the estimated time in which the DTA flow has deviated from the field flow according to field measurements. With such a case, updates that were made to the demand state estimation under traffic irregularity, which wasn't identified at the time of the update, should preferably be re-updated by a post state estimation process according to temporal changes made to capacities of network links, and preferably according to respective changes to parameters of the route choice model to short term reaction of drivers to traffic loads on the network. Traffic information about irregularities provided to drivers not under path control may be counterproductive to the calibration of the DTA supply models, which provide another incentive to apply path control which is under the supervision and promotion of the authorities.

Preferably under supervised conditions, a stochastic DTA, used by the prediction phase of state estimation for a plurality of runs may preferably use a weighted average to determine average prediction for the correction phase to be used, for example, by EKF, and may expanded further, for example, to Ensemble Kaman Filter.

According to some embodiments, a further improvement in a dement state vector estimation can take benefit of a piecewise estimation. In this respect, piecewise refers to piecewise linear relation constructed for non linear relation between the state vector and corrected output from a measurement model according to field measurements. With such an approach, a state time interval, which for example may be long enough to enable sufficient reduction in coefficient variation of a state vector, and which might be too long to avoid time varying non linearity of the DTA supply model, can't be represented by a single observation matrix with a functionality similar to the functionality of an observation matrix used by for example a Kalman Filter (and even by a single observation matrix of derivatives as used for example by EKF). In order to overcome this issue, according to some embodiments, multi time related inverse or pseudo inverse observation matrixes are used as a chain to represent piecewise backward linear relation between the state vector and corrected output from a measurement model according to field measurements. In this respect, the state estimation time interval is divided into multiple intra time intervals which each of them may be short enough to enable piecewise linearization by construction of a chain of observation matrixes for intra time intervals and which each observation matrix is converted into an inverse or pseudo inverse observation matrix for back propagating corrected output from a measurement to a state vector update. Each inverse or pseudo inverse observation matrix which refers to an intra time interval, and which is not the latest intra time interval in the state estimation time interval, is used to back propagate simulated measurements corrected according to field measurements, to prior intra time interval. Such back propagation is performed within the time related inverse or pseudo inverse observation matrixes used as a chain to represent piecewise backward relation which converts gradually corrected output from a measurement model according to field measurements to a state vector update. With such an approach the units of the measurements should be the same as the units of the state vector.

According to some embodiments, such a process may be performed for a plurality of DTA runs which represent the stochastic nature of the measurements of the supply model in order to correct the demand state vector according to average demand estimation. According to such embodiments, the variance or variance-covariance matrix of the state vector may be propagated forward for each of the selected runs which represent the stochastic nature of the measurements of the supply model in order to assimilate field measurements (correct DTA simulated measurements). Back propagation of corrected variance or variance-covariance matrix may not be needed if the state vector is Poison distributed and only the propagated variance of the state vector is used with assimilation of field measurements, since in Poison distribution the correction to average values of the state vector determines respective variances.

According some embodiments, the average of the plurality of DTA runs which represent the stochastic nature of the measurements of the supply model is used with average time related inverse or pseudo inverse observation matrixes applying a chain to represent piecewise backward relation which converts gradually corrected output from a measurement model, according to field measurements, to corrected average values of the state vector.

Correction to the output of a measurement model according to field measurements is preferably performed by optimal weighted sum of field and simulated measurements where each measurement is weighted by the inverse of its uncertainty and where such optimal estimate is used for example with MMSE optimal estimation or Weighted Least Squares Estimation based methods.

A more accurate but more complex approach may use inverse DTA supply model, instead of inverse or pseudo inverse observation matrixes, which makes piecewise approach to be redundant. According to some embodiments, the piecewise state estimation of a demand state vector is expanded to overlapped piecewise state estimation of the demand state vector, where a piecewise state estimation of the demand state vector is performed by overlapped state estimation time intervals, whereby subsequent state estimation time intervals overlap in their intra time intervals except of two intervals which are, for example, the last intra time interval of the latest piecewise estimation time interval and the first intra time interval of the prior estimation time interval. With such an approach more frequent estimations can be obtained while enabling state estimation time interval with lower coefficient variations in the demand state vector.

According to some embodiments, joint smoothing and overlapped piecewise state estimation of the demand is performed, where back propagated measurements in intra time intervals of the current state estimation enable to improve prior state vector updates by current back propagated and corrected measurements for respective intra time intervals in overlapped state estimation. Such a smoothing process may improve prior updates of overlapped state estimates by optimal weighted sum of field and simulated measurements where each measurement is weighted by the inverse of its uncertainty and where such optimal estimate preferably uses Weighted Least Squares Estimation approach. This approach may enable to improve prior measurement corrections for prior intra time intervals based on new back propagated measurements correction updates.

According to some embodiments, a second phase or an iterative process of piecewise state estimation may be used to smooth non linear beaks in piecewise linear chain of inverse or pseudo inverse observation matrixes, which is a result of bias corrections to the inverse or pseudo inverse observation matrixes after correction of measurements according to field measurements, where a second phase or an iteration in an iterative process enables progressively to reproduce back propagated state estimation with less non linear breaks (jumps) in chained inverse observation matrixes.

In addition to the advantage of using piecewise approach to enable higher time interval of state estimation, which in turn enables to reduce the coefficient variation of the updated state vector, the piecewise approach may further enable to increase the state estimation time interval to reduce ambiguity in correction of demand state vector comprised of elements of zone to zone demand of trips constructing high variation in lengths among trips. In this respect, a too short state estimation time interval may leave ambiguity in the correction phase among trips which are longer than the state estimation time interval. This raises a new issue of too long state estimation time interval that generates higher accumulated error due to the increase in the number of intra time intervals respectively. In such a case the alternative of using quasi dynamic zones, as variables of the demand state vector, may enable to shorten the state estimation time interval while reducing the issue of ambiguity in correction of long trips due to the probabilistic splits toward destinations associated with quasi dynamic zones.

If quasi dynamic conditions may not be applied to all zones then, according to an embodiment, an overlapped combination of short and long state estimation may be applied in order to enable, on one hand, demand predictions under quasi stationary conditions by relatively short state time intervals, and on the other hand, to cope with ambiguity of state estimation due to long trips by long state time intervals. During the short state estimation time intervals the latest update according to long trips may be used. The criteria to determine time length for short and long intervals may take into account the potential reduction in the weight of potential errors due to slower updates for long trips.

Demand estimation in conditions where a share of the vehicles may provide traffic related field measurements to be assimilated by state estimation for the correction of a demand state vector, should preferably rely on traffic flow related data constructed by for example the share of vehicles that are using path controlled trips. Flow related data may enable to reduce inaccuracies in the correction phase of demand state estimation in comparison to measurements such as velocities.

The issue in a case where velocities are used as measurements is that a DTA simulator may provide typical velocity measurements according to simulated flow densities on links, while field measurements which are relying on limited or on a too small number of vehicles, may not reflect typical velocities according to flow densities. This issue becomes a more significant issue in urban areas wherein significant part of the traffic is characterized by queues for which velocity related measurements may not be suitable to adjust simulation flows by demand corrections.

Therefore, if the share of vehicles that may provide varying position related data for field measurements is too small to be used for flow measurements, then according to some demonstrative embodiments it may be valuable to use two means that may reduce this problem.

According to some embodiment, the first means that enables to produce flow based field measurements is queue mapping which enables to provide link flow related data as field measurements according to expected density of vehicles in mapped length of a queue; and which further mapping of arrival rate to the queue and departure rate from the queue may enable to predict the length development of the queue; and which a queue mapping process is based on position related data gathered from probe vehicles providing to the queue mapping process position related data; and which the queue mapping process may use processes of queue mapping described in prior published patents of the inventor of the present invention with improvements according to some demonstrative embodiments of the present invention.

According to some embodiments, an improvement to queue mapping method, described in prior published patents of the inventor of the present invention, may take benefit of DTA simulations used with demand state estimation. According to prior published patents of the inventor of the present invention there is a possibility to map the length, the arrival rate and the departure rate of queues by a small percentage of vehicles in the traffic which provide position related data for a queue mapping process. According to such a method, estimated length of a queue can be mapped for example by reports of positions from vehicles, wherein a queue mapping process which receives the positions may map queues along one or more time synchronized position related record reports provided by probe vehicles, wherein reports of synchronized positions which may suffer from communication delays should not affect negatively the queue mapping at substantially real time, and wherein:

the length of a queue is determined according to farthest position out of position reports during one or more substantially synchronized reporting times, and wherein, the number of the substantially synchronized records is determined according to an estimated percentage of vehicles that statistically may take share in said position related data reporting for a mapped queue, that is, the share of the reports in the queue is not the criteria to determine the number of the substantially synchronized records, but the percentage of vehicles that statistically may have a possibility to take share in the reports during the substantially synchronized reporting times.

Position related data may refer to the distance of a reporting vehicle from the head (front end) of a queue which requires that a reporting vehicle will have a road map means to determine distance from the head (front end) of a queue.

According to simulation results, published in prior patents of the inventor of the present invention, in case that the percentage of potential reporting vehicles in a queue is 3 percent then the number of synchronized reporting times which minimizes the error in the queue length is 5. Another example is a case of 5 percent of potential reporting vehicles in a queue for which the number of synchronized reporting times that minimizes the error in the queue length is 3.

With such a method, the percentage of vehicles that statistically may have a possibility to take share in the reports during the substantially synchronized reporting times, is performed according to statistical methods. However, such methods might under path control, which applies predictive control in a non linear network response to dynamic flow, to be non reliable or not sufficiently reliable while using probe vehicles which are guided by path controlled trips. In this respect the non linear effect limits the time interval in which statistical methods may be sufficiently reliable, that is, under wide sense (quasi) stationary flow and some prior assumption about the probability distribution function to estimate the percentage of vehicles that statistically may take share in said position related data reporting for a mapped queue which under non linear dynamic effects may be changed at a level which can't be ignored.

Therefore, the said percentage of vehicles that may have statistically a possibility to take share in the reports during the substantially synchronized reporting times, is substituted according to some embodiments of the present invention to be estimated according to the DTA simulation during, for example, DTA run(s) that produce traffic predictions after demand estimation. That is, vehicles which are using path controlled trips and are simulated by the DTA, and which such vehicles provide position related data reports for a queue mapping process, are used according to the DTA simulation to estimate the percentage of vehicles that may have a possibility to take share in the reports during the substantially synchronized reporting times for a queue mapping.

According to such embodiments, a new term which refers to vehicles that may expected to have a possibility to take share in the reports, according to DTA simulated flow, substitutes the referred vehicles that may statistically have a possibility to take share in reports of position related data for a mapped queue.

According to some embodiments, vehicles that may expected to have a possibility to take share in reports for queue mapping on a link of the network, may use according to DTA simulated flow, short term history of records of the share of such vehicles in the flow (hereinafter "share of records") in an accepted (relevant) time interval according to the stability of path control effects on the link, and which the length of the history of records is determined accordingly. According to some embodiments, in order to provide more relevant vehicles that might be expected to have a possibility to take share in the reports, according to DTA simulated flow, the above process may refer to historical as well as to predicted share records according to DTA prior demand estimation runs and according to recent DTA prediction, wherein the share of time interval to be used with historical and predicted vehicles may be determined according to the confidence in the weight in the predictions which is a result of the path control stability effect on the link. In case of high stability the share of the predicted and the historical share of records may be equal. With such an approach, there is a possibility to overcome the inherent inaccuracy in time delayed average which is a result of averaging records of vehicles that may expected to have a possibility to take share in the reports according to DTA simulated flow, while using historical share of records for averaging more relevant vehicles that may expected to have a possibility to take share in the reports according to DTA simulated flow.

The issue that may arise in such case relates to the reliability of the queue length estimate, based on the estimated average share of expected reporting vehicles while the DTA and the demand estimation are deviated from the real traffic and traffic demand.

In case that load balancing which is maintained by path control may guarantee non major deviations then the approach may expected to be productive.

The approach of estimating the share of expected reporting vehicles, may according to some embodiments be applied to estimate arrival rate to a queue according to the DTA simulation, wherein the share of records are substituted by records of the sum of all vehicles for respective time intervals.

According to some embodiments mapped queues may be used as field measurements to correct according to state estimation the demand state vector by evaluating flows according to expected densities in a queue.

According to some embodiments, the second means to overcome the deficiency of a small share of vehicles which may provide position related data for field measurements, is to use flow related field measurements such as sensors and cameras; wherein major network junctions may preferably be monitored with an ability to determine the traffic flow spits among links from each of the links in a junction. According to such field measurements the pre and the post Monte Carlo processes may filter out non relevant runs of a DTA during demand state estimation. In this respect accepted DTA runs may refer to acceptable match between field measured splits and simulated splits; wherein the number of Monte Carlo runs may be determined dynamically, that is, required number of runs for required confidence in the demand estimation may count on acceptable number of runs that may acceptably be used according to a match between simulated spits and measured spits, for example, according to acceptable confidence interval as a result of stochastic DTA runs. According some embodiments, acceptable number of DTA runs may be used according to weighted average to estimate the demand state vector by for example EKF, UKF and its variants or by Ensemble Kalman Filter.

According to some embodiments, separated secured access to car identification and to trip details is applies by a toll charging center, enabling to void storage of trip details in a toll charging center and to prevent single source access to in-vehicle data.

According to such embodiments, when in-car authentication facility provides real authentication characteristic to a toll charging center, through communication means, it shares respectively a non car identification characteristic, but a respective unique characteristic, with the system which provides path control to the car and with the toll charging center. The non car identification characteristic is first shared by the in-car authentication facility and the system which provides the path controlled trip, and then it is shared with the toll charging center. This enables the toll charging center to associate path controlled trip with real authentication of the vehicle according to non car identification characteristic associated, on the one hand, with real and non real authentication characteristic and path controlled trip identity (received by the toll charging center from the in car authentication facility), and on the other hand with the path controlled trip details and respective real and non real authentication characteristics received by the toll charging center from an in car authentication facility. According to some embodiments, privacy preservation of trip details, in addition to cost reduction of fixed infrastructure which should identify and locate vehicles independently of the provision of path controlled trips, may be applied with a system which supports in car toll charging units and related methods for free of charge toll or toll discount to encourage the use of path controlled trips as described with some embodiments. With such a system association of trip details with car identification is maintained in the in-car toll charging unit which under the control of a driver may be transmitted according to a need to a toll charging center for example if there is a special need.

According to some embodiments, free of charge toll or toll discount which encourages usage of path controlled trips, preferably apply methods described by some embodiments, which may further improve updates of a road-book database, and which methods to improve updates includes inter-alia data related to traffic lights and signposts along roads and in intersections and their positions, and which such data is transmitted autonomously by vehicles for further updates which enable in-vehicle localizations on road maps according to in-vehicle sensor measurements.

In this respect, improved updates to a road book refers to updating changes in a road-book database by fusion of data which is generated by sensors of multiple vehicles. Sensors in this respect may include but not be limited to RADAR and/or Camera and/or Laser scanner to measure distance and space angle of an object in the vicinity of the vehicle. Said object may include but not be limited to road-book databases elements, such as traffic lights and signposts, vehicles and/or passengers.

The higher the density of the vehicles on roads the higher is the accuracy of such an approach, wherein according to some embodiments incentives provided to encourage usage of such vehicles. For example, provision of free of charge toll or toll discount may be used to encourage usage of autonomous vehicles in order to generate robust safety related data by fusion of multiple vehicle positioning related data.

According to some embodiment a central process applies the fusion according to said updates of new road-book database elements generated by vehicles.

According to some embodiments, methods that can be used for said fusion may include weighted average, such as can be applied by weighted least square based methods.

According to some embodiments, GNSS RTK based positioning of vehicles are used to locate some road book elements which can be used further as a reference for positioning of other elements to be updated in a road-book database.

According to some embodiments, the method of updating a new fixed element in a road-book database by a plurality of vehicles may be expanded to enable cooperative positioning of moving vehicles, wherein errors in measurement are expected to increase due to the motion of the measured target and the measuring source which makes the positioning issue worse in comparison to a case of positioning a fixed object such as a signpost.

According to some embodiments, a method associated with functionality of a combined in-vehicle toll changing and path control supporting unit—includes predetermined procedure to perform privileged tolling transaction with a toll charging center, while non exposing trip details, and to updating a path control system with data enabling robust path control performance, the method comprising:
  a. Receiving by said in-vehicle unit functionality data associated with time related varying positions of a path which should be developed according to dynamic updates to an in-vehicle driving navigation aid, wherein the received data may either be direct or indirect data and wherein indirect data may be may include dynamically assigned paths according to which the in-vehicle unit functionality determines the time related varying positions of a path which should be developed according to dynamic updates to an in-vehicle driving navigation aid,
  b. Tracking and storing positions along a trip by said in-vehicle unit functionality,
  c. Comparing by said in-vehicle unit functionality said tracked time related positions by the in-vehicle apparatus with time related positions associated with said path that should be developed according to updates to the driving navigation aid,
  d. Determining by said in-vehicle unit functionality, according to a level of a match, privilege related toll charging data which may refer to confirmed free of charge toll or privileged toll or full toll charge or unknown toll related conditions, without trip details
  e. Transmitting by said in-vehicle unit functionality by an IP address associated with the in-vehicle unit functionality a message which is characterized by being vehicle identifying and not trip identifying toll charging related data message, wherein the IP address differs from an IP address that is associated with the in-vehicle unit functionality while in-vehicle positioning and/or destination related data is transmitted preferably anonymously.
  f. Transmitting by said in-vehicle unit functionality using an IP address associated with the in-vehicle unit functionality vehicle positioning and/or destination related data, preferably anonymously, wherein the IP address differs from an IP address that is associated with the in-vehicle unit functionality while in-vehicle unit functionality transmits a message which is characterized by being vehicle identifying and not trip identifying toll charging related data message.

According to some embodiments said in-vehicle unit functionality apparatus apply the said method and which apparatus comprises:
  a. Mobile internet transceiver,
  b. GNSS positioning receiver, or sensor based localization associated with autonomous vehicles,
  c. Processor and memory,
  d. Communication apparatus to communicate with an in-vehicle driving navigation aid.

According to some embodiments, a method associated with functionality of an in-vehicle toll changing unit—includes predetermined procedure to perform privileged tolling transaction with a toll charging center, while non exposing trip details, the method comprising:
  a. Receiving by said in-vehicle unit functionality data associated with time related varying positions of a path which should be developed according to dynamic updates to an in-vehicle driving navigation aid, wherein the received data may either be direct or indirect data and wherein indirect data may be may include dynamically assigned paths according to which the in-vehicle unit functionality determines the time related varying positions of a path which should be developed according to dynamic updates to an in-vehicle driving navigation aid, b. Tracking and storing positions along a trip by said in-vehicle unit functionality, c. Comparing by said in-vehicle unit functionality said tracked time related positions by the in-vehicle apparatus with time related positions associated with said path that should be developed according to updates to the driving navigation aid, d. Determining by said in-vehicle unit functionality, according to a level of a match, privilege related toll charging data which may refer to confirmed free of charge toll or privileged toll or full toll charge or unknown toll related conditions, without trip details, e. Transmitting by said in-vehicle unit functionality using an IP address associated with the in-vehicle unit functionality a message which is characterized by being vehicle identifying and not trip identifying toll charging related data message.

According to some embodiments said in-vehicle unit functionality apparatus apply the said method and which apparatus comprises:

a. Mobile internet transceiver, b. GNSS positioning receiver, or sensor based localization associated with autonomous vehicles, c. Processor and memory, d. Communication apparatus to communicate with an in-vehicle driving navigation aid.

According to some embodiments, a method associated with functionality of an in-vehicle toll changing unit—includes predetermined procedure to perform tolling transaction with a toll charging center, while non exposing trip details, the method comprising:

a. Tracking and storing positions along a trip by said in-vehicle unit functionality, b. Determining by said in-vehicle unit functionality toll charging data, c. Transmitting by said in-vehicle unit functionality using an IP address associated with the in-vehicle unit functionality a message which is characterized by being vehicle identifying and not trip identifying toll charging related data message.

According to some embodiments said in-vehicle unit functionality apparatus apply the said method and which apparatus comprises:

a. Mobile internet transceiver, b. GNSS positioning receiver, or sensor based localization associated with autonomous vehicles, c. Processor and memory, In general, a path control system may but not be limited to include a non-transitory machine-readable storage medium to store logic, which may be used, for example, to perform one or more operations and/or at least part of the functionality of one or more elements of described figures, and/or to perform one or more operations and/or functionalities, as described above. The phrase "non-transitory machine-readable medium" is directed to include all computer-readable media, with the sole exception being a transitory propagating signal.

In some embodiments, a path control system may include one or more types of computer-readable storage media capable of storing data, including volatile memory, non-volatile memory, removable or non-removable memory, erasable or non-erasable memory, writeable or re-writeable memory, and the like. For example, machine-readable storage medium may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some embodiments, a path control system may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, a path control system may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, Python, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

FIG. 2 schematically illustrates a product of manufacture 200, in accordance with some demonstrative embodiments. Product 200 may include one or more tangible computer-readable non-transitory storage media 202, which may include computer-executable instructions, e.g., implemented by logic 204, operable to, when executed by at least one computer processor, enable the at least one computer processor to implement one or more operations at one or more apparatuses and/or systems, to cause to perform one or more operations, and/or to perform, trigger and/or implement one or more operations, communications and/or functionalities described above with reference to any of the figures, and/or one or more operations described herein. The phrase "non-transitory machine-readable medium" is directed to include all computer-readable media, with the sole exception being a transitory propagating signal. In some demonstrative embodiments, product 200 and/or storage media 202 may include one or more types of computer-readable storage media capable of storing data, including volatile memory, non-volatile memory, removable or non-removable memory, erasable or non-erasable memory, writeable or re-writeable memory, and the like. For example, machine-readable storage media 202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection. In some demonstrative embodiments, logic 204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like. In some demonstrative embodiments, logic 204 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A method to generate conditions enabling to apply predictive traffic load balancing on a road network, the method comprising:
   transmitting from a vehicle its position and destination to get served as an incentivized path-controlled trip by a navigation control system, and receiving a path for a path-controlled trip, wherein transmission of said position and destination and reception of said path use anonymous vehicle IP addressing, and wherein incentivized path controlled-trips are entitled with privileged network usage of free of charge toll or toll discount for obedience to the navigation control system applying, through path controlled trips, predictive traffic-load-balancing on at least a regional part of a city road network;
   receiving at the vehicle path updates from the navigation control system and transmitting from the vehicle position updates to the navigation control system, wherein reception of the path updates and transmission of the position updates use anonymous vehicle IP addressing;
   determining, under in-vehicle control, one or more charging amounts related to the vehicle's network-usage, comprising:
      tracking positions of the vehicle and determining matches and mismatches of tracked positions with positions that could acceptably be developed by the vehicle according to received path updates; and
      determining at least one charging amount related to network-usage for one or more matches according to data determining privileged network usage cost, and a charging amount related to network-usage for one or more determined mismatches according to data determining non-privileged network usage cost, wherein privilege in network usage is configured to enable simulation-based traffic predictions, associated with model predictive control supporting planning of paths for said predictive traffic load balancing, to be independent of modeling non path-controlled trips; and
   transmitting from the vehicle charging related data, associating a charging related ID with at least one charging amount related to the vehicle's network-usage, according to a charging procedure allowed to expose a non-anonymous ID with charged network usage associated with a path-controlled trip.

2. The method of claim 1, wherein a transmission associated with charging related data and related transmissions associated with position updates from the vehicle include no common information enabling unique association of charging related data with related positions of a path controlled trip, and wherein, subject to usage of common mobile communication medium to transmit from the vehicle non anonymous charging related data and related transmissions of position updates anonymously.

3. The method of claim 1, wherein the navigation system and the charging system are two separate systems.

4. The method of claim 1, wherein entitlement for privileged network usage by a new path-controlled trip, after arrival to a destination of a previous path-controlled trip on a non-preferred link for load-balancing, is subject to a predetermined waiting time at the destination of the previous path-controlled trip, wherein said non-preferred link is associated with the regional part of the city road network.

5. The method of claim 1 comprising storing in an in-vehicle memory trip-related information enabling to interrogate a potential appeal associated with a charged ID on a charged amount.

6. The method of claim 1, wherein determination of privileged network usage for said potential matches is associated further with determination of privileged network usage for autonomous driving.

7. The method of claim 1, wherein a local automatic car plate identification system identifies vehicles on the network and a vehicle associated with a path-controlled trip communicates with a server enabling to confirm usage of path-controlled trips.

8. The method of claim 1, wherein the model predictive control, associated with the navigation control system, plans paths—for on-network path-controlled trips and for predicted path-controlled trips, enabling path controlled trips to perform predictive traffic-load-balancing on the said at least regional part of the city road network, wherein position updates from vehicles associated with on-network path-controlled trips are used by the navigation control system to update the positions of on-network path controlled trips in the traffic simulator.

9. The method of claim 1, wherein, subject to handling anonymous and non-anonymous transmissions while using active IP addressing through a common communication medium, anonymous vehicle IP address used with transmission of position updates and IP address used with transmission of non-anonymous charging related data are configured to use different vehicle IP addresses.

10. The method of claim 1, wherein planning of paths for path-controlled trips mitigates relatively loaded links using a plurality of phases of re-planning, and wherein a phase of re-planning comprising:
  searching for potential alternative paths to assigned paths associated with on-network and predicted path-controlled trips that are further associated with at least one predicted relatively loaded link, wherein searches are performed independently, and wherein a search for a potential alternative path is performed by a shortest path algorithm according to predicted travel time costs on network links determined by traffic simulation associated with said model-predictive-control, wherein the simulation is fed by on-network and by predicted trips comprising trips associated with potential alternative paths that their travel times were accepted for traffic simulation evaluation in a prior re-planning phase, while searches exclude predicted relatively loaded links;
  accepting for traffic simulation evaluation a potential alternative path if its related travel time may gain potential travel time improvement over travel time of its related assigned path and if its travel time is not exceeding a travel time limit composed of travel time related to a prior potential alternative path, which in prior re-planning phase was failed to comply with a prior such said travel time limit or with such said travel time improvement, plus a travel time limiting threshold determined for the current re-planning phase; and
  determining acceptance of a path of pre-evaluated accepted potential alternative paths by performing traffic simulation prediction fed by on-network and by predicted trips, comprising path-controlled trips that their pre-evaluated potential alternative paths were accepted in current re-planning phase, and further by determining, according to the traffic simulation, evaluated acceptance of the path if its related travel time maintains said travel time limit and said potential travel time improvement.

11. The method of claim 10, wherein the travel time limiting threshold increases with a new phase of re-planning.

12. The method of claim 10, wherein said travel time limiting threshold is configured to enable to acceptably limit potential travel time discrimination among alternative paths.

13. The method of claim 10, wherein an accepted potential alternative path that its travel time was failed to comply with a said evaluation, is the path that its pre-evaluated travel time is used, in conjunction with said additional travel time limiting threshold determined for the subsequent re-planning phase, to determine for a subsequent re-planning phase said limit for acceptance of a pre-evaluated potential alternative path.

14. The method of claim 10, wherein the relative-loaded-links are prioritized relatively-loaded-links determined as a subset of the highest predicted relatively-loaded-links according to traffic simulation.

15. The method of claim 1, wherein said privilege, associated with the network usage, is determined by the support of traffic predictions of navigation system indicating on the level of usage enabling to apply traffic predictions under virtual independence of simulating modeled non path-controlled trips with planning of paths to path controlled trips.

16. The method of claim 1, wherein the privilege, associated with network usage, is adjusted to maximize traffic flow under potential increase in usage of path-controlled trips in relation to potential increase in traffic flow detected according to simulated traffic associated with the navigation control system.

17. A system comprising:
  means for transmitting from a vehicle its position and destination to get served as an incentivized path-controlled trip by a navigation control system, and receiving a path for a path-controlled trip, wherein transmission of said position and destination and reception of said path use anonymous vehicle IP addressing, and wherein incentivized path controlled-trips are entitled with privileged network usage of free of charge toll or toll discount for obedience to the navigation control system applying, through path controlled trips, predictive traffic-load-balancing on at least a regional part of a city road network;
  means for processing at the vehicle path updates from the navigation control system and transmitting from the vehicle position updates to the navigation control system, wherein reception of the path updates and transmission of the position updates use anonymous vehicle IP addressing;
  means for determining, under in-vehicle control, one or more charging amounts related to the vehicle's network-usage, comprising:
    tracking positions of the vehicle and determining matches and mismatches of tracked positions with positions that could acceptably be developed by the vehicle according to received path updates; and
    determining at least one charging amount related to network-usage for one or more matches according to data determining privileged network usage cost, and a charging amount related to network-usage for one or more determined mismatches according to data determining non-privileged network usage cost, wherein privilege in network usage is configured to enable simulation-based traffic predictions, associated with model predictive control supporting planning of paths for said predictive traffic load balancing, to be independent of modeling non path-controlled trips; and
  means for causing the vehicle to transmit charging related data, associating a charging related ID with at least one charging amount related to the vehicle's network-usage, according to a charging procedure allowed to expose a non-anonymous ID with charged network usage associated with a path-controlled trip.

18. The system of claim 17 comprising an in-vehicle toll charging unit that is configured to associate a charging related ID with at least one toll charging amount.

19. The system of claim 18, wherein association of the charging related ID with at least one toll charging amount enables charging by a charging system according to a determined charging procedure.

20. The system of claim 18, wherein the in-vehicle toll charging unit is configured to transmit authentication related data associated uniquely with the vehicle with at least one toll charging amount according to a determined charging procedure.

* * * * *